US012572513B2

(12) United States Patent
Kashi Visvanathan et al.

(10) Patent No.: US 12,572,513 B2
(45) Date of Patent: *Mar. 10, 2026

(54) TECHNIQUES FOR RESOURCE UTILIZATION IN REPLICATION PIPELINE PROCESSING

(71) Applicant: Oracle International Corporation, Redwood Shores, CA (US)

(72) Inventors: Satish Kumar Kashi Visvanathan, San Jose, CA (US); Viggnesh Venugopal, Santa Clara, CA (US); Victor Vladimir Golosovker, Union City, CA (US); Vikram Singh Bisht, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/916,393

(22) Filed: Oct. 15, 2024

(65) Prior Publication Data

US 2025/0036601 A1     Jan. 30, 2025

Related U.S. Application Data

(63) Continuation of application No. 18/326,447, filed on May 31, 2023, now Pat. No. 12,147,394.

(Continued)

(51) Int. Cl.
*G06F 16/10* (2019.01)
*G06F 9/50* (2006.01)
(Continued)

(52) U.S. Cl.
CPC ............ *G06F 16/178* (2019.01); *G06F 9/505* (2013.01); *G06F 11/1417* (2013.01);
(Continued)

(58) Field of Classification Search
CPC .. G06F 16/184; G06F 16/185; G06F 16/1858; G06F 16/188; G06F 16/211;
(Continued)

(56) References Cited

U.S. PATENT DOCUMENTS

| | | | |
|---|---|---|---|
| 5,806,075 A | 9/1998 | Jain et al. | |
| 6,615,333 B1 | 9/2003 | Hoogerbrugge et al. | |

(Continued)

FOREIGN PATENT DOCUMENTS

| | | |
|---|---|---|
| CA | 2954888 A1 | 1/2007 |
| CN | 104641365 A | 5/2015 |

(Continued)

OTHER PUBLICATIONS

"CephFS Mirroring", Ceph Internals, Available online at: https://docs.ceph.com/en/reef/dev/cephfs-mirroring/, 9 pages.

(Continued)

*Primary Examiner* — Diedra McQuitery
(74) *Attorney, Agent, or Firm* — Kilpatrick Townsend & Stockton LLP

(57) ABSTRACT

Techniques are described for ensuring end-to-end fair-share resource utilization during cross-region replication. In certain embodiments, a fair-share architecture is used for communication among pipeline stages performing a cross-region replication between different cloud infrastructure regions. Cross-region replication-related jobs are distributed evenly from a pipeline stage into a temporary buffer in the fair-share architecture, and then further distributed evenly form the fair-share architecture to parallel running threads of next pipeline stage for execute. Techniques for static and dynamic resource allocations are also disclosed.

20 Claims, 21 Drawing Sheets

Related U.S. Application Data

(60) Provisional application No. 63/378,486, filed on Oct. 5, 2022, provisional application No. 63/412,243, filed on Sep. 30, 2022, provisional application No. 63/357,526, filed on Jun. 30, 2022, provisional application No. 63/352,992, filed on Jun. 16, 2022.

(51) Int. Cl.

| | |
|---|---|
| *G06F 11/14* | (2006.01) |
| *G06F 11/1446* | (2026.01) |
| *G06F 11/20* | (2006.01) |
| *G06F 16/11* | (2019.01) |
| *G06F 16/174* | (2019.01) |
| *G06F 16/178* | (2019.01) |
| *G06F 16/182* | (2019.01) |
| *G06F 16/185* | (2019.01) |
| *G06F 16/23* | (2019.01) |
| *G06F 16/27* | (2019.01) |
| *G06F 21/60* | (2013.01) |
| *G06F 21/62* | (2013.01) |
| *H04L 9/08* | (2006.01) |
| *H04L 9/32* | (2006.01) |
| *G06F 16/176* | (2019.01) |
| *G06F 16/22* | (2019.01) |

(52) U.S. Cl.
CPC ...... *G06F 11/1451* (2013.01); *G06F 11/1464* (2013.01); *G06F 11/2023* (2013.01); *G06F 11/2028* (2013.01); *G06F 16/128* (2019.01); *G06F 16/1756* (2019.01); *G06F 16/1844* (2019.01); *G06F 16/185* (2019.01); *G06F 16/2365* (2019.01); *G06F 16/27* (2019.01); *G06F 21/602* (2013.01); *G06F 21/6218* (2013.01); *H04L 9/0836* (2013.01); *H04L 9/0891* (2013.01); *H04L 9/0894* (2013.01); *H04L 9/3228* (2013.01); *G06F 16/1774* (2019.01); *G06F 16/2246* (2019.01); *G06F 2201/84* (2013.01)

(58) Field of Classification Search
CPC ........... G06F 16/2272; G06F 16/24557; G06F 16/256; G06F 16/278
See application file for complete search history.

(56) References Cited

U.S. PATENT DOCUMENTS

| | | | |
|---|---|---|---|
| 7,278,049 | B2 | 10/2007 | Bartfai et al. |
| 7,308,545 | B1 | 12/2007 | Kekre et al. |
| 7,546,431 | B2 | 6/2009 | Stacey et al. |
| 8,271,992 | B2 | 9/2012 | Chatley et al. |
| 8,326,803 | B1 | 12/2012 | Stringham |
| 8,332,375 | B2 | 12/2012 | Chatley et al. |
| 8,336,056 | B1 | 12/2012 | Gadir |
| 8,464,101 | B1 | 6/2013 | Natanzon et al. |
| 8,522,252 | B2 | 8/2013 | Chatley et al. |
| 8,548,949 | B2 | 10/2013 | Jennas, II et al. |
| 8,700,855 | B2 | 4/2014 | Revanuru |
| 8,832,027 | B1 | 9/2014 | Bushman |
| 8,856,079 | B1 | 10/2014 | Subramanian et al. |
| 9,047,307 | B1 | 6/2015 | Ghemawat et al. |
| 9,189,495 | B1 | 11/2015 | Hughes et al. |
| 9,489,434 | B1 | 11/2016 | Rath |
| 9,535,746 | B2 | 1/2017 | Gupta et al. |
| 9,760,358 | B2 | 9/2017 | Sapaliga et al. |
| 9,916,203 | B1 | 3/2018 | Pogde et al. |
| 9,928,246 | B1 | 3/2018 | Xu et al. |
| 9,952,767 | B2 | 4/2018 | Zheng et al. |
| 10,089,230 | B1 * | 10/2018 | Koker .................. G06F 12/0891 |
| 10,459,632 | B1 | 10/2019 | Chen et al. |
| 10,503,753 | B2 | 12/2019 | Mitkar et al. |
| 10,514,986 | B2 | 12/2019 | Bangalore et al. |
| 10,664,358 | B1 | 5/2020 | Chen et al. |
| 10,698,941 | B2 | 6/2020 | Maybee et al. |
| 10,721,141 | B1 | 7/2020 | Verma et al. |
| 10,756,888 | B2 | 8/2020 | Han |
| 10,761,941 | B1 | 9/2020 | Redko et al. |
| 10,908,828 | B1 | 2/2021 | Meiri et al. |
| 10,922,132 | B1 | 2/2021 | Shiramshetti et al. |
| 11,005,935 | B1 | 5/2021 | Littlefield et al. |
| 11,036,677 | B1 | 6/2021 | Grunwald et al. |
| 11,080,041 | B1 | 8/2021 | Ah Kun et al. |
| 11,086,545 | B1 | 8/2021 | Dayal et al. |
| 11,151,092 | B2 | 10/2021 | Chmiel et al. |
| 11,372,725 | B2 | 6/2022 | Bajaj |
| 11,513,997 | B2 | 11/2022 | Keller et al. |
| 11,575,727 | B1 | 2/2023 | Woodruff et al. |
| 11,714,782 | B2 | 8/2023 | Subramanian et al. |
| 11,809,735 | B1 | 11/2023 | Kumar et al. |
| 11,836,110 | B2 | 12/2023 | Matsushita et al. |
| 11,860,673 | B1 | 1/2024 | Kodakandla et al. |
| 12,001,404 | B2 | 6/2024 | Kashi Visvanathan et al. |
| 12,147,394 | B2 | 11/2024 | Kashi Visvanathan et al. |
| 12,182,078 | B2 | 12/2024 | Kashi Visvanathan et al. |
| 12,197,790 | B2 | 1/2025 | Nelson |
| 12,455,861 | B2 | 10/2025 | Kashi Visvanathan et al. |
| 12,487,972 | B2 | 12/2025 | Visvanathan et al. |
| 2002/0112123 | A1 | 8/2002 | Becker et al. |
| 2002/0129214 | A1 | 9/2002 | Sarkar |
| 2003/0182313 | A1 | 9/2003 | Federwisch et al. |
| 2005/0165862 | A1 | 7/2005 | Loafman et al. |
| 2006/0271598 | A1 | 11/2006 | Wong et al. |
| 2008/0049254 | A1 | 2/2008 | Phan et al. |
| 2008/0109496 | A1 | 5/2008 | Holenstein et al. |
| 2008/0168218 | A1 | 7/2008 | Arakawa et al. |
| 2008/0172542 | A1 | 7/2008 | Kaushik |
| 2008/0250234 | A1 | 10/2008 | Webber |
| 2009/0138480 | A1 | 5/2009 | Chatley et al. |
| 2009/0138481 | A1 | 5/2009 | Chatley et al. |
| 2009/0144224 | A1 | 6/2009 | Phan et al. |
| 2009/0144284 | A1 | 6/2009 | Chatley et al. |
| 2009/0144422 | A1 | 6/2009 | Chatley et al. |
| 2009/0307277 | A1 | 12/2009 | Grubov et al. |
| 2011/0213765 | A1 | 9/2011 | Cui et al. |
| 2011/0231172 | A1 | 9/2011 | Gold |
| 2012/0131595 | A1 | 5/2012 | Kim et al. |
| 2012/0173830 | A1 | 7/2012 | Gundy et al. |
| 2012/0180056 | A1 * | 7/2012 | Sander .................. G06F 9/4881 718/102 |
| 2012/0317079 | A1 | 12/2012 | Shoens et al. |
| 2012/0323844 | A1 | 12/2012 | Chatley et al. |
| 2013/0005491 | A1 | 1/2013 | Cox et al. |
| 2013/0061229 | A1 * | 3/2013 | Hamada ............... G06F 9/4881 718/100 |
| 2013/0110778 | A1 | 5/2013 | Taylor et al. |
| 2013/0339407 | A1 | 12/2013 | Sharpe et al. |
| 2014/0052692 | A1 | 2/2014 | Zhang et al. |
| 2015/0066857 | A1 | 3/2015 | Dayal et al. |
| 2015/0074536 | A1 | 3/2015 | Varadharajan et al. |
| 2015/0120893 | A1 | 4/2015 | Sapaliga et al. |
| 2015/0378636 | A1 | 12/2015 | Yadav et al. |
| 2016/0188380 | A1 | 6/2016 | Eastep et al. |
| 2016/0224259 | A1 | 8/2016 | Ahrens et al. |
| 2016/0335278 | A1 | 11/2016 | Tabaaloute et al. |
| 2016/0359963 | A1 | 12/2016 | Chatley et al. |
| 2016/0359976 | A1 | 12/2016 | Chatley et al. |
| 2017/0046093 | A1 | 2/2017 | Butt |
| 2018/0101311 | A1 | 4/2018 | Koszewnik |
| 2019/0171497 | A1 | 6/2019 | Agarwal et al. |
| 2019/0235917 | A1 | 8/2019 | Koneru et al. |
| 2019/0384743 | A1 | 12/2019 | Lv et al. |
| 2020/0065196 | A1 | 2/2020 | Desai et al. |
| 2020/0210223 | A1 | 7/2020 | Saka et al. |
| 2020/0250684 | A1 | 8/2020 | Puehse et al. |
| 2020/0257700 | A1 | 8/2020 | Xu et al. |
| 2020/0301882 | A1 | 9/2020 | Pogde et al. |
| 2020/0310919 | A1 | 10/2020 | Bajaj |
| 2020/0333970 | A1 | 10/2020 | Mukku et al. |
| 2020/0334111 | A1 | 10/2020 | Potnis et al. |

(56) References Cited

U.S. PATENT DOCUMENTS

| | | | |
|---|---|---|---|
| 2020/0409974 A1 | 12/2020 | Ayzenberg et al. | |
| 2021/0034569 A1 | 2/2021 | Xu et al. | |
| 2021/0124611 A1* | 4/2021 | Saillet | G06F 9/4887 |
| 2021/0157504 A1 | 5/2021 | Hinman | |
| 2021/0173945 A1 | 6/2021 | Karr et al. | |
| 2021/0200771 A1 | 7/2021 | Kuang et al. | |
| 2021/0216625 A1 | 7/2021 | Miller et al. | |
| 2021/0226861 A1 | 7/2021 | Barsalou et al. | |
| 2021/0294775 A1 | 9/2021 | Keller et al. | |
| 2021/0342299 A1 | 11/2021 | Kumarasamy et al. | |
| 2021/0389883 A1 | 12/2021 | Derryberry et al. | |
| 2021/0390078 A1 | 12/2021 | Aahlad et al. | |
| 2021/0390113 A1 | 12/2021 | Danilov et al. | |
| 2022/0027241 A1 | 1/2022 | Shrivastava et al. | |
| 2022/0058094 A1 | 2/2022 | Gunturu et al. | |
| 2022/0060323 A1 | 2/2022 | Payne et al. | |
| 2022/0121365 A1 | 4/2022 | Wang et al. | |
| 2022/0147490 A1 | 5/2022 | Shivani et al. | |
| 2022/0182297 A1 | 6/2022 | Verma et al. | |
| 2022/0188267 A1 | 6/2022 | Patil et al. | |
| 2022/0198322 A1 | 6/2022 | Kuperman et al. | |
| 2022/0222358 A1 | 7/2022 | Sahita et al. | |
| 2022/0229734 A1 | 7/2022 | Seela et al. | |
| 2022/0263657 A1 | 8/2022 | Chang et al. | |
| 2022/0308965 A1 | 9/2022 | Gunda et al. | |
| 2023/0020330 A1 | 1/2023 | Schwerin et al. | |
| 2023/0029677 A1 | 2/2023 | Gupta et al. | |
| 2023/0080691 A1 | 3/2023 | Gupta et al. | |
| 2023/0134314 A1 | 5/2023 | Braganza et al. | |
| 2023/0177069 A1 | 6/2023 | Xiang et al. | |
| 2023/0222096 A1 | 7/2023 | Fan et al. | |
| 2023/0333777 A1 | 10/2023 | Shveidel et al. | |
| 2023/0385153 A1 | 11/2023 | George et al. | |
| 2023/0409442 A1 | 12/2023 | Kashi Visvanathan et al. | |
| 2023/0409522 A1 | 12/2023 | Kashi Visvanathan et al. | |
| 2023/0409535 A1 | 12/2023 | Kashi Visvanathan et al. | |
| 2023/0409559 A1 | 12/2023 | Kashi Visvanathan et al. | |
| 2023/0409597 A1 | 12/2023 | Kashi Visvanathan et al. | |
| 2023/0412375 A1 | 12/2023 | Bisht et al. | |
| 2024/0028466 A1 | 1/2024 | Duggal et al. | |
| 2024/0094937 A1 | 3/2024 | Kashi Visvanathan et al. | |
| 2024/0134828 A1 | 4/2024 | Kashi et al. | |
| 2024/0281413 A1 | 8/2024 | Kashi Visvanathan et al. | |

FOREIGN PATENT DOCUMENTS

| | | |
|---|---|---|
| CN | 105245328 A | 1/2016 |
| CN | 117215721 A | 12/2023 |
| JP | 2017531256 A | 10/2017 |
| WO | 2015110171 A1 | 7/2015 |
| WO | 2023244601 A1 | 12/2023 |

OTHER PUBLICATIONS

"Google Scholar/patents Search—Text Refined", 2024, 2 pages.
"SnapshotIQ", Available online at: https://infohub.delltechnologies.com/en-us/l/high-availability-and-data-protection-with-dell-powerscale-scale-out-nas/snapshots-116/, 4 pages.
U.S. Appl. No. 17/991,688 , Non-Final Office Action, Mailed on Nov. 19, 2024, 11 pages.
U.S. Appl. No. 18/094,302 , Notice of Allowance, Mailed on Nov. 29, 2024, 14 pages.
U.S. Appl. No. 18/162,459 , Notice of Allowance, Mailed on Dec. 9, 2024, 11 pages.
U.S. Appl. No. 18/166,992 , Notice of Allowance, Mailed on Nov. 5, 2024, 9 pages.
U.S. Appl. No. 18/181,414 , Notice of Allowance, Mailed on Sep. 30, 2024, 12 pages.
U.S. Appl. No. 18/304,226 , Non-Final Office Action, Mailed on Nov. 19, 2024, 16 pages.
U.S. Appl. No. 18/332,475 , Non-Final Office Action, Mailed on Dec. 19, 2024, 15 pages.

U.S. Appl. No. 18/646,676 , Notice of Allowance, Mailed on Jan. 2, 2025, 21 pages.
Khurana et al., "Efficient Snapshot Retrieval Over Historical Graph Data", Institute of Electrical and Electronics Engineers, Jul. 24, 2012, pp. 997-1008.
Lapp , "Busting the Buffer Myth for Multicast Media Over IP", Available Online at: https://blogs.cisco.com/sp/busting-the-buffer-myth-for-multicast-media-over-ip, Feb. 22, 2021, 9 pages.
Application No. PCT/US2023/024235 , International Preliminary Report on Patentability, Mailed on Dec. 26, 2024, 9 pages.
Application No. PCT/US2023/024236 , International Preliminary Report on Patentability, Mailed on Dec. 26, 2024, 9 pages.
Application No. PCT/US2023/024239 , International Preliminary Report on Patentability, Mailed on Dec. 26, 2024, 11 pages.
Application No. PCT/US2023/024835 , International Preliminary Report on Patentability, Mailed on Dec. 26, 2024, 11 pages.
Application No. PCT/US2023/025194 , International Preliminary Report on Patentability, Mailed on Dec. 26, 2024, 10 pages.
"About Consistency Group Snapshot Restore", Working with Consistency Groups, Available Online at: https://sort.veritas.com/public/documents/HSO/2.0/linux/productguides/html/hfo_admin_ubuntu/ch07s10.htm, Accessed from Internet on Aug. 11, 2022, 2 pages.
"About HyperScale Consistency Groups", Working with Consistency Groups, Available Online at: https://sort.veritas.com/public/documents/HSO/2.0/linux/productguides/html/hfo_admin_ubuntu/ch07s02.htm, Accessed from Internet on Aug. 11, 2022, 1 page.
"Amazon EFS Replication", Amazon Elastic File System, Available Online at: https://docs.aws.amazon.com/efs/latest/ug/efs-replication.html, Oct. 3, 2022, 18 pages.
"Announcing Amazon Elastic File System Replication", Available Online at: https://aws.amazon.com/about-aws/whats-new/2022/01/amazon-elastic-file-system-replication/, Jan. 25, 2022, 3 pages.
"Aws Kms Concepts", AWS Key Management Service, Available Online at: https://docs.aws.amazon.com/kms/latest/developerguide/concepts.html, Oct. 3, 2022, 36 pages.
"Caringo Swarm Hybrid Cloud for Azure", Caringo Swarm, Available Online at: https://azure.github.io/Storage/docs/storage-partners/partners/MultiProtocol/Caringo-Azure.pdf, 2017, 1 page.
"Caringo's Swarm Hybrid Cloud Object Storage Platform Now Integrated with Reach Engine by Levels Beyond and Microsoft Azure", Available Online at: https://www.broadcastbeat.com/caringos-swarm-hybrid-cloud-object-storage-platform-now-integrated-with-reach-engine-by-levels-beyond-and-microsoft-azure/, Oct. 3, 2022, 10 pages.
"Create Amazon EBS Snapshots", Available Online at: https://docs.aws.amazon.com/AWSEC2/latest/UserGuide/ebs-creating-snapshot.html, 2022, 4 pages.
"Create Consistency Groups", Available Online at: https://library.netapp.com/ecmdocs/ECMP12404965/html/GUID-AA34DCF7-6827-4ACC-AA5E-63B1FEA8EFCE.html, Jan. 2016, 2 pages.
"How AWS Data Sync Works", AWS DataSync, Available Online at: https://docs.aws.amazon.com/datasync/latest/userguide/how-datasync-works.html, Oct. 3, 2022, 5 pages.
"Replication for File System Agents", Available Online at: https://documentation.commvault.com/v11/essential/129963_replication_for_file_system_agents.html, Dec. 7, 2021, 2 pages.
"Snapshot Schedules and Snapshot Consistency Groups", Available Online at: https://thinksystem.lenovofiles.com/storage/help/index.jsp?topic=%2Fthinksystem_system_manager_11.50.1%2F34EADFOC-B783-4FED-B187-28B016EE22B6_.html, Accessed from Internet on Aug. 11, 2022, 2 pages.
"Snapshotting a Consistency Group", Available Online at: https://www.ibm.com/docs/en/xiv-storage-system?topic=commands-snapshotting-consistency-group, Jun. 12, 2022, 5 pages.
"The Definitive Guide to Rubrik Cloud Data Management", Available Online at: https://www.rubrik.com/content/dam/rubrik/en/resources/white-paper/Definitive-guide-rubrik-cloud-data-management.pdf, Jun. 8, 2021, 41 pages.
"What is AWS DataSync?", Available Online at: https://docs.aws.amazon.com/datasync/latest/userguide/what-is-datasync.html, Oct. 3, 2022, 3 pages.
U.S. Appl. No. 18/166,992 , Non-Final Office Action, Mailed on Jun. 20, 2024, 9 pages.

(56) References Cited

OTHER PUBLICATIONS

U.S. Appl. No. 18/169,121 , Non-Final Office Action, Mailed on Aug. 14, 2024, 29 pages.
U.S. Appl. No. 18/181,414 , Final Office Action, Mailed on Aug. 12, 2024, 22 pages.
U.S. Appl. No. 18/181,414 , Non-Final Office Action, Mailed on Mar. 14, 2024, 78 pages.
U.S. Appl. No. 18/304,161 , Notice of Allowance, Mailed on Mar. 19, 2024, 20 pages.
U.S. Appl. No. 18/326,447 , Non-Final Office Action, Mailed on Jun. 12, 2024, 8 pages.
U.S. Appl. No. 18/326,447 , Notice of Allowance, Mailed on Aug. 29, 2024, 10 pages.
U.S. Appl. No. 18/332,462 , Final Office Action, Mailed on Jul. 25, 2024, 26 pages.
U.S. Appl. No. 18/332,462 , Non-Final Office Action, Mailed on Apr. 25, 2024, 18 pages.
Chapman et al., "Provenance and the Price of Identity", Available online at: https://www.researchgate.net/profile/Adriane-Chapman/publication/220919088_Provenance_and_the_Price_of_Identity/links/09e4150ac3676a65f5000000/Provenance-and-the-Price-of-Identity.pdf, Jun. 2008, pp. 1-14.
Mahajan et al., "Effective and Efficient Compromise Recovery for Weakly Consistent Replication", Available online at: https://dl.acm.org/doi/pdf/10.1145/1519065.1519080?casa_token=t20agCiLGw4AAAAA:ZMBpdKEfUS_8XyfuuUCOrZCKTHA2DkCr_gs7LVAeoxiuXwsctzQZyeAaZ1USEOI_Vb9YzTttL9s, Apr. 2009, pp. 131-144.
Mashtizadeh et al., "Replication, History, and Grafting in the Ori File System", Symposium on Operating Systems Principles, Available Online at: https://www.scs.stanford.edu/~dm/home/papers/mashtizadeh:ori.pdf, Nov. 3-6, 2013, pp. 151-166.
Application No. PCT/US2023/024235 , International Search Report and Written Opinion, Mailed on Sep. 4, 2023, 13 pages.
Application No. PCT/US2023/024236 , International Search Report and Written Opinion, Mailed on Sep. 6, 2023, 10 pages.
Application No. PCT/US2023/024239 , International Search Report and Written Opinion, Mailed on Aug. 11, 2023, 14 pages.
Application No. PCT/US2023/024835 , International Search Report and Written Opinion, Mailed on Aug. 8, 2023, 14 pages.
Application No. PCT/US2023/025194 , International Search Report and Written Opinion, Mailed on Aug. 18, 2023, 13 pages.
Tremel et al., "Reliable, Efficient Recovery for Complex Services with Replicated Subsystems", Available online at: https://www.cs.cornell.edu/~weijia/papers/edward-dsn.pdf, Jun. 2020, pp. 172-183.
Google Scholar/Patents Search-Text Refined, Filesystem Delta Snapshot Replication, 2025, 2 pages.
Google Scholar/Patents Search-Text Refined, Pipeline Thread Delete Stage, 2025, 2 pages.
U.S. Appl. No. 18/169,121, Notice of Allowance mailed on Apr. 28, 2025, 6 pages.
U.S. Appl. No. 18/169,124, Notice of Allowance mailed on Mar. 20, 2025, 13 pages.
U.S. Appl. No. 18/304,226, Final Office Action mailed on Apr. 4, 2025, 20 pages.
U.S. Appl. No. 18/521,176, Non-Final Office Action mailed on Apr. 4, 2025, 6 pages.
U.S. Appl. No. 17/991,688, Notice of Allowance, mailed on Mar. 7, 2025, 8 pages.
U.S. Appl. No. 18/094,302, Notice of Allowance, mailed on Mar. 13, 2025, 14 pages.
U.S. Appl. No. 18/162,459, Notice of Allowance, mailed on Mar. 6, 2025, 10 pages.
U.S. Appl. No. 18/332,462, Notice of Allowance, mailed on Feb. 12, 2025, 5 pages.
U.S. Appl. No. 18/497,877, Non-Final Office Action, mailed on Mar. 3, 2025, 25 pages.
U.S. Appl. No. 18/508,990, Non-Final Office Action, mailed on Mar. 3, 2025, 11 pages.
U.S. Appl. No. 18/536,067, Non-Final Office Action, mailed on Jan. 29, 2025, 17 pages.
U.S. Appl. No. 18/646,676, Notice of Allowance, mailed on Mar. 10, 2025, 19 pages.
Chang et al., "Job Scheduling and Data Replication on Data Grids", Future Generation Computer Systems, vol. 23, No. 7, Aug. 2007, pp. 846-860.
U.S. Appl. No. 18/497,877, "Notice of Allowance", mailed on Aug. 12, 2025, 9 pages.
U.S. Appl. No. 18/969,190, "Non-Final Office Action", mailed on Aug. 22, 2025, 8 pages.
U.S. Appl. No. 18/497,877, Corrected Notice of Allowability mailed on Sep. 11, 2025, 7 pages.
U.S. Appl. No. 18/969,186, Non-Final Office Action mailed on Sep. 5, 2025, 23 pages.
"File System Key Pairs Threads", Google Scholar/Patents Search—Text Refined, Accessed from Internet on Oct. 22, 2025, pp. 1-2.
U.S. Appl. No. 18/304,226, "Notice of Allowance", mailed on Nov. 12, 2025, 6 pages.
U.S. Appl. No. 18/943,779, "Final Office Action", mailed on Nov. 7, 2025, 22 pages.
International Application No. CN202380043794.7, "Office Action", mailed on Oct. 9, 2025, 20 pages.
International Application No. EP23738250.2, "Intention to Grant", mailed on Oct. 14, 2025, 8 pages.
U.S. Appl. No. 18/332,475, "Notice of Allowance", mailed on Jan. 7, 2026, 9 pages.
International Application No. CN202380043794.7, "Office Action", mailed on Nov. 29, 2025, 16 pages.

* cited by examiner

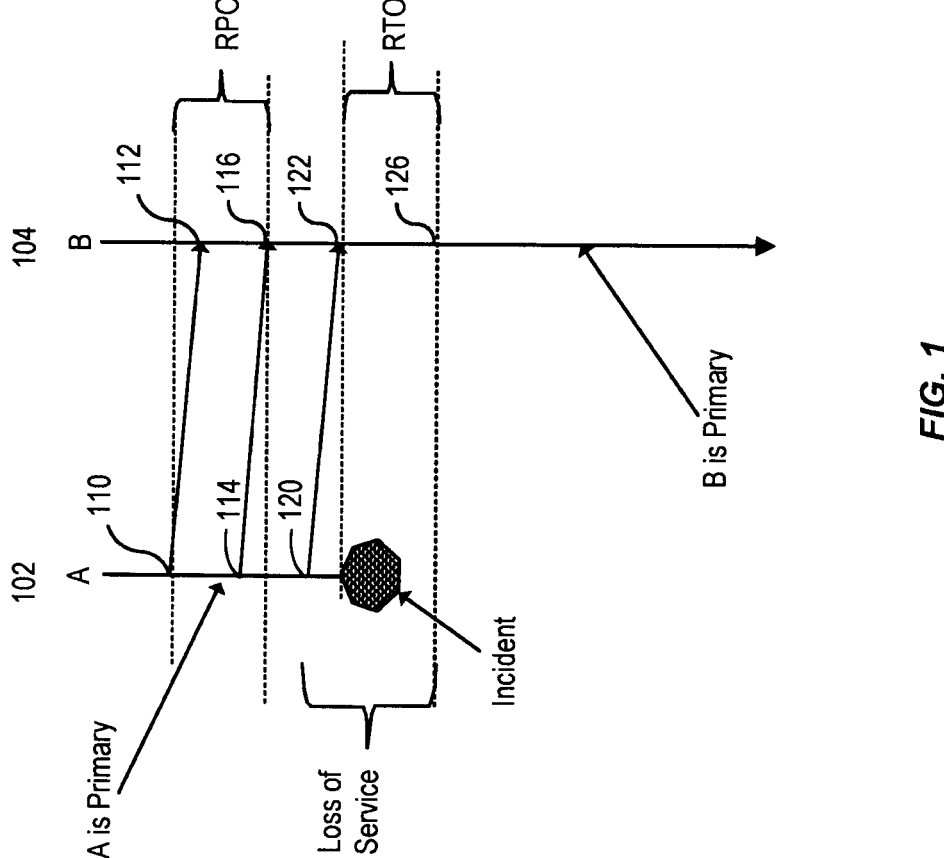
FIG. 1

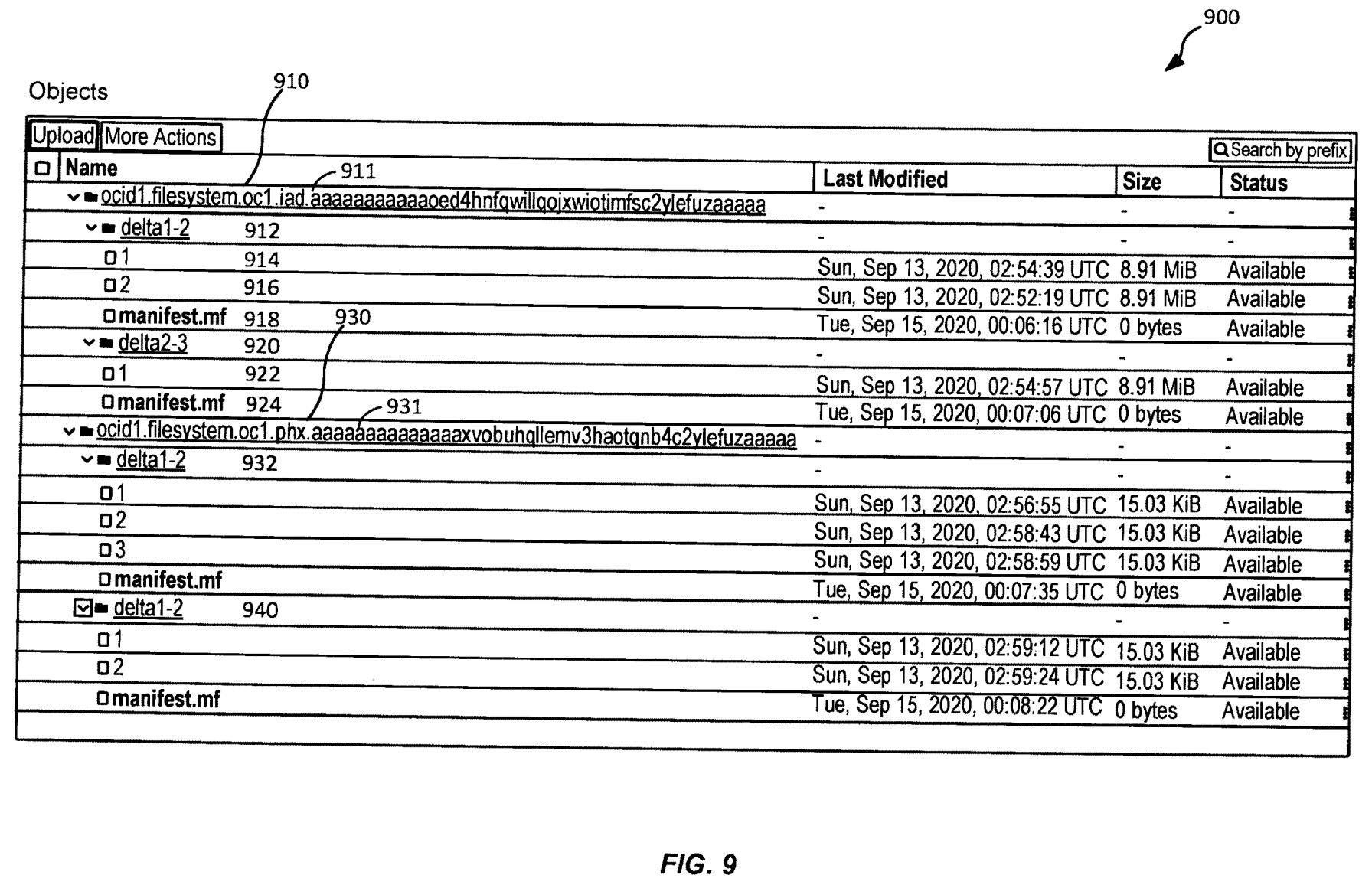

900

Objects

| | Name | Last Modified | Size | Status |
|---|---|---|---|---|
| | ▾ ■ ocid1 filesystem.oc1.iad.aaaaaaaaaaoed4hnfqwillqoixwiotimfsc2vlefuzaaaaa | - | - | - |
| | ▾ ■ delta1-2 | - | - | - |
| | □ 1 | Sun, Sep 13, 2020, 02:54:39 UTC | 8.91 MiB | Available |
| | □ 2 | Sun, Sep 13, 2020, 02:52:19 UTC | 8.91 MiB | Available |
| | □ manifest.mf | Tue, Sep 15, 2020, 00:06:16 UTC | 0 bytes | Available |
| | ▾ ■ delta2-3 | - | - | - |
| | □ 1 | Sun, Sep 13, 2020, 02:54:57 UTC | 8.91 MiB | Available |
| | □ manifest.mf | Tue, Sep 15, 2020, 00:07:06 UTC | 0 bytes | Available |
| | ▾ ■ ocid1.filesystem.oc1.phx.aaaaaaaaaaaaaaaaaaaaxvobuhqllemv3haotqnb4c2vlefuzaaaaa | - | - | - |
| | ▾ ■ delta1-2 | - | - | - |
| | □ 1 | Sun, Sep 13, 2020, 02:56:55 UTC | 15.03 KiB | Available |
| | □ 2 | Sun, Sep 13, 2020, 02:58:43 UTC | 15.03 KiB | Available |
| | □ 3 | Sun, Sep 13, 2020, 02:58:59 UTC | 15.03 KiB | Available |
| | □ manifest.mf | Tue, Sep 15, 2020, 00:07:35 UTC | 0 bytes | Available |
| | ☑ ■ delta1-2 | - | - | - |
| | □ 1 | Sun, Sep 13, 2020, 02:59:12 UTC | 15.03 KiB | Available |
| | □ 2 | Sun, Sep 13, 2020, 02:59:24 UTC | 15.03 KiB | Available |
| | □ manifest.mf | Tue, Sep 15, 2020, 00:08:22 UTC | 0 bytes | Available |

Upload | More Actions

Q Search by prefix 910   911   912   914   916   918   920   922   924   930   931   932   940

*FIG. 9*

Source Region 1402

Object 1470

1482

S8: Upload

Object upload thread pool 1442

1450

S9: Upload completion queue

1480

S10: pick completed blobs in consecutive sequence

DASD 1426

Read

S5: Extract one request in RR fashion

Read thread pool 1424

1440

S7: Fair-share queue for object upload

1422
S4: Fair-share queue for DASD read

Pull 1 from each Job

1420

1430

S6: Per-job-Blob completed queue

1414

DG

GETKEY

S3: Per Job Dasd IO requestQueue

S2: Walk the Btree and generate read tasks

Delta generation thread pool 1412

1410

S1: Enqueue Source replication Jobs

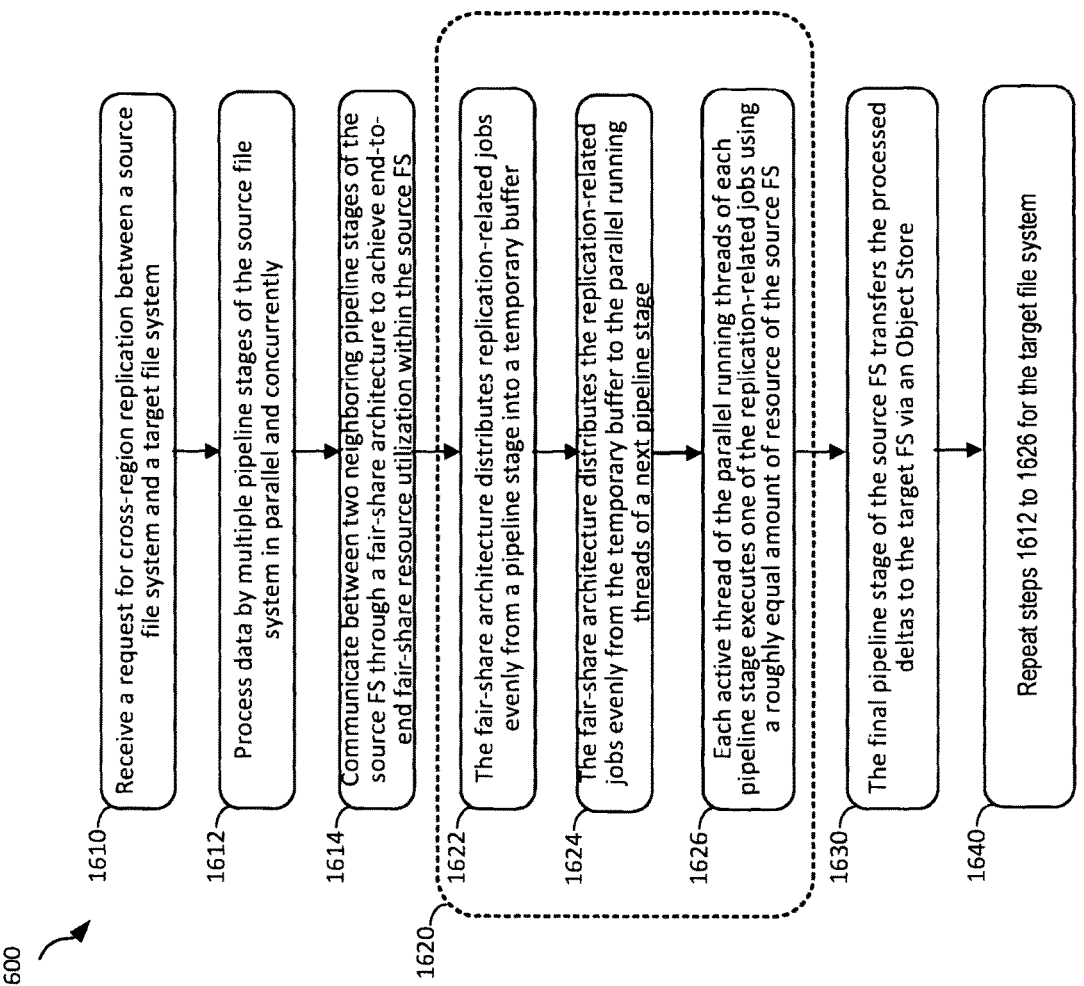

1610 Receive a request for cross-region replication between a source file system and a target file system

1612 Process data by multiple pipeline stages of the source file system in parallel and concurrently

1614 Communicate between two neighboring pipeline stages of the source FS through a fair-share architecture to achieve end-to-end fair-share resource utilization within the source FS

1620

1622 The fair-share architecture distributes replication-related jobs evenly from a pipeline stage into a temporary buffer

1624 The fair-share architecture distributes the replication-related jobs evenly from the temporary buffer to the parallel running threads of a next pipeline stage

1626 Each active thread of the parallel running threads of each pipeline stage executes one of the replication-related jobs using a roughly equal amount of resource of the source FS

1630 The final pipeline stage of the source FS transfers the processed deltas to the target FS via an Object Store

1640 Repeat steps 1612 to 1626 for the target file system

TECHNIQUES FOR RESOURCE UTILIZATION IN REPLICATION PIPELINE PROCESSING

CROSS-REFERENCES TO RELATED APPLICATIONS

This application is a continuation of U.S. application Ser. No. 18/326,447 filed on May 31, 2023, which is non-provisional of and claims the benefit and priority under 35 U.S.C. 119(e) of U.S. Provisional Application No. 63/352,992, filed on Jun. 16, 2022, U.S. Provisional Application No. 63/357,526, filed on Jun. 30, 2022, U.S. Provisional Application No. 63/412,243, filed on Sep. 30, 2022, and U.S. Provisional Application No. 63/378,486, filed on Oct. 5, 2022, which are incorporated herein by reference in their entirety for all purposes.

FIELD

The present disclosure generally relates to file systems. More specifically, but not by way of limitation, techniques are described for ensuring end-to-end fair-share resource utilization during cross-region replication.

BACKGROUND

Enterprise businesses contain critical data. File system replication enhances the availability of the critical data and provides fault tolerance during disaster recovery. Unbalanced resource utilization and bottlenecks are common problems that can arise during file system replication. Therefore, there is a need to improve the resource utilization during file system replication.

BRIEF SUMMARY

The present disclosure generally relates to file systems. More specifically, but not by way of limitation, techniques are described for ensuring end-to-end fair-share resource utilization during cross-region replication. Various embodiments are described herein, including methods, systems, non-transitory computer-readable storage media storing programs, code, or instructions executable by one or more processors, and the like.

In certain embodiments, techniques are provided including a method that comprises executing a set of jobs, by a first pipeline stage and a second pipeline stage of a computing system, the first pipeline stage comprising a first set of parallel running threads, and the second pipeline stage comprising a second set of parallel running threads; and communicating, by the computing system, between the first pipeline stage and the second pipeline stage through an architecture for enqueuing and dequeuing, the communicating comprising: enqueuing the set of jobs from the first pipeline stage evenly to the architecture; and dequeuing the set of jobs from the architecture evenly to the second pipeline stage, wherein executing the set of jobs by the first pipeline stage uses an equivalent amount of resources of the computing system as executing the set of jobs by the second pipeline stage.

In yet another embodiment, the architecture comprises a linked list of queues holding the set of jobs having completed execution by the first set of parallel running threads in the first pipeline stage, and to be executed by the second set of parallel running threads in the second pipeline stage.

In yet another embodiment, enqueuing the set of jobs evenly to the architecture comprises placing, by a processing thread of the first set of parallel running threads in the first pipeline stage, one of the set of jobs into one queue of the linked list of queues in a round-robin fashion.

In yet another embodiment, dequeuing the set of jobs from the architecture evenly comprises extracting one of the set of jobs from one queue of the linked list of queues in a round-robin fashion.

In yet another embodiment, a queue of the linked list of queues is created upon receiving one of the set of jobs.

In yet another embodiment, a queue of the linked list of queues is deleted when no job exists in the queue.

In yet another embodiment, the first pipeline stage and the second pipeline stage are replication pipeline stages of a file system.

In yet another embodiment, each job of the set of jobs is executed by one or more of the first set of parallel running threads in the first pipeline stage; each job of the set of jobs is executed by one or more of the second set of parallel running threads in the second pipeline stage; and each parallel running thread of the first set and the second set uses an equal share of resources of the computing system.

In yet another embodiment, the method further comprises a job failure in the first pipeline stage does not impact any jobs being executed by the second pipeline stage.

In yet another embodiment, the resources of the computing system comprise computing devices, memory, storage, network, database, and bandwidth.

In various embodiments, a system is provided that includes one or more data processors and a non-transitory computer readable medium containing instructions which, when executed on the one or more data processors, cause the one or more data processors to perform part or all of one or more methods disclosed herein.

In various embodiments, a non-transitory computer-readable medium, storing computer-executable instructions which, when executed by one or more processors, cause the one or more processors of a computer system to perform one or more methods disclosed herein.

BRIEF DESCRIPTION OF THE DRAWINGS

Features, embodiments, and advantages of the present disclosure are better understood when the following Detailed Description is read with reference to the accompanying drawings.

FIG. 1 depicts an example concept of recovery time objective (RTO) and recovery point objective (RPO), according to certain embodiments.

FIG. 9 depicts an example replication bucket format, according to certain embodiments.

FIG. 14 is a simplified flow diagram illustrating a cross-region replication processing in a source region utilizing the fair-share architecture, according to certain embodiments.

FIG. 16 is a flow chart illustrating a cross-region replication process using the fair-share architecture to achieve fair-share resource utilization, according to certain embodiments.

DETAILED DESCRIPTION

Explanation of Terms in Certain Embodiments

Figure 2:
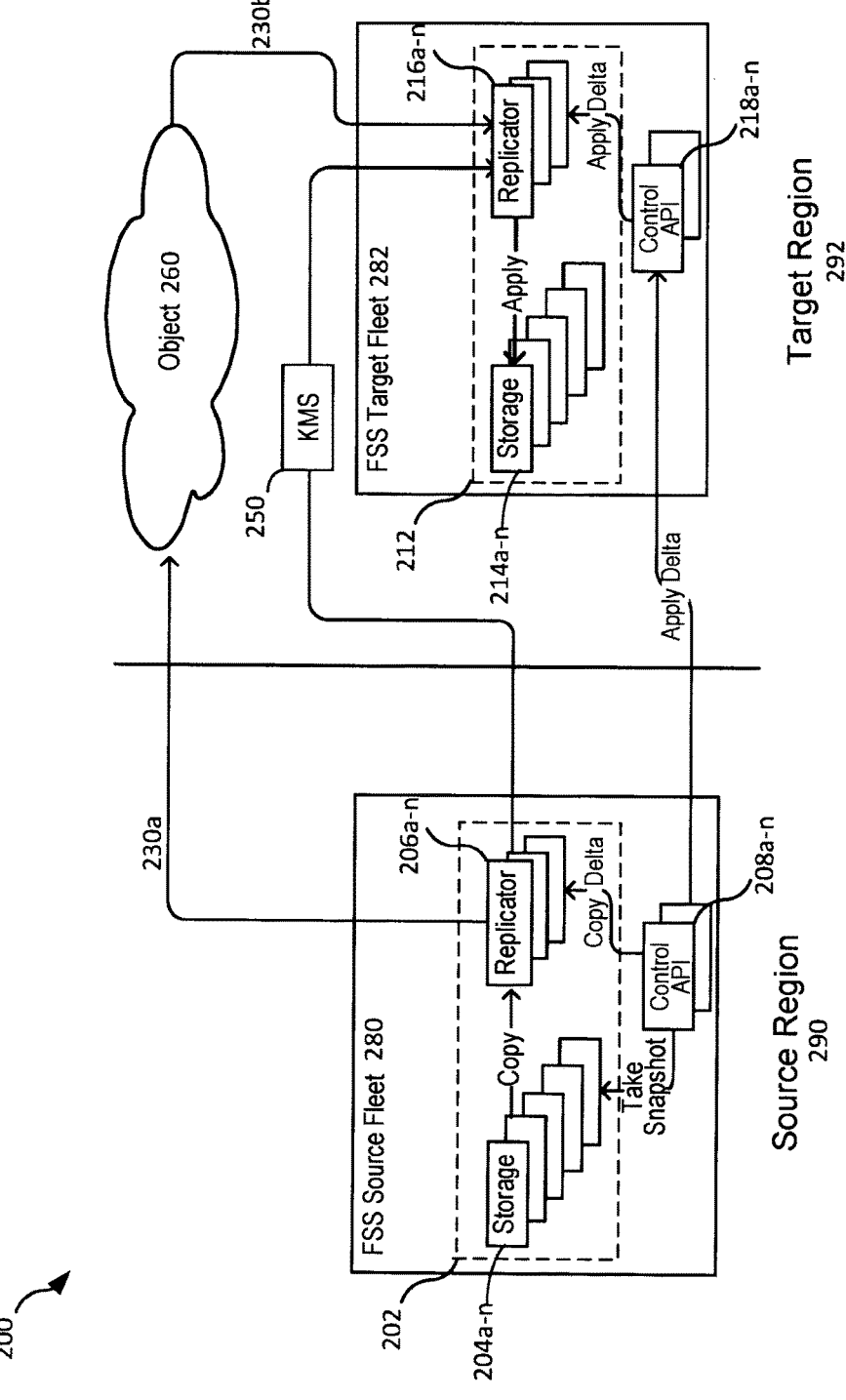
FIG. 2 is a simplified block diagram illustrating an architecture for cross-region remote replication, according to certain embodiments.

"Recovery time objective" (RTO), in certain embodiments, refers to the time duration users require for their replica to be available in a secondary (or target) region after a failure occurs in a primary (or source) region's availability domain (AD), whether the failure is planned or unplanned.

"Recovery point objective" (RPO), in certain embodiments, refers to a maximum acceptable tolerance in terms of time for data loss between the failure of a primary region (typically due to unplanned failure) and the availability of a secondary region.

A "replicator," in certain embodiments, may refer to a component (e.g., a virtual machine (VM)) in a file system's data plane, comprising cloud infrastructure resources (e.g., servers, storage, network, etc.), for either uploading deltas to a remote Object Store (i.e., an object storage service) if the component is located in a source region or downloading the deltas from the Object Storage for delta application if the component is located in a target region. Replicators may be formed as a fleet (i.e., multiple VMs or replicator threads)

called replicator fleet to perform cross-region (or x-region) replication process (e.g., uploading deltas to target region) in parallel.

A "delta generator" (DG), in certain embodiments, may refer to a component in a file system's data plane for either extracting the deltas (i.e., the changes) between the key-values of two snapshots in a balanced tree (B-trec) (or in some embodiments, a binary tree may be used) if the component is located in a source region or applying the deltas to the latest snapshot in a B-tree of the file system if the component is located in a target region. The delta generator in the source region may use several threads (called delta generator threads or range threads for multiple partitioned B-trec key ranges) to perform the extraction of deltas (or B-tree walk) in parallel. The delta generator in the target region may use several threads to apply the down-loaded deltas to its latest snapshot in parallel.

A "shared database" (SDB), for the purpose of the present disclosure and in certain embodiments, may refer to a key-value store through which components in both the control plane and data plane (e.g., replicator fleet) of a file system can read and write to communicate with each other. In certain embodiments, the SDB may be part of a B-trec.

A "file system communicator" (FSC), in certain embodiments, may refer to a file manager layer running on the storage nodes in a file system's data plane. The service helps with file create, delete, read and write requests, and works with a NFS server (e.g., Orca) to service IOs to clients. Replicator fleet may communicate with many storage nodes thereby distributing the work of reading/writing the file system data among the storage nodes.

A "blob," in certain embodiments, may refer to a data type for storing information (e.g., a formatted binary file) in a database. Blobs are generated during replication by a source region and uploaded to an Object Store (i.e., an object storage) in a target region. A blob may include B-tree keys and values and file data. Blobs in the Object Store are called objects. B-tree key-value pairs and their associated data are packed together in blobs to be uploaded to the Object Store in a target region.

A "manifest," in certain embodiments, may refer to information communicated by a file system in a source region (referred to herein as source file system) to a file system in a target region (referred to herein as target file system) for facilitating a cross-region replication process. There are two types of manifest files, master manifest and checkpoint manifest. A range manifest file (or master manifest file) is created by a source file system at the beginning of a replication process, describing information (e.g., B-tree key ranges) desired by the target file system. A checkpoint manifest file is created after a checkpoint in a source file system informing a target file system of the number of blobs included in a checkpoint and uploaded to the Object Store, such that the target file system can download the number of blobs accordingly.

"Deltas," in certain embodiments, may refer to a collection of changes to a file system by identifying the differences between two given snapshots after replicators recursively visiting every node of a B-tree (also referred to herein walking a B-tree). A delta generator identifies B-tree key-value pairs for the differences and traverses the B-tree nodes to obtain file data associated with the B-tree keys. A delta between two snapshots may contain multiple blobs. The term "deltas" may include blobs and manifests when used in the context of uploading information to an Object Store by a source file system and downloading from an Object Store by a target file system. The key-value pairs of a snapshot in the B-tree may contain metadata, not actual file data, which may be stored on disk.

An "object," in certain embodiments, may refer to a partial collection of information representing the entire deltas during a cross-region replication cycle and is stored in an Object Store. An object may be a few MBs in size stored in a specific location in a bucket of the Object Store. An object may contain many deltas (i.e., blobs and manifests). Blobs uploaded to and stored in the Object Store are called objects.

A "bucket," in certain embodiments, may refer to a container storing objects in a compartment within an Object Storage namespace (tenancy). In the present disclosure, buckets are used by source replicators to store secured deltas using server-side encryption (SSE) and also by target replicators to download for applying changes to snapshots.

"Delta application," in certain embodiments, may refer to the process of applying the deltas downloaded by a target file system to its latest snapshot to create a new snapshot. This may include analyzing manifest files, applying snapshot metadata, inserting the B-tree keys and values into its B-tree, and storing data associated with the B-tree keys (i.e., file data or data portion of blobs) to its local storage. Snapshot metadata is created and applied at the beginning of a replication cycle.

A "region," in certain embodiments, may refer to a logical abstraction corresponding to a geographic area. Each region can include one or more connected data centers. Regions are independent of other regions and can be separated by vast distances.

End-to-End Cross-Region Replication Architecture

End-to-end cross-region replication architecture provides novel techniques for end-to-end file storage replication and security between file systems in different cloud infrastructure regions. In certain embodiments, a file storage service generates deltas between snapshots in a source file system, and transfers the deltas and associated data through a high-throughput object storage to recreate a new snapshot in a target file system located in a different region during disaster recovery. The file storage service utilizes novel techniques to achieve scalable, reliable, and restartable end-to-end replication. Novel techniques are also described to ensure a secure transfer of information and consistency during the end-to-end replication.

In the context of the cloud, a realm refers to a logical collection of one or more regions. Realms are typically isolated from each other and do not share data. Within a region, the data centers in the region may be organized into one or more availability domains (ADs). Availability domains are isolated from each other, fault-tolerant, and very unlikely to fail simultaneously. ADs are configured such that a failure at one AD within a region is unlikely to impact the availability of the other ADs within the same region.

Current practices for disaster recovery can include taking regular snapshots and resyncing them to another filesystem in a different Availability Domain (AD) or region. Although resync is manageable and maintained by customers, it lacks a user interface for viewing progress, is a slow and serialized process, and is not easy to manage as data grow over time.

Accordingly, different approaches are needed to address these challenges and others. The cloud service provider (e.g., Oracle Cloud Infrastructure (OCI)) file storage replication disclosed in the present disclosure is based on incremental snapshots to provide consistent point-in-time view of an entire file system by propagating deltas of changing data from a primary AD in a region to a secondary AD, either in the same or different region. As used herein, a primary site (or source side) may refer to a location where a file system is located (e.g., AD, or region) and initiates a replication process for disaster recovery. A secondary site (or target side) may refer to a location (e.g., AD or region) where a file system receives information from the file system in the primary site during the replication process to become a new operational file system after the disaster recovery. The file system located in the primary site is referred to as the source file system, and the file system located in the secondary site is referred to as the target file system. Thus, the primary site, source side, source region, primary file system or source file system (referring to one of the file systems on the source side) may be used interchangeably. Similarly, the secondary site, target side, target region, secondary file system, or target file system (referring to one of the file systems on the target side) may be used interchangeably.

The File Storage Service (FSS) of the present disclosure supports full disaster recovery for failover or failback with minimal administrative work. Failover is a sequence of actions to make a secondary/target site become primary/source (i.e., start serving workloads) and may include planned and/or unplanned failover. A planned failover (may also refer to as planned migration) is initiated by a user to execute a planned failover from the source side (e.g., source region) to the target side (e.g., a target region) without data loss. An unplanned failover is when the source side stops unexpectedly due to, for example, a disaster, and the user needs to start using the target side because the source side is lost. A failback is to restore the primary/source side before failover to become the primary/source again. A failback may occur when, after a planned or unplanned failover and the trigger event (e.g., an outage) has ended, users like to reuse the source side as their primary AD by reversing the failover process. The users can resume either from the last point-in-time on the source side prior to the triggering event, or resume from the latest changes on the target side. The replication process described in the present disclosure can preserve the file system identity after a round-trip replication. In other words, the source file system, after performing a failover and then failback, can serve the workload again.

The techniques (e.g., methods, computer-readable medium, and systems) disclosed in the present disclosure include a cross-region replication of file system data and/or metadata by using consistent snapshot information to replicate the deltas between snapshots to multiple remote (or target) regions from a source region, then walking through (or recursively visit) all the keys and values in one or more file trees (e.g. B-trees) of the source file system (sometimes referred to herein as "walking a B-tree" or "walking the keys") to construct coherent information (e.g., the deltas or the differences between keys and values of two snapshots created at different time). The constructed coherent information is put into a blob format and transferred to a remote side (e.g., a target region) using object interface, for example Object Store (to be described later), such that the target file system on the remote side can download immediately and start applying the information once it detects the transferred information on the object interface. The process is accomplished by using a control plane, and the process can be scaled to thousands of file systems and hundreds of replication machines. Both the source file system and the target file system can operate concurrently and asynchronously. Operating concurrently means that the data upload process by the source file system and the data download process by the target file system may occur at the same time. Operating asynchronously means the source file system and the target file system can each operates at their own pace without waiting for each other at every stage, for example, different start time, end time, processing speed, etc.

In certain embodiments, multiple file systems may exist in the same region and are represented by the same B-tree. Each of these file systems in the same region may be replicated across regions independently. For example, file system A may have a set of parallel running replicator threads walking a B-tree to perform replication for file system A. File system B represented by the same B-tree may have another set of such parallel running replicator threads walking the same B-tree to perform replication for file system B.

With respect to security, the cross-region replication is completely secure. Information is securely transferred, and securely applied. The disclosed techniques provide isolation between the source region and the target region such that keys are not shared unencrypted between the two. Thus, if the source keys are comprised, the target is not affected. Additionally, the disclosed techniques include how to read the keys, convert them into certain formats, and upload and download them securely. Different keys are created and used in different regions, so separate keys are created on the target and applied to information in a target-centric security mechanism. For example, the FSS generates a session key, which is valid for only one replication cycle or session, to encrypt data to be uploaded from the source region to the Object Store, and decrypt the data downloaded from the Object Store to the target region. Separate keys are used locally in the source region and the target region.

In the disclosed techniques, each upload and download process through the Object Store during replication has different pipeline stages. For example, the upload process has several pipeline stages, including walking a B-tree to generate deltas, accessing storage IO, and uploading data (or blobs) to the Object Store. The download process has several pipeline stages, including downloading data, applying deltas to snapshots, and storing data in storage. Each of these pipelines also has parallel processing threads to increase the throughput and performance of the replication process. Additionally, the parallel processing threads can take over any failed processing threads and resume the replication process from the point of failure without restarting from the beginning. Thus, the replication process is highly scalable and reliable.

FIG. 1 depicts an example concept of recovery point objective (RPO) and recovery time objective (RTO) for an unplanned failover, according to certain embodiments. RPO is the maximum tolerance for data loss (usually specified as minutes) between the failure of a primary site and the availability of a secondary site. As shown in FIG. 1, the primary site A 102 encounters an unplanned incident at time 110, which triggers a failover replication process by copying the latest snapshot and its deltas to the secondary site B 104. The initially copied information reaches the secondary site B 104 at time 112. The primary site A 102 completes its copying of information to the secondary site B 104 at time 114, and the secondary site B 104 completes its replication process at time 116. Thus, the secondary site B 104 becomes fully operational at time 116. As a result, the user's data is not accessible in the primary site A 110, starting from point 110 until point 116, when that data is available again. Therefore, RPO is the time between point 110 and point 116. For example, if there is 10-minute worth of data that a user does not care about, then RPO is 10 minutes. If the data loss is more than 10 minutes, the RPO is not met. A zero RPO means a synchronous replication.

RTO is the time it takes for the secondary to be fully operational (usually specified as minutes), so a user can access the data again after the failure happens. It is considered from the secondary site's perspective. Referring back to FIG. 1, the primary site A 102 starts the failover replication process at time 120. However, the secondary site B 104 is still operational until time 122 when it is aware of the incident (or outage) at the primary site A 102. Therefore, the secondary site B 104 stops its service at time 122. Using the similar failover replication process described for RPO, the secondary site B 104 becomes fully operational at time 126. Therefore, the RTO is the time between 122 and 126. The secondary site B 104 can now assume the role of the primary site. However, for customers who use primary site A 102, the loss of service is between time 120 and 126.

The primary (or source) site is where the action is happening, and the secondary (or target) site is inactive and not usable until there is a disaster. However, customers can be provided some point in time for them to continue to use for testing-related activities in the secondary site. It's about how customers set up the replication and how they can start using the target when something goes wrong, and how they come back to the source once their sources have failover.

FIG. 2 is a simplified block diagram illustrating an architecture for cross-region remote replication, according to certain embodiments. In FIG. 2, the end-to-end replication architecture illustrated has two regions, a source region 290 and a target region 292. Each region may contain one or more file systems. In certain embodiments, the end-to-end replication architecture includes data planes 202 & 212, control planes (only control APIs 208a-n & 218a-n are shown), local storages 204 & 214, Object Store 260, and Key Management Service (KMS) 250 for both source region 290 and target region 292. FIG. 2 illustrates only one file system 280 in the source region 290, and one file system 282 in the target region 292 for simplicity. If there is more than one file system in a region, the same replication architecture applies to each pair of source and target file systems. In certain embodiments, multiple cross-region replications may occur concurrently between each pair of source and target file systems by utilizing parallel processing threads. In some embodiments, one source file system may be replicated to different target file systems located in the same target region. Additionally, file systems in a region may share resources. For example, KMS 250, Object Store 260, and certain resources in data plane may be shared by many file systems in the same region depending on implementations.

The Data planes in the architecture includes local storage nodes 204a-n & 214a-n and replicators (or a replicator fleet) 206a-n & 216a-n. A control API host in each region does all the orchestration between different regions. The FSS receives a request from a customer to set up a replication between a source file system 280 and a target file system 282 to which the customer wants to move its data. The control plane 208 gets the request, does the resource allocation, and informs the replicator fleet 206a-n in the source data plane 202 to start uploading the data 230a (or may be referred to as deltas being uploaded) from different snapshots to an object storage 260. APIs are available to help customers set replication time objective and recovery time objective (RTO). The replication model disclosed in the present disclosure is a "push based" model based on snapshot deltas, meaning that the source region initiates the replication.

As used herein, the data 230*a* and 230*b* transferred between the source file system 280 and the target file system 282 is a general term, and may include the initial snapshot, keys and values of a B-tree that differ between two snapshots, file data (e.g., fmap), snapshot metadata (i.e., a set of snapshot B-tree keys that reflect various snapshots taken in the source file system), and other information (e.g., manifest files) useful for facilitating the replication process.

Turning to the data planes of the cross-region replication architecture, a replicator is a component in the data plane of a file system. It performs either delta generation or delta application for that file system depending on the region where the file system locates. For example, replicator fleet 206 in a source region file system 280 performs delta 230*a* generation and replication. Replicator fleet 216 in a target region file system 282 downloads deltas 230*b* and applies them to the latest snapshot in the target region file system 282. The target region file system 282 can also use its control plane and workflows to ensure end-to-end transfer.

All the incremental work is based on the snapshot, an existing resource in file storage as a service. A snapshot is a point in time, data point, or picture of what is happening in the file system, and performed periodically in the source region file system 280. For a very first replication, the FSS takes the base snapshot (e.g., no replication has ever been taken), which is a snapshot of all the content of the source file system, and transfers all of that content to the target system. In other words, replicators read from the storage layer for that specific file system and puts all the data in object storage buckets.

Once the data plane 202 of the source file system 280 uploads all the data 230*a* to the object storage (or Object Store) 260, the source side control plane 208 will notify the target side control plane 218 that there is a new work to be done on the target side, which is then relayed to the replicators of the target side. Target side replicators 216*a-n* then start downloading the objects (e.g., initial snapshot and deltas) from the object storage bucket 260 and applying the deltas captured on the source side.

If it is a base copy (e.g., the whole file system content up to the point of time, for example, ranging from past five days to five years), the upload process may take longer. To help achieve service level objective about time and performance, the source system 280 can take replication snapshot at a specific duration, such as one hour. The source side 280 can then transfer all data within that one hour to the target side 282, and take a new snapshot every one hour. If there are some caches with a lot of changes, the replication may be set to a lower replication interval.

To illustrate the above discussion, consider a scenario that a first snapshot is created in a file system in a source region (called source file system). Replication is performed regularly; thus, the first snapshot is replicated to a file system in a target region (called the target file system). When some updates are performed in the source file system afterward, a second snapshot is created. If an unplanned outage occurs after the second snapshot is created, the source file system will try to replicate the second snapshot to the target file system. During the failover, the source file system may identify the differences (i.e., deltas) between the first and second snapshots, which include the B-tree keys and values and their associated file data in a B-tree representing both the first and second snapshots. The deltas 230*a* & 230*b* are then transferred from the source file system to the target file system through an Object Store 260 in the target region for the target file system to re-create the second snapshot by applying the deltas to its previously established first snapshot in the target region. Once the second snapshot is created in the target file system, the replication process of the failover completes, and the target file system is ready to operate.

Turning to control plan and its Application Programming Interfaces ("API"), a control plane provides instructions for data plane which includes replicators as the executor that performs the instructions. Both storage (204 & 214) and replicator fleet (206 & 216) are in the data planes. Control plane is not shown in FIG. 2. As used herein a "cycle" may refer to a time duration beginning at the time when a source file system 280 starts transferring data 230*a* to a target file system 282 and ending at the time when the target file system 282 receives all data 230*b* and completes its application of the received data. The data 230*a-b* is captured on the source side, and then applied on the target side. Once all changes on the target side are applied for a cycle, the source file system 280 takes another snapshot and starts another cycle.

Control APIs (208*a-n* & 218 *a-n*) are a set of hosts in the control plane's overall architecture, and perform file system configuration. Control APIs are responsible for communicating state information among different regions. State machines that keep track of various state activities within regions, such as the progress of jobs, locations of keys and future tasks to be performed, are distributed among multiple regions. All of these information is stored in control plane of each region, and are communicated among regions through the control APIs. In other words, the state information is about the lifecycle details, details of the delta, and the lifecycle of the resources. The state machines can also track the progress of the replication and work with the data plan to help estimate the time taken for replication. Thus, the state machines can provide status to the users on whether replications are proceeding on time and the health of jobs.

Additionally, the communication between control APIs (208*a-n*) of the source file system 280 and control APIs (218*a-n*) of target file system 218 in different regions includes the transfer of snapshots, and metadata to make exact copies from the source to the target. For example, when a customer takes snapshots periodically in the source file system, the control plane can ensure the same user snapshots are created on the target file system, including metadata tracking, transferring, and recreation.

Object Store 260 (also referred to herein as "Object") in FIG. 2 is an object storage service (e.g., Oracle's object storage service) allowing to read blobs, and write files for archival purposes. The benefits of using Object Store are: first, it is easy to configure; second, it is easy to stream data into the Object Store; and third, it has the benefit of security streaming as a reliable repository to keep information; all because there is no network loss, the data can be immediately downloaded and is permanently there. Although direct communication between Replicators in the source and target regions is possible, direct communication requires a cross-region network setup, which is not scalable and hard to manage.

For example, if there is a large amount of data to be moved from source to target, the source can upload it to the Object Store 260, and the target 282 does not have to wait for all the information to be uploaded to the Object Store 260 to start downloading. Thus, both source 280 and target 282 can operate concurrently and continuously. The use of Object Store allows the system to scale and achieve faster throughput. Furthermore, key management service (KMS) 250 can control the access to the Object Store 260 to ensure security. In other words, the source tries to move the data out of the source region as fast as possible, and persist the data somewhere before the data can be applied to the target such that the data is not lost.

Compared to using a network pipe which has packet loss and recovery issues, the utilization of Object Store 260 between the source and target regions enables continuous data streaming that allows hundreds of file systems from the source region to write to the Object Store, while at the same time, the target region can apply hundreds of files concurrently. Thus, the data streaming through the Object Store can achieve high throughput. Additionally, both the source and target regions can operate at their own rates for uploading and downloading.

Whenever a user changes certain data in the source file system 280, a snapshot is taken, and deltas before and after the change is updated. The changes may be accumulated on the source file system 280 and streamed to the Object Store 260. The target file system 282 can detect that data is available in the Object Store 260 and immediately download and apply the changes to its file system. In some embodiments, only the deltas are uploaded to the object storage after the base snapshot.

In some embodiments, replicators can communicate to many different regions (e.g., Phoenix to Ashburn to other remote regions), and the file system can manage many different endpoints on replicators. Each replicator 206 in the source file system 280 can keep a cache of these object storage endpoints, and also works with KMS 250 to generate transfer keys (e.g., session keys) to encrypt data address for the data in the Object Storage 260 (e.g., Server Side Encryption or SSE) to secure data stored in the buckets. One master bucket is for every AD in a target region. A bucket is a container storing objects in a compartment within an Object Storage namespace (tenancy). All remote clients can communicate to a bucket and write information in a particular format so that each file system's information can be uniquely identified to avoid mixing up the data for different customers or file systems.

The Object Store 260 is a high-throughput system and the techniques disclosed in the present disclosure can utilize the Object Store. In certain embodiments, the replication process has several pipeline stages, B-tree walk in the source file system 280, storage IO access, data upload to the Object Store 260, data download from the Object Store 260, and delta application in the target file system 282. Each stage has parallel processing threads involved to increase the performance of data streaming from the source region 290 to a target region 292 through the Object Store 260.

In certain embodiments, each file system in the source region may have a set of replicator threads 206*a-n* running in parallel to upload deltas to the Object Store 260. Each file system in the target region may also have a set of replicator threads 216*a-n* running in parallel to download deltas from the Object Store 260. Since both the source side and the target side operate concurrently and asynchronously, the source can upload at fast as possible, while the target can start downloading once the target detects the deltas are available in the Object Store. The target file system then applies the deltas to the latest snapshot and deletes the deltas in the Object Store after its application. Thus, the FSS consumes very little space in the Object Store, and the Object Store has very high throughput (e.g., gigabytes of transfer).

In certain embodiments, multiple threads also run in parallel for storage IO access (e.g., DASD) 204*a-n* & 214*a-n*. Thus, all processing related to the replication process, including accessing the storage, uploading snapshots and data 230*a* from the source file system 280 to the Object Store 260, and downloading the snapshots and data 230*b* to the target file system 282, have multiple threads running in parallel to perform the data streaming.

File storage is an AD local service. When a file system is created, it is in a specific AD. For a customer to transfer or replicate data from one file system to another file system within the same region or different regions, an artifact (also referred to as manifest) transfer may need to be used.

As an alternative to transferring data using Object Store, VCN peering may be used to set up network connections between remote machines (e.g., between replicator nodes of source and target) and use Classless Inter-Domain Routing ("CIDR") for each region.

Referring back to FIG. 2, Key Management System (KMS) 250 is a security for the replication, and provides storage service for cloud service providers (e.g., OCI). In certain embodiments, the file systems 280 at the source (or primary) side and target (or secondary) side use separate KMS keys, and the key management is hierarchical. The reason for using separate keys is that if the source is compromised, the bad actor cannot use the same keys to decrypt the target. The FSS has a three-layer key architecture. Because the source and target use different keys when transferring data, the source needs to decrypt the data first, re-encrypt with an intermediate key, and then re-encrypt the data on the target side. FSS defines sessions, and each session is one data cycle. A key is created for that session to transfer data. In other words, a new key is used for each new session. In other embodiments, a key may be used for more than one session (e.g., more than one data transfer) before creating another key. No key is transferred through the Object Store 260, and the keys are available only in the source side, and not visible outside the source for security reasons.

A replication cycle (also referred to as a session) is periodic and adjustable. For example, once every hour, the replicators (206*a-n* & 216*a-n*) perform a replication. A cycle starts when a new snapshot is created in the source side 280, and ends when all deltas 230*b* have been applied in the target side 282 (i.e., the target reaches DONE state). Each session completes before another session starts. Thus, only one session exists at any time, and there is no overlap between sessions.

Secret management (i.e., replication using KMS) handles secret material transfer between the source (primary) file system 290 and the target (or secondary) file system 292 utilizing KMS 250. The source file system 280 computes deltas, reads file data, and then uses local file system encryption keys, and works with Key Management Service to decrypt the file data. Then, the source file system 280 generates a session key (called delta encryption key (DEK)), encrypts it to become an encrypted session key (called delta transfer key (DTK)), and transfers the DTK to the target file system 282 through their respective control planes 208 & 218. The source file system 280 also uses DEK to encrypt data 230*a* and upload them to the Object Store 260 through Transport Layer Security (TLS) protocol. The Object Store 260 then uses server side encryption (SSE) to ensure the security of the data (e.g., deltas, manifests, and metadata) 230*a* for storing.

The target file system 282 obtains the encrypted session key DTK securely through its control plane 218 (using HTTPS via cross-region API communication), decrypts it via KMS 250 to obtain DEK, and places it in a location in the target region 292. When a replication job is scheduled in the target file system 282, the DEK is given to the replicator (one of the replication fleet 216*a-n*), and the replicator uses the key to decrypt the data (e.g., deltas including file data) 230*b* download from the Object Store 260 for application and re-encrypts file data with its local file system keys.

The replication between the source file system 280 and target file system 282 is a concurrent process, and both the source file system 280 and target file system 282 operate at their own pace. When the source side completes the upload, which may occur earlier than the target's download process, the source side cleans up its memory and remove all the keys. The term, cleanup or cleaning up, may refer to removing or deleting. When the target completes its application of the deltas to its latest snapshot, it cleans up its memory and removes all keys as well. The FSS service also releases the KMS key. In other words, there are two copies of the session key, one in the source file system 280 and another in the target file system 282. Both copies are removed by the end of each session, and a new session key is generated in the next replication cycle. This process ensures that the same keys are not used for different purposes. Additionally, the session key is encrypted by a file system key to create a double protection. This is to ensure only a particular file system can use this session key.

Figure 3:
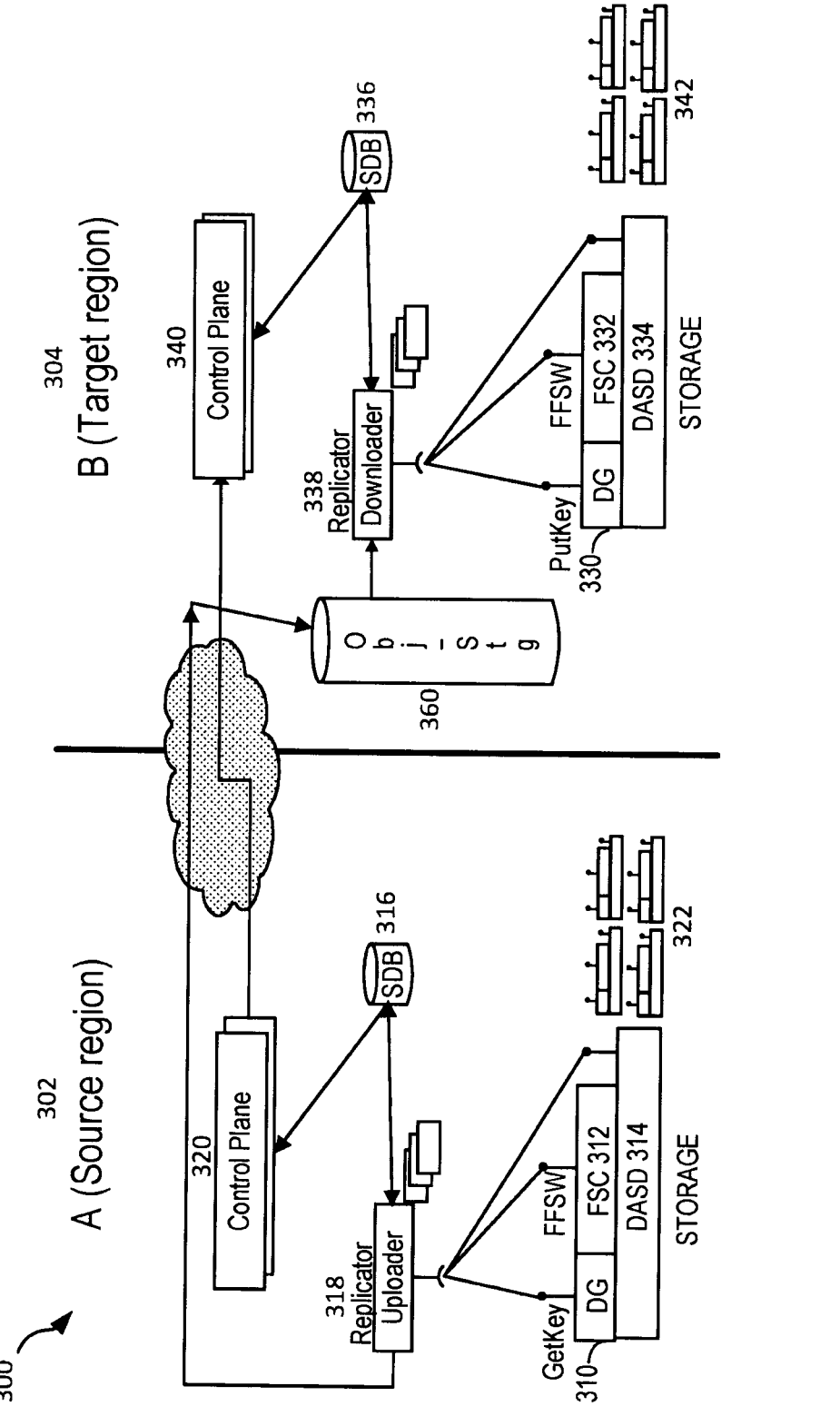
FIG. 3 is a simplified schematic illustration of components involved in cross-region remote replication, according to certain embodiments.

FIG. 3 is a simplified schematic illustration of components involved in cross-region remote replication, according to certain embodiments. In certain embodiments, a component called delta generator (DG) 310 in source region A 302 and 330 in target region B 304 is part of the replicator fleet 318 and runs on thousands of storage nodes in the fleet. A replicator 318 in source region A does Remote Procedural Call (RPC) (e.g., getting key-value set, lock blocks, etc.) to a delta generator 310 to collect B-tree keys and values, and data pages from Direct-Access Storage Device (DASD) 314, which is a replication storage service for accessing the storage, and considered a data server. The DG 310 in source region A is a helper to the replicator 318 to break the key ranges for a delta and pack all the key/values for a given range into a blob to be sent back to the replicator 318. There are multiple storage nodes 322 & 342 attached to DASDs 314 & 334 in both regions, where each node has many disks (e.g., 10 TBs or more).

In certain embodiments, the file system communicators (FSC) 312 & 332 in both regions is a metadata server that helps update the source file system for user updates to the system. FSCs 312 & 332 are used for file system communication, and the delta generator 310 is used for replication. Both the DGs 310 & 330 and the FSCs 312 & 332 are metadata servers. User traffic goes through the FSCs 312 & 332 and DASDs 314 & 334, while replication traffic goes through the DGs. In an alternative embodiment, the FSC's function may be merged into that of DG.

In certain embodiment, a shared databases (SDBs) 316 & 336 of both regions are key-value stores that the components through which both the control plane and data plane (e.g., replicator fleet) can read and write for them to communicate with each other. Control planes 320 & 340 of both regions may queue a new job into their respective shared databases 316 & 336, and replicator fleet 318 & 338 may read the queues in the shared databases 316 & 336 constantly and start file system replication once the replicator fleet 318 & 338 detect the job request. In other words, the shared databases 316 & 336 are a conduit between the replicator fleet and the control planes. Further, the shared databases 316 & 336 are a distributed resource throughout different regions, and the IO traffic to/from the shared databases 316 & 336 should be minimized. Similarly, the IO traffic to/from DASD needs to be minimized to avoid affecting the user's performance. However, the replication process may occasionally be throttled because it is a secondary service, compared to the primary service.

Replicator fleet 318 in source region A can work with DG 310 to start walking B-tree in the file system in source region A to collect key-values and convert them into flat files or blobs to be uploaded to the Object Store. Once the data blobs (including key-values and actual data) are uploaded, the target can immediately apply them without waiting for a large number of blobs to be present in the Object Store 360. The Object Store 360 is located in the target region B for disaster recovery reasons. The goal is to push from source to the target region B as soon as possible and keep the data safe.

There are many replicators to replicate thousands of file systems by utilizing low-cost machines with smaller footprints to optimize the space, and scheduling as many replications as possible while ensuring a fair share of bandwidth among them. Replicator fleet 318 & 338 in both regions run on virtual machines that can be scaled up and down automatically to build an entire fleet for performing replication. The replicators and replication service can dynamically adjust based on the capacity to support each job. If one replicator is heavily loaded, another can pick up to share the load. Different replicators in the fleet can balance load among themselves to ensure the jobs can continue and do not stop due to overloading individual replicators.

Figure 4:
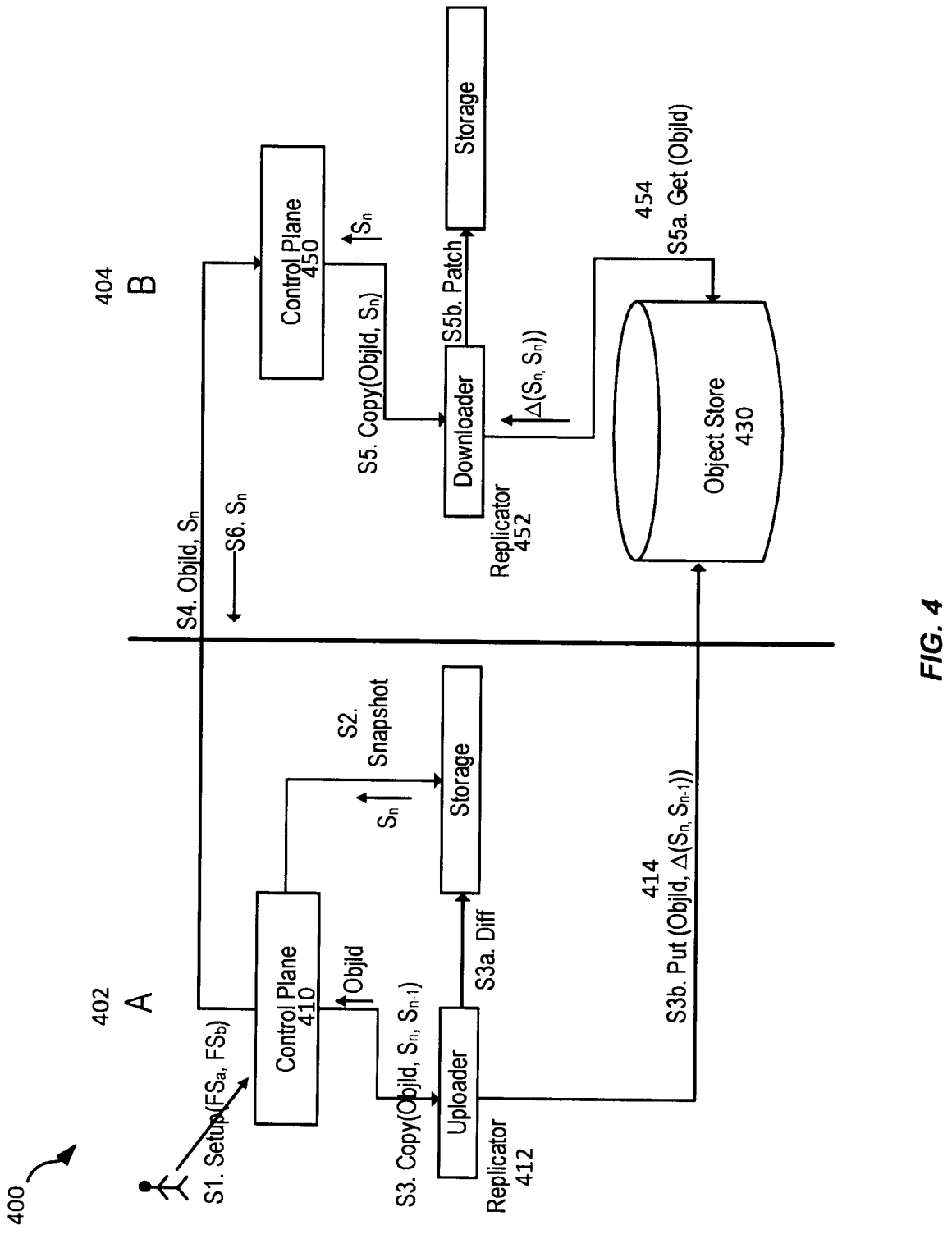
FIG. 4 is a simplified flow diagram illustrating the steps executed during cross-region remote replication, according to certain embodiments.

FIG. 4 is a simplified flow diagram illustrating the steps executed during cross-region remote replication, according to certain embodiments.

Step S1: When a customer sets up replication, the customer provides the source (or primary) file system (A) 402, target (or secondary) file system (B) 404 and the RPO. A file system is uniquely identified by a file system identification (e.g., Oracle Cloud ID or OCID), a globally unique identifier for a file system. Data is stored in the file storage service ("FSS") control plane database.

Step S2: Source (A) control plane (CP-A) 410 orchestrates creating system snapshots periodically at an interval (smaller than RPO) and notifies the data plane (including replicator/uploader 412) the latest snapshot, and the last snapshot that was successfully copied to the target (B) file system 404.

Step S3: CP-A 410 notifies replicator 412 (or uploader), a component in the data plane, to copy the latest snapshot:

S3*a*: Replicator 412 in Source (A) walks the B-Tree to compute the deltas between the two given snapshots. The existing key infrastructure is used to decrypt the file system data.

S3*b*: These deltas 414 are uploaded to the Object Store 430 in target (B) region (the data may be compressed, and/or de-duplicated during the copy). This upload may be performed by multiple replicator threads 412 in parallel.

Step S4: CP-A 410 notifies the target (B) control plane (CP-B) 450 about the completion of the upload.

Step S5: CP-B 450 calls the target replicator-B 452 (or downloader) to apply the deltas:

S5*a*: Replicator-B 452 downloads the data 454 from Object Store 430.

S5*b*: Replicator-B 452 applies these deltas to the target file system (B).

Step S6: CP-A 410 is notified of the new snapshot now available on target (B) after the delta application is complete.

Step 7: The cross-region remote replication process repeats from step S2 to step S6.

Figure 5:
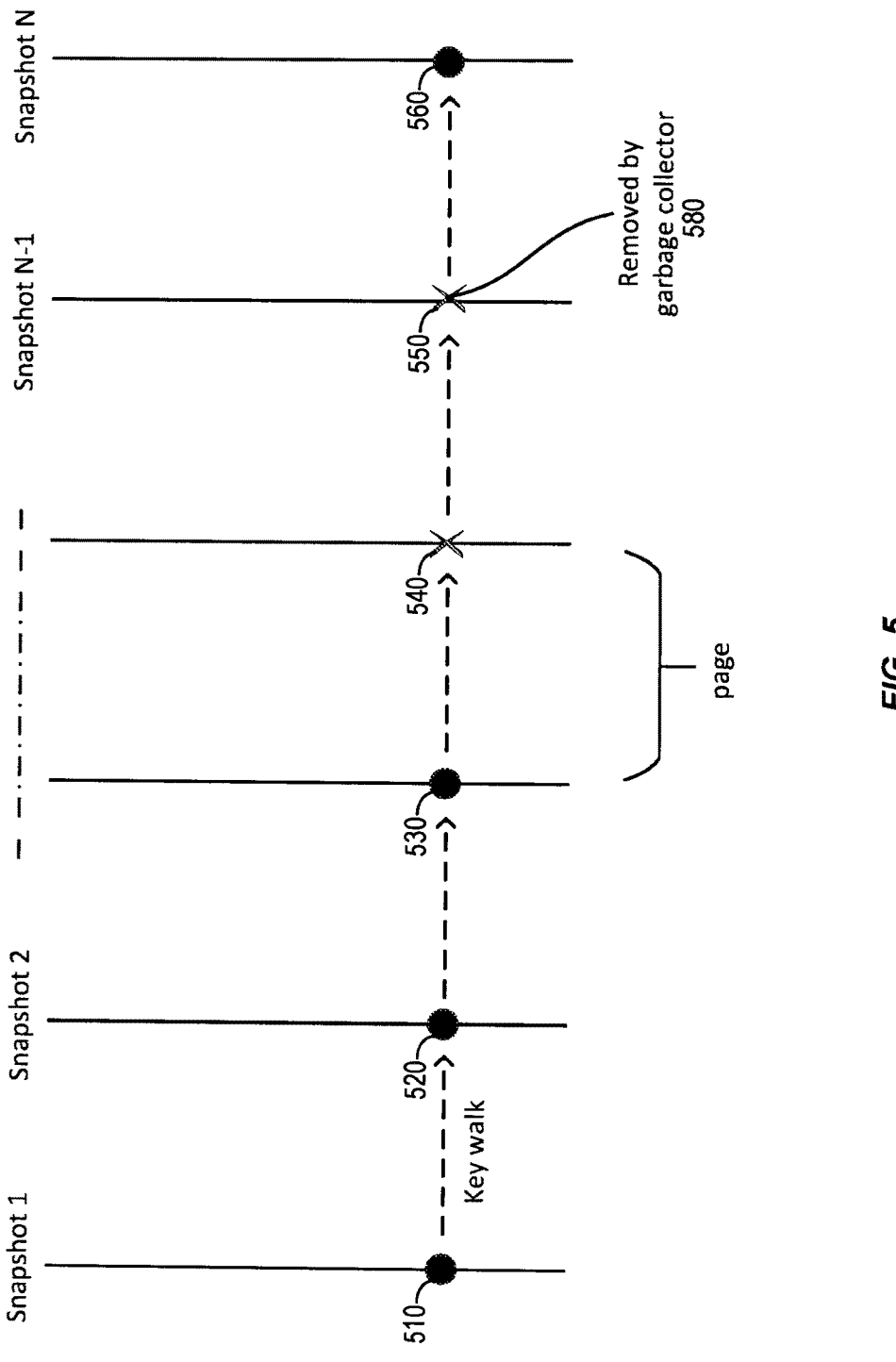
FIG. 5 is a simplified diagram illustrating the high-level concept of B-tree walk, according to certain embodiments.

FIG. 5 is a simplified diagram illustrating the high-level concept of B-tree walk, according to certain embodiments. B-tree structure may be used in a file system. A delta generator walks the B-tree and guarantees consistency for the walk. In other words, the walk ensures that the key-values are what is expected at the end of the walk and captures all information between any two snapshots, such that no data corruption may occur. The file system is a transactional type of file system that may be modified, and the users need to know about the modification and redo the transactions because another user may update the same transaction or data.

Key-values and snapshots are immutable (e.g., cannot be modified except garbage collector can remove them). As illustrated in FIG. 5, there are many snapshots (snapshot 1~snapshot N) in the file systems. When a delta generator is walking the B-tree keys (510~560) in a source file system, snapshots may be removed because a garbage collector 580 may come in to clean the keys of the snapshots that deem as garbage. When a delta generator walks the B-trec keys, it needs to ensure the keys associated with the remaining snapshots (e.g., not removed by the garbage collector) are copied. When keys, for example, 540 and 550, are removed by garbage collector 580, the B-tree pages may shrink, for example from two pages before garbage collection down to one page after garbage collection. The way a delta generator can ensure consistency when walking B-tree keys is to confirm that the garbage collector 580 has not modified or deleted any keys for the page (or a section between two snapshots) that the delta generator has just walked (e.g., between two keys). Once the consistency is confirmed, the delta generator collects the keys and sends them to replicator to process and upload.

The B-tree keys may give a picture of what has changed. The techniques disclosed in the present disclosure can determine what B-tree keys are new and what have been updated between two snapshots. A delta generator may collect the metadata part, keys and values, and associated data, then send to the target. The target can figure out that the received information is between two snapshot ranges and applies in the target file system. After the delta generator (or delta generator threads) walks a section between two keys and confirms its consistency, it uses the last ending key as the next starting key for its next walk. The process is repeated until all keys have been checked, and the delta generator collects the associated data every time consistency is confirmed.

For example, in a file system, when a file is modified (e.g., created, deleted, and then re-created), this process creates several versions of corresponding file directory entries. During a replication process, the garbage collector may clean up (or remove or delete) a version of the file directory entry corresponding to the deleted file and cause a consistency problem called whiteout. Whiteout occurs if there is an inconsistency between the source file system and the target file system, because the target file system may fail to reconstruct the original snapshot chain involving the modified file. The disclosed techniques can ensure the consistency between the source file system and the target file system by detecting a whiteout file (i.e., a modified file affected by the garbage collector) during B-tree walk, retrieving an unaffected version of the modified file, and providing relevant information to the target file system during the same replication cycle to properly reconstruct the correct snapshot chain.

Figure 6B:
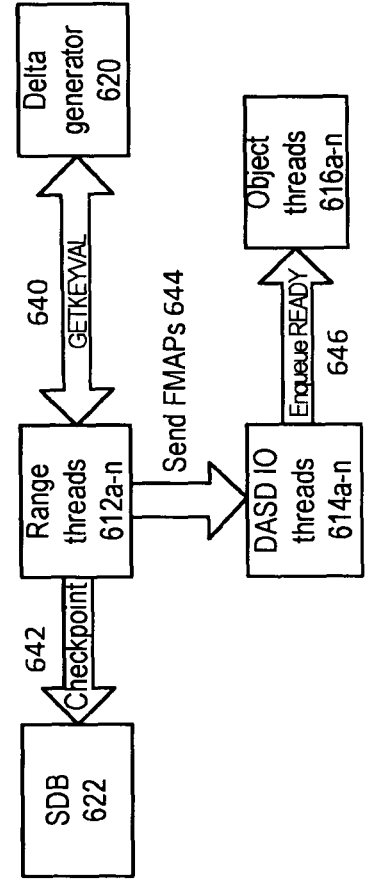
FIG. 6B is a diagram illustrating pipeline stages of cross-region replication, according to certain embodiments.
Figure 6A:
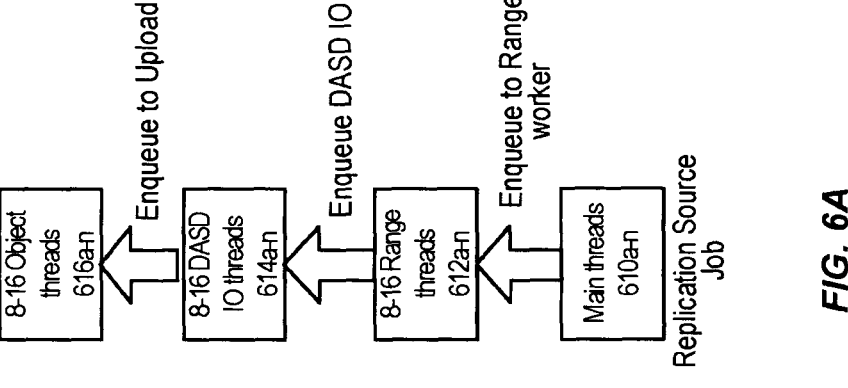
FIG. 6A is a diagram illustrating pipeline stages of cross-region replication, according to certain embodiments.

FIGS. 6A and 6B are diagrams illustrating pipeline stages of cross-region replication, according to certain embodiments. The cross-region replication for a source file system disclosed in the present disclosure has four pipeline stages, namely initiation of the cross-region replication, B-tree walk in the source file system (i.e., delta generation pipeline stage), storage IO access for retrieving data (i.e., data read pipeline stage), data upload to the Object Store (i.e., data upload pipeline stage), in the source file system. The target file system has similar four pipeline stages but in reverse order, namely preparation of cross-region replication, data download from the Object Store, delta application in the target file system, and storage IO access for storing data. FIG. 6A illustrates the four pipeline stages in the source file system, but a similar concept applies to the target file system. FIG. 6B illustrates the interaction among the processes and components involved in the pipeline stages. All of these pipeline stages may operate in parallel. Each pipeline stage may operate independently and hand off information to the next pipeline stage when the processing in the current stage completes. Each pipeline stage is ensured to take a share of the entire bandwidth and not use more than necessary. In other words, resources are allocated fairly among all jobs. If no other job is working in the system, the working job can get as many resources as possible.

The threads in each pipeline stage also perform their tasks in parallel (or concurrently) and independently of each other in the same pipeline stage (i.e., if a thread fails, it will not affect other threads) . . . . Additionally, the tasks (or replication jobs) performed by the threads in each pipeline stage are restartable, which means when a thread fails, a new thread (also referred to as substitute thread) may take over the failed thread to continue the original task from the last successful point.

In some embodiments, a B-tree walk may be performed with parallel processing threads in the source file system 280. A B-tree may be partitioned into multiple key ranges between the first key and the last key in the file system. The number of key ranges may be determined by customers. Multiple range threads (e.g., around 8 to 16) per file system may be used for the B-tree walk. One range thread can perform the B-tree walk for a key range, and all range threads operate concurrently and in parallel. The number of threads to be used depends on factors such as the size of the file system, availability of resources, and bandwidth in order to balance the resource and traffic congestion. The number of key ranges is usually more than the number of range threads available to utilize the range threads fully. Thus, the B-tree walk can be scalable and processed by concurrent parallel walks (e.g., with multiple threads).

If some keys are not consistent after the delta generator walks a page because some keys do not exist, the system may drop a transaction that is in progress and has not been committed yet, and go back to the starting point to walk again. During the repeat B-tree walk due to inconsistency, the delta generator may ignore the missing keys and their associated data by not collecting them to minimize the amount of information to be processed or uploaded to the target side since these associated data are deemed garbage. Thus, the B-tree walk and data transfer can be more efficient. Additionally, a delta generator does not need to wait for the garbage collector to remove the information to be deleted before walking the B-tree keys. For example, keys have dependencies on each other. If a key or an iNode points to a block that is deleted or should be deleted by the garbage collector, the system (or delta generators) can figure out by itself that the particular block is garbage and delta generators do not need to carry it.

Delta generators typically do not modify anything on the source side (e.g., does not delete the keys or blocks of data deemed garbage) but simply does not copy them to the target side. The B-tree walk process and garbage collection are asynchronous processes. For example, when a block of data that a key points to no longer exists, the file system can flag the key as garbage and note that it should not be modified (e.g., immutable), but only the garbage collector can remove it. A delta generator can continue to walk the next key without waiting for the garbage collector. In other words, delta generators and garbage collectors can proceed at their own pace.

In FIG. 6A, when a source region initiates a cross-region replication process, which may involve many file systems, main threads 610a-n pick up the replication jobs, one job per file system. A main thread (e.g., 610a or 610 for later use) of a file system in the source region (i.e., source file system) communicates to delta generator 620 (shown in FIG. 6B) to obtain the number of key ranges requested by a customer, and update a corresponding record in SDB 622. Once the main thread 610 of the source file system figures out the required number of key ranges, it further creates a set of range threads 612a-n based on the required number of key ranges. These range threads 612a-n are performed by the delta generator 620. They initialize their GETKEYVAL buffers 640 (shown in FIG. 6B), update their checkpoint records 642 in SDB 622 (shown in FIG. 6B), and perform storage IO access 644 by interacting with DASD IO threads 614a-n.

In certain embodiments, each main thread 610 is responsible for overseeing all the range threads 612a-n it creates. During the replication, the main thread 610 may generate a master manifest file outlining the whole replication. The range threads 612a-n generate a range manifest file including the number of key ranges (i.e., a sub-division of the whole replication), and then checkpoint manifest (CM) files for each range to provide updates to the target file system about the number of blobs per checkpoint, where checkpoints are created during the B-tree walk. One checkpoint is created by a range thread 612. Once the main thread 610 determines all the range threads 612a-n have been completed, it creates a final checkpoint manifest (CM) file with an end-of-file marking, and then uploads the CM file to the Object Store for the target file system to figure out the progress in the source file system. The CM file contains a summary of all individual ranges, such as range count, the final state of checkpoint record, and other information.

The range threads 612a-n are used for parallel processing to reduce time significantly for the B-tree walk for a big source file system. In certain embodiments, the B-tree keys are partitioned into roughly equal-sized ranges. One range thread can perform the B-tree walk for a key range. The number of range threads 612a-n to be used depends on factors such as the size of the file system, availability of resources and bandwidth to balance the resource, amount of data to generate and traffic congestion. The number of key ranges are usually more than the number of range threads 612a-n available to fully utilize the range threads, around 2× to 4× ratio. Each of the range threads 612a-n has a dedicated buffer (GETKEYVAL) 640 containing available jobs to work on. Each range thread 612 operates independent of other range threads, and updates its checkpoint records 642 in SDB 622 periodically.

When the range threads 612a-n are walking the B-tree (i.e., recursively visiting every node of the B-tree), they may need to collect file data associated (e.g., FMAP) with B-tree keys and request IO access 644 to storage. These IO requests are enqueued by each range thread 612 to allow DASD IO threads 614a-n (i.e., data read pipeline stage) to work on them. These DASD IO threads 614a-n are common threads shared by all range threads 612a-n. After DASD IO threads 614a-n have obtained the requested data, the data is put into an output buffer 646 to serialize it into blobs for object threads 616a-n (i.e., data upload pipeline stage) of the replicators to upload to the Object Store located in the target region. Each object thread picks up an upload job that may contain a portion of all data to be uploaded, and all object threads perform the upload in parallel.

Figure 7:
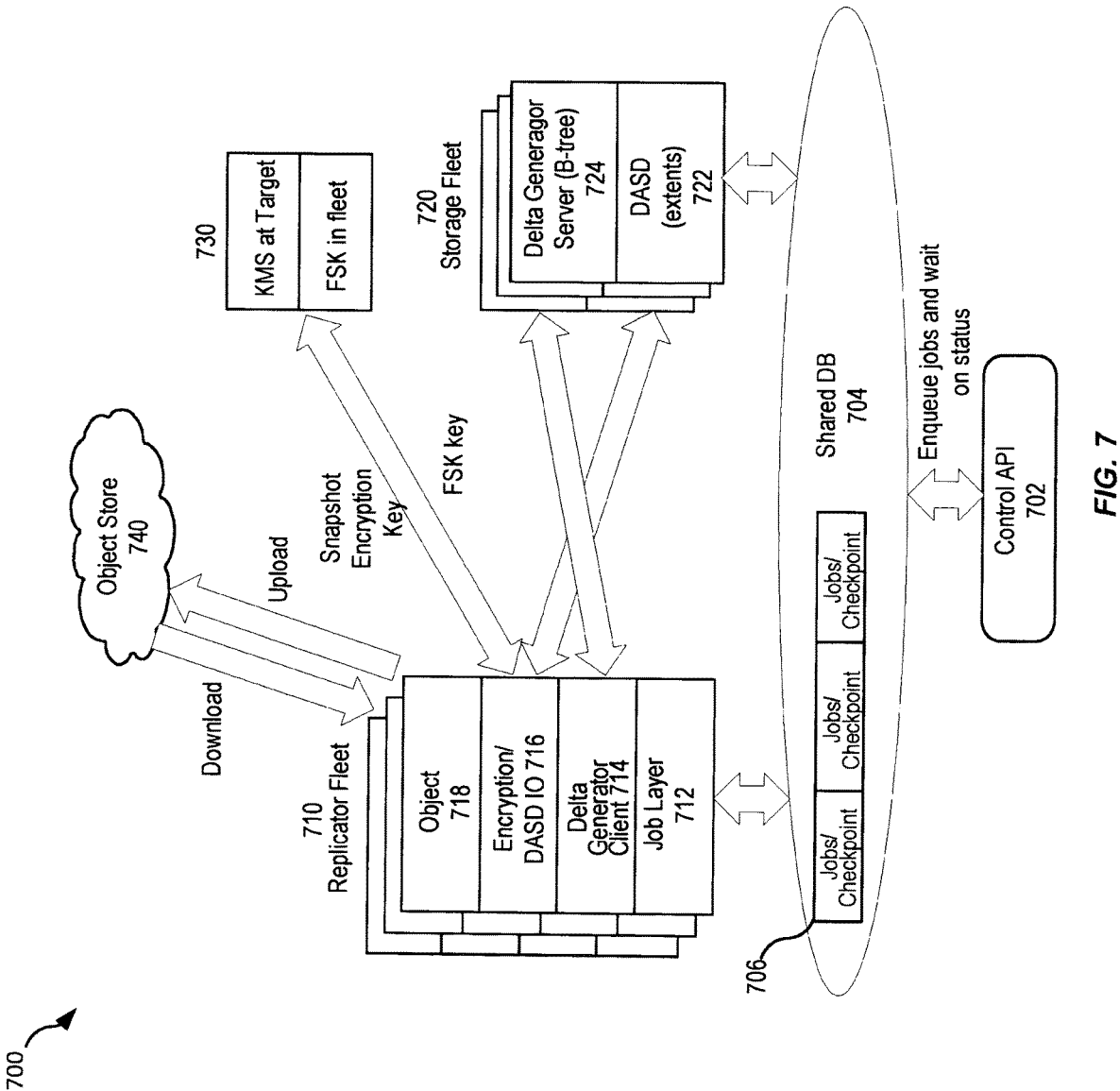
FIG. 7 is a diagram illustrating a layered structure in file storage service (FSS) data plane, according to certain embodiments.

FIG. 7 is a diagram illustrating a layered structure in the FSS data plane, according to certain embodiments. In FIG. 7, the replicator fleet 710 has four layers, job layer 712, delta generator client 714, encryption/DASD IO 716, and Object 718. The replicator fleet 710 is a single process responsible for interacting with the storage fleet 720, KMS 730, and Object Storage 740. In certain embodiments, the job layer 712 polls the SDB 704 for enqueued jobs 706, either upload jobs or download jobs. The replicator fleet 710 includes VMs (or threads) that pick up the enqueue replication jobs to their maximum capacity. Sometimes, a replicator thread may own a part of a replication job, but it will work together with another replicator thread that owns the rest of the same replication job to complete the entire replication job concurrently. The replication jobs performed by the replicator fleet 710 are restartable in that if a replicator thread fails in the middle of replication, another replicator thread can take over and continue from the last successful point to complete the job the failed replicator thread initially owns. If a strayed replicator thread (e.g., fails and wakes up again) conflicts with another replicator thread, FSS can use a mechanism called generation number to avoid the conflict by making both replicator threads update different records.

The delta generator client layer 714 performs B-tree walking by accessing the delta generator server 724, where the B-tree locates, in storage fleet 720. The encryption/DASD IO layer 716 is responsible for security and storage access. After the B-tree walk, the replicator fleet 710 may request IO access through the encryption/DASD IO layer 716 to access DASD extents 722 for file data associated with the deltas identified during the B-tree walk. Both the replicator fleet 710 and storage fleet 720 update control API 702 their status (e.g., checkpoints and leasing for replicator fleet 710) through SDB 704 regularly to allow the control API 702 to trigger alarms or take actions when necessary.

The encryption/DASD IO layer 716 interacts with KMS and FSK fleet 730 at the target side to create session keys (or snapshot encryption key) during a cross-region replication process, and use FSK for encrypting and decrypting the session keys. Finally, object layer 718 is responsible for uploading deltas and file data from the source file system to the Object Store 740 and downloading them to the target file system from the Object Store 740.

The Data plane of FSS is responsible for delta generation. The data plane uses B-tree to store FSS data, and the B-tree has different types of key-value pairs, including but not limited to, leader block, superblock, iNode, file name keys, cookie map (cookie related to directory entries), and block map (for file contents data, also referred to as FMAP).

These B-tree keys are processed by replicators and delta generators in the data plane together. Algorithms for computing the changed key-value pairs (i.e., part of deltas)

between two given snapshots in a file system can continuously read the keys, and return the keys back to replicators using transaction budgets, and ensure that transactions are confirmed at the end to get consistent key-value pairs for processing.

In other embodiments, the delta generation and calculation may be scalable. The scalable approach can utilize multiple threads to compute deltas (i.e., the changes of key-value pairs) between two snapshots by breaking a B-tree into many key ranges. A pool of threads (i.e., the delta generators) can perform the scanning of the B-tree (i.e., walking the B-tree) and calculate the deltas in parallel.

Figure 8:
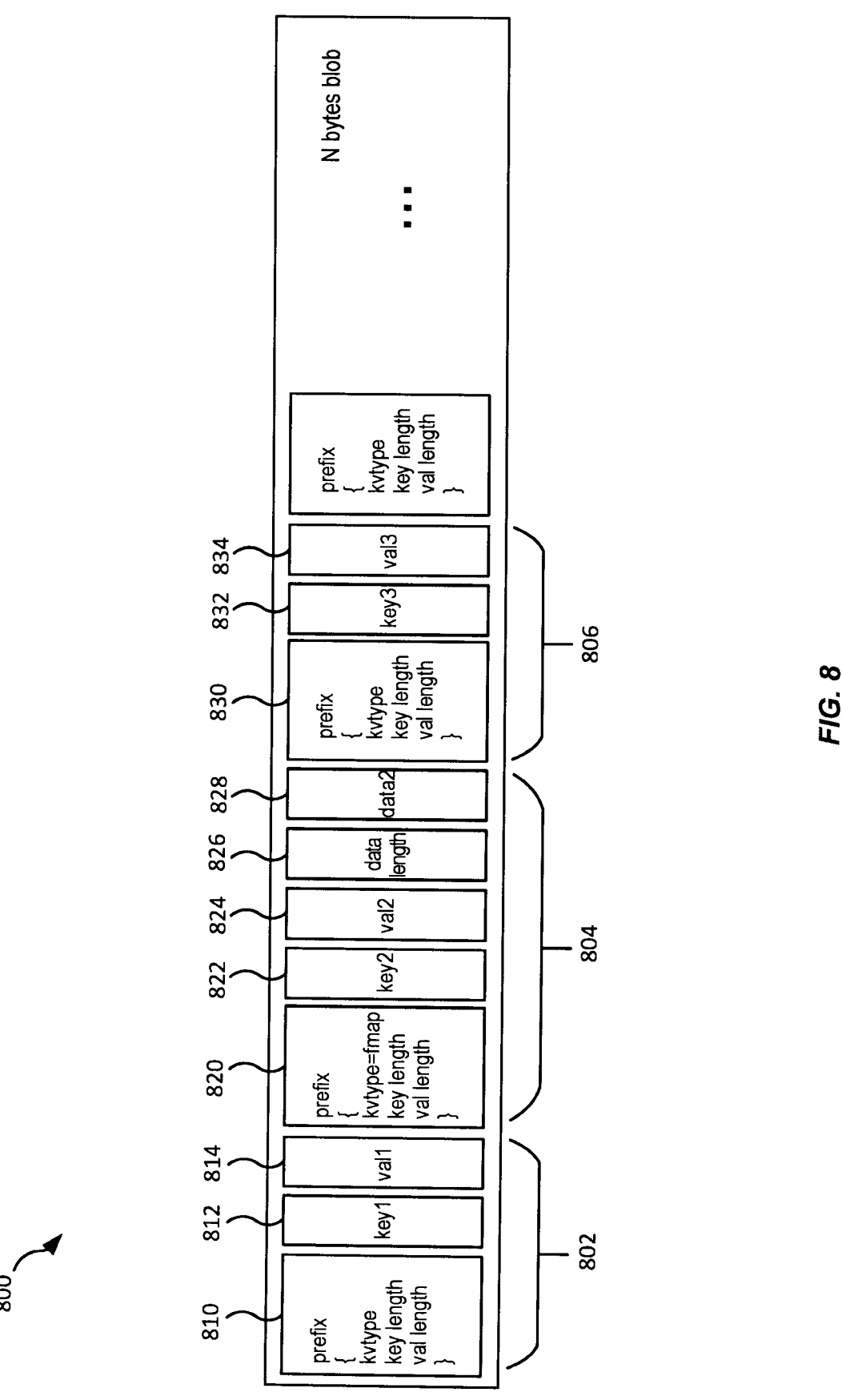
FIG. 8 depicts a simplified example binary large object (BLOB) format, according to certain embodiments.

FIG. 8 depicts a simplified example binary large object (BLOB) format, according to certain embodiments. A blob is a data type for storing information (e.g., binary data) in a database. Blobs are generated during replication by the source region and uploaded to the Object Store. The target region needs to download and apply the blobs. Blobs and objects may be used interchangeably depending on the context.

During the B-tree walk, when a delta generator encounters an iNode and its block map (also referred to as FMAP, data associated with a B-tree key) for a given file (i.e., the data content), the delta generator works with replicators to traverse all the pages in the blocks (FMAP blocks) inside DASD extent that the FMAP points to and read them into a data buffer, decrypt the data using a local encryption file key, put into an output buffer to serialize it into blob for replicators to upload to the Object Store. In other words, the delta generators need to collect all FMAPs for an identified delta to get all the data related to the differences between the two snapshots.

A snapshot delta stored in the Object Store may span over many blobs (or objects if stored in the Object Store). The blob format for these blobs has keys, values, and data associated with the keys if they exist. For example, in FIG. 8, the snapshot delta 800 includes at least three blobs, 802, 804 and 806. The first blob 802 has a prefix 810 indicating the key-value type, key length and value length, followed by its key 812 (key1) and value 814 (val1). The second blob 804 has a prefix 820 (key-value type, key length and value length), key 822 (key2), value 824 (val2), data length 826 and data 828 (data2). In the prefix 820 of this second blob 804, its key-value type is fmap because this blob has additional data 828 associated with the key 822. The third blob 830 has a similar format to that of the first blob 810, for example, prefix 830, key 832 (key3), and value 834 (val3).

Data is decrypted, collected, and then written into the blob. All processes are performed parallelly. Multiple blobs can be processed and updated at the same time. Once all processes are done, data can be written into the blob format (shown in FIG. 8), then uploaded to the Object Store with a format or path names (illustrated in FIG. 9).

FIG. 9 depicts an example replication bucket format, according to certain embodiments. A "bucket" may refer to a container storing objects in a compartment within an object storage namespace. In certain embodiments, buckets are used by source replicators to store secured data using server-side encryption (SSE) technique and also used by target replicators to download for applying changes to snapshots. The replication data for all filesystems for a target region may share a bucket in that region.

The data layout of a bucket in the Object Store has a directory structure that includes, but not limited to, file system ID (e.g., Oracle Cloud ID), deltas with starting snapshot number and ending snapshot number, manifest describing the content of the information in the layout of the objects, and blobs. For example, the bucket in FIG. 9 contains two objects 910 & 930. The first object 910 has two deltas 912 & 920. It starts with a path name 911 using the source file system ID as a prefix (e.g., ocid 1.filesystem.oc 1.iad . . . ), the first delta 912 that is generated from snapshot 1 and snapshot 2, and a second delta 920 generated from snapshot 2 and snapshot 3. Each delta has one or more blobs representing the content for that delta. For the first delta 912, it has two blobs 914 & 916 stored in the sequence of their generation. For the second delta 920, it has only one blob 922. Each delta also has a manifest describing the content of the information in the layout of this delta, for example, manifest 918 for the first delta 912 and manifest 924 for the second delta 920. Manifest in a bucket is content that describes the deltas, for example, the file system numbers and snapshot ranges, etc. The manifest may be a master manifest, range manifest or checkpoint manifest, depending on the stage of replication process.

The second object 930 also has two deltas 932 & 940 with a similar format starting with a path name 931. The two objects 910 & 930 in the bucket come from different source regions, IAD for object 910 and PHX for object 930, respectively. Once a blob is applied, the corresponding information in the layout can be removed to reduce space utilization.

A final manifest object (i.e., the checkpoint manifest, CM file) is uploaded from the source region to the Object Store to indicate to the target region that the source file system has completed the snapshot delta upload for a particular object. The source CP will communicate this event to the target CP, where the target CP can inform the target DP via SDB to trigger the download process for that object by target replicators.

The control plane in a source region or target region orchestrates all of the replication workflows, and drives the replication of data. The control plane performs the following functions: 1) creating system snapshots that are the basis for creating the deltas; 2) deciding when such snapshots need to be created; 3) initiating replication based on the snapshots; 4) monitoring the replication; 5) triggering the deltas to be downloaded by the secondary (or target side), and; 6) indicating to the primary (or source) side that snapshot has reached the secondary.

A file system has a few operations to handle its resources, including, but not limited to, creating, reading, updating, and deleting (CRUD). These operations are generally synchronous within the same region, and take up workflows as the file system gets HTTPS request from API servers, make changes in the backend for creating resources, and get responses back to customers. The resources are split between source and target regions. The states are maintained for the same resources between the source and target regions. Thus, asynchronous communication between the source and target regions exists. Customers can contact the source region to create or update resources, which can be automatically reflected to the secondary or auxiliary resources in the target region. The state machine in control plane also covers recovery in many aspects, including but not limited to, failure in the fleet, key management failure, disk failure, and object failure, etc.

Turning to Application Programming Interface (API) in the control plane, there are different APIs for users to configure the replication. Control APIs for any new resource work only in the region where the object is created. In a target file system, a field called "IsTargetable" in its APIs can be set to ensure that the target file system undergoing replication cannot be accidentally used by a consumer. In other words, setting this field to be false means that although a consumer can see the target file system, no one can export the target file system or access any data in the live system. Any export may change the data because the export is a read/write permission to export, not read-only permission. Thus, export is not allowed to prevent any change to the target file system during the replication process. The consumer can only access data in old snapshots that have already been replicated. All newly created or cloned file systems can have this field set to true. The reason is that a target can only get data from a single source. Otherwise, a collision may occur when data is written or deleted. The system needs to know whether or not the target file system being used is already part of some replication. A "true" setting for the "IsTargetable" field means no replication is on-going, and a "false" setting means the target file system cannot be used.

Regarding cross-region communication between control plane components, a primary resource on the source file system is called application, and an auxiliary (or secondary) source on the target file system is called an application target. When a source object and a target object are created, they have a single replication relationship. Both objects can only be updated from the source side, including changing compartments, editing or deleting details. When a user wants to delete the target side, the replication can be deleted by itself. For a planned failover, the source side can be deleted, and both the source side and target replication are deleted. For an unplanned failover, the source side is not available, so only the target replication can be deleted. In other words, there are two resources for a single replication, and they should be kept in sync. There are various workflows for updating metadata on both the source and target sides. Additionally, retries, failure handling, and cross-region APIs for failover are also part of the cross-region communication process.

When the source creates necessary security and other related artifacts, it uploads the security and the artifacts to the Object Store, and initiates a job on the target (i.e., notifies the target that a job is available), and the target can start downloading the artifacts (e.g., snapshots or deltas). Thereafter, the target continues to keep looking in the Object Store for an end-of-file marker (also referred to herein as checkpoint manifest (CM) file). The CM file is used as a mechanism for the source side and target side to communicate the completion of the upload of an object during the replication process. At every checkpoint, the source side uploads this CM file containing information, such as the number of blobs that have been uploaded up to this checkpoint, such that the target side can download this number of blobs to apply to its current snapshot. This CM file is a mechanism for the source side to communicate to the target side that the upload of an object to the Object Store is complete for the target to start working on that object. In other words, the target will continue to download until there are no more objects in the Object Storage. Thus, this scheme enables the concurrent processing of both the source side and the target side.

Figure 10:
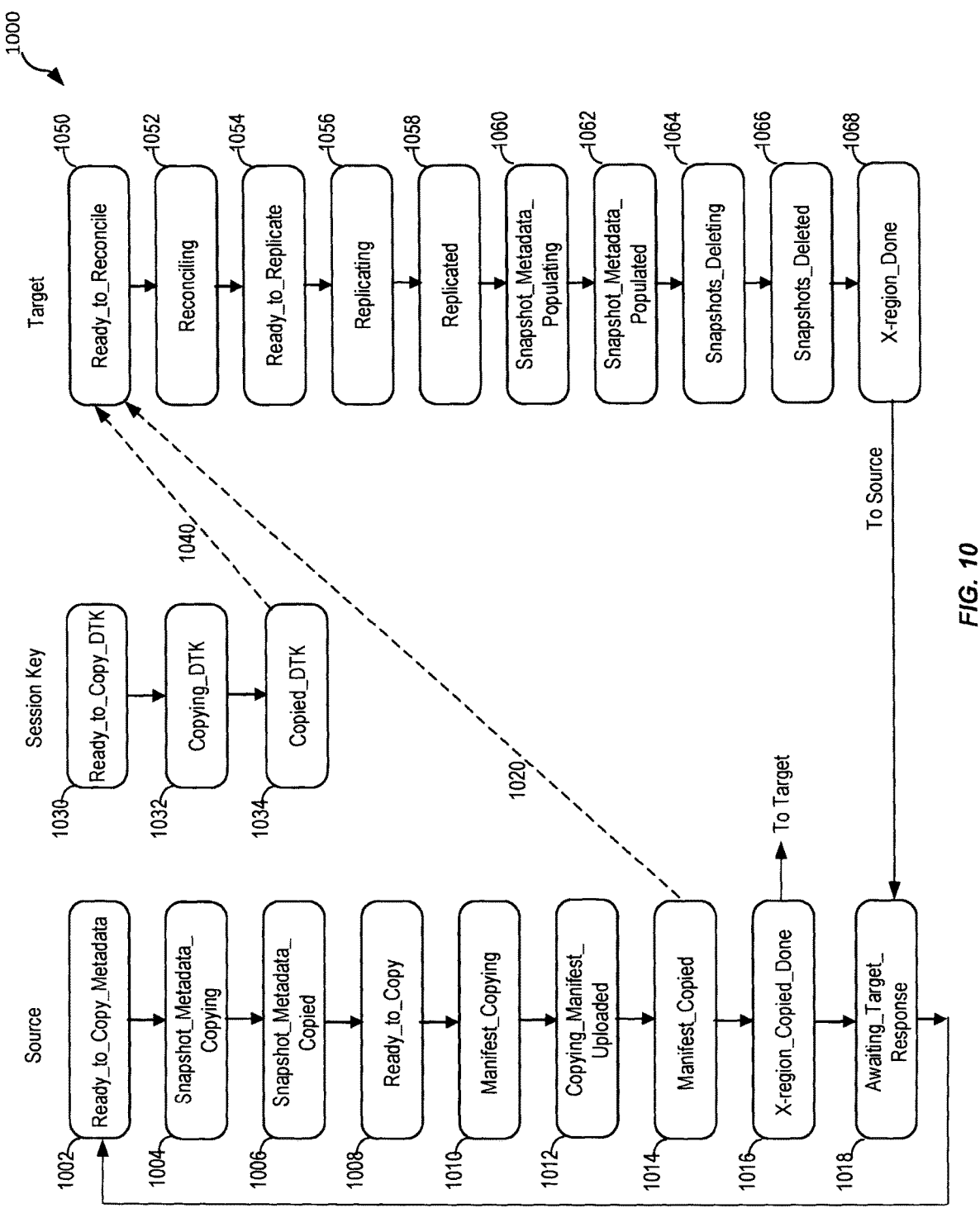
FIG. 10 is a flow chart illustrating state machines for concurrent source upload and target download, according to certain embodiments.

FIG. 10 is a flow chart illustrating state machines for concurrent source upload and target download, according to certain embodiments. As discussed earlier, both the source file system and the target system can perform the replication concurrently and thus have their respective state machines. In certain embodiments, each file system may have its own state machine while sharing some common job level states. In FIG. 10, the source file system has states 1002 to 1018 for performing the data upload plus states 1030 to 1034 for session key generation and transfer. The target file system has states 1050 to 1068 for data download. A session key may be generated at any time in the source file system while the deltas are being uploaded to the Object Storage. Thus, the session key transfer has its own state sequence 1030 to 1034. In FIG. 10, the target file system cannot start the replication download process (i.e., Ready_to_Reconcile state 1050) until it has received the indication that at least an object has been uploaded by the source file system to the Object Storage (i.e., Manifest_Copied state 1014) and that a session key is ready for it to download (i.e., Copied_DTK state 1034).

In a source file system, several functional blocks, such as snapshot generator, control API and delta monitor, are part of the CP. Replicator fleet is part of the DP. The snapshot generator is responsible for periodically generating snapshots. The delta monitor monitors the progress of the replicators on replication-related tasks, including snapshot creation and replication schedule on a periodic basis. Once the delta monitor detects that the replicator has completed the replication jobs, it moves the states to copied state (e.g., Manifest_Copied state 1014) on the source side or replicated state (e.g., Replicated state 1058) on the target side. In certain embodiments, several file systems can perform replication at the same time from a source region to a target region.

Referring to FIG. 10, in certain embodiments, the source file system, in a concurrent mode state machine, a snapshot generator after creating a snapshot signal to a delta monitor that a snapshot has been generated. The delta monitor, which runs a CP replication state (CpRpSt) workflow, is responsible for initiating snapshot metadata upload to the Object Store on the target side. Snapshot metadata may include snapshot type, snapshot identification information, snapshot time, etc. The CpRpSt workflow sets Ready_to_Copy_Metadata state 1002 for the replicator fleet to begin copying metadata. When a replicator gets a replication job, it makes copies of snapshot metadata (i.e., Snapshot_Metadata_Copying state 1004) and uploads the copies to the Object Store. When all replicators complete the snapshot metadata upload, the state is set to Snapshot_Metadata_Copied state 1006. The CpRpSt workflow then continues polling the source SDB for a session key.

Now the CpRtSt workflow hands over control back to the delta monitor to monitor the delta upload process to move into Ready_to_Copy state 1008, which indicates that the delta computation has been scheduled. Then the source CP API sends a request to a replicator to start the next stage of replication by making copies of manifests along with uploading deltas. A replicator that picks up a replication job can start making copies of manifests (i.e., Manifest_Copying state 1010). When the source file system completes the manifest copying, it moves to Manifest_Copied state 1014 and, at the same time, notifies the target file system that it can start its internal state (Ready_to_Reconcile state 1050).

As discussed above, the session key may be generated by the source file system while the data upload is in progress. The replicator of the source file system communicates with the target KMS vault to obtain a master key, which may be provided by customers, to create a session key (referred to herein as delta encryption key or DEK). The replicator then uses a local file system key (FSK) to encrypt the session key (now becomes encrypted DEK which is also referred to herein as delta transfer key (DTK)). DTK is then stored in SDB in the source region for reuse by replicator threads during a replication cycle. The state machine moves to Ready_to_Copy_DTK state 1030.

The source file system transfers DTK and KMS's resource identification to the target API, which then puts them into SDB in the target region. During this transfer process, the state machine is set to Copying_DTK state 1032. When the CpRpSt workflow in the source file system finishes polling the source SDB for the session key, it sends a notification to the target side signaling the session key (DTK) is ready for the target file system to download and use it to decrypt its downloaded deltas for application. The state machine then moves to Copied_DTK state 1034. The target side replicator retrieves DTK from its SDB and requests KMS's API to decrypt it to become a plain text DEK (i.e., decrypted session key).

When the source file system completes the upload of data for a particular replication cycle, including the session key transfer, its delta monitor notifies the target control API of such status as validation information and enters X-region_Copied_Done state 1016. This may occur before the target file system completes the data download and application. The source file system also cleans up its memory and removes all the keys. The source file system then enters Awaiting_Target_Response state 1018 to wait for a response from the target file system to start a new replication cycle.

As mentioned earlier, the target file system cannot start the replication download process until it has received the indication that at least an object has been uploaded by the source file system (i.e., Manifest_Copied state 1014) to the Object Storage and that a session key is ready for it to download (i.e., Copied_DTK state 1034). Once these two conditions are satisfied, the state machine moves to Ready_To_Reconcile state 1050. Then, at Reconciling state 1052, the target file system starts a reconciliation process with the source side, such as synchronizing snapshots of the source file system and the target file system, and also performs some internal CP administrative works, including taking snapshots and generating statistics. This internal state involves communication within the target file system between its delta monitor and CP API.

After the reconciliation process is complete, the replication job is passed to the target replicator (i.e., Ready_to_Replicate state 1054). The target replicator monitors a checkpoint manifest (CM) file that will be uploaded by the source file system. The CM file is marked by the target. The target replicator threads then start downloading the manifests and applying the downloaded and decrypted deltas (i.e., Replicating state 1056). The target replicator threads also read the FMAP data blocks from the blobs downloaded from the Object Store, and communicates to local FSK services to get file system key FSK, which is used to re-encrypt each FMAP data block and store it in its local storage.

If the source file system has finished the data upload, it will update a final CM file by setting an end-of-file (eof) field to be true and upload it to the Object Store. As soon as the target file system detects this final CM file, it will finish the download of blobs, apply them, and the state machine moves to Replicated state 1058.

After the target file system applied all deltas (or blobs), it continues to download snapshot metadata from the Object Store and populates the target file system's snapshots with the information of the source file system's snapshots (i.e., Snapshot_metadata_Populating state 1060). Once the target file system's snapshots are populated, the state machine moves to Snapshot_Metadata_Populated state 1062.

At Snapshot_Deleting state 1064, the target file system deletes all the blobs in the Object Store for those that have been downloaded and applied to its latest snapshot. The target control API will then notify the target delta monitor once the blobs in the Object Store have been deleted, and proceeds to Snapshot_Deleted state 1066. The target file system also cleans up its memory and removes all keys as well. The FSS service also releases the KMS key.

When the target DP finishes the delta application and the clean-up, it validates with the target control API about the status of the source file system and whether it has received the X-region_Copied_Done notification from the source file system. If the notification has been received, the target delta monitor enters X-region DONE state 1068 and sends X-region DONE notification to the source file system. In some embodiments, the target file system is also able to detect whether the source file system has completed the upload by checking whether the end of files has been present for all the key ranges and all the upload processing threads because every object uploaded to the Object Store has a special marker, such as end-of-file marker in a CM file.

Referring back to the source file system state machine, while the source file system is in the Awaiting_Target_Response state 1018, it checks whether the status of the target CP has changed to complete to indicate that the application of all downloaded deltas by the target has been applied and file data has been stored locally. If it does, this concludes a cycle of replication.

The source side and target side operate asynchronously. When the source file system completes its replication upload, it notifies the target control API with X-region_Copied_Done notification. When the target file system later completes its replication process, its delta monitor target communicates back to the source control API with X-region DONE notification. The source file system goes back to Ready_to_Copy_Metadata state 1002 to start another replication cycle.

Figure 11:
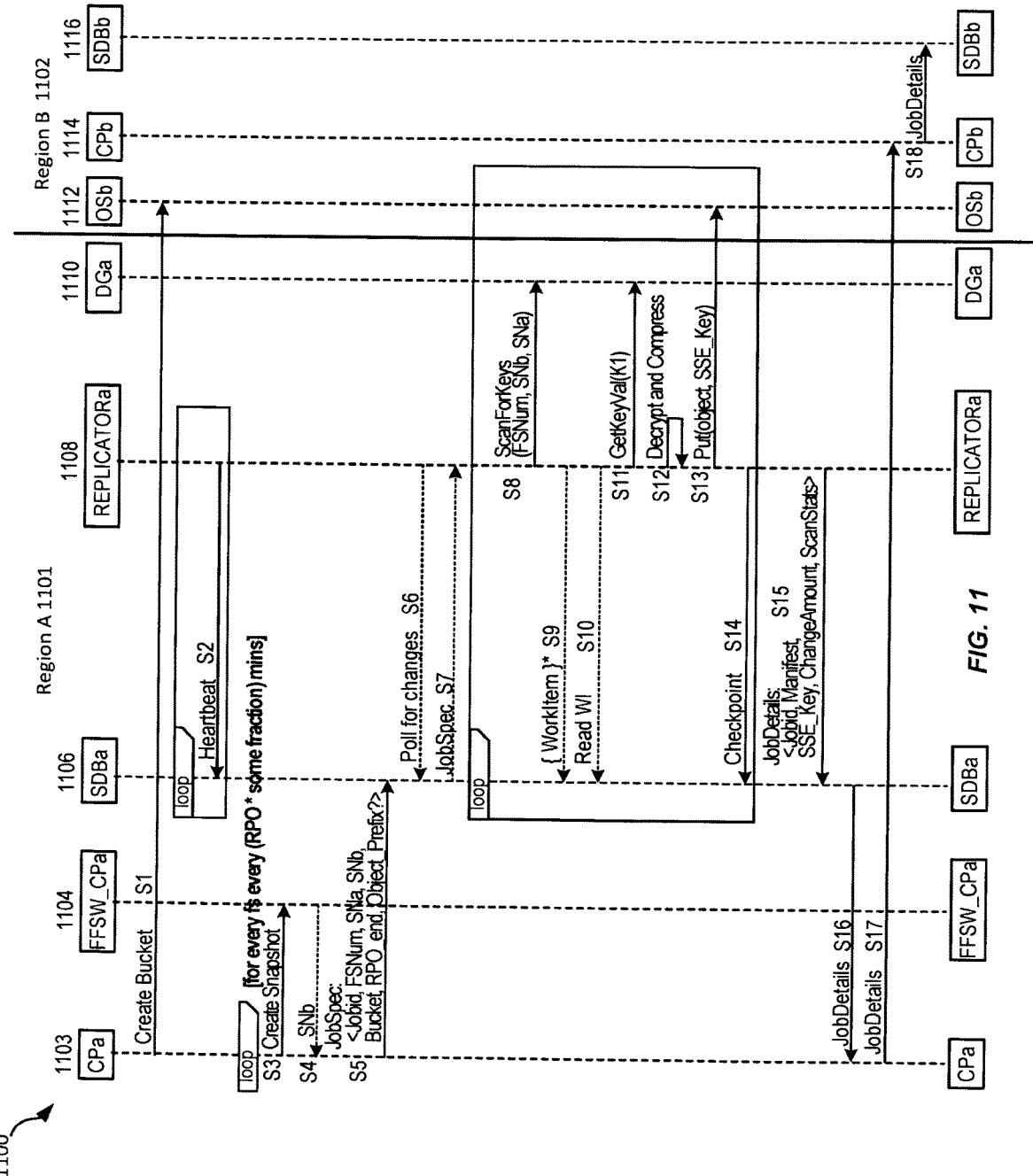
FIG. 11 is an example flow diagram illustrating the interaction between the data plane and control plane in a source region, according to certain embodiments.

FIG. 11 is an example flow diagram illustrating the interaction between the data plane and control plane in a source region, according to certain embodiments. Data plane components and control plane components communicate with each other using a shared database (SDB), for example, 1106. The SDB is a key-value store that both control plane components and data plane components can read and write. Data plane components include replicators and delta generators. The interaction between components in source region A 1101 and target region B 1102 is also illustrated.

In FIG. 11, at step S1, a source control plane (CPa) 1103 requests the Object Store in target region B (OSb) 1112 to create a bucket. At step S2, a source replicator (REPLICATORa) 1108 updates its heartbeat status to the source SDB (SDBa) 1106 regularly. Heartbeat is a concept used to track the replication progress performed by replicators. It uses a mechanism called leasing in which a replicator can keep on updating the heartbeat whenever it works on a job to allow the control plane to be aware of the whole leasing information; for example, the byte count is continuously moving on the job. If a replicator fails to work properly, the heartbeat may become stale, and then another replicator can detect and take over to continue to work on the job left behind. Thus, if a system crash in the middle, the system can start exactly from the last-point-in-time based on the checkpoint mechanism. A checkpoint helps the system know where the last point of progress is to allow it to continue from that point without re-performing the entire work.

At step S3, CPa 1103 also requests file system service workflow (FSW_CPa) 1104 to create a snapshot periodically, and at step S4, FSW_CPa 1104 informs CPa 1103 about the new snapshot. At step S5, CPa 1103 then stores snapshot information in SDBa 1106. At step S6, REPLICA- TORa 1108 polls SDB 1106 for any changes to existing snapshots, and retrieves job spec at step S7 if a change is detected. At step S8, once REPLICATORa 1108 detects a change to snapshots, this kicks off the replication process. At step S8, REPLICATORa 1108 provides information about two snapshots (SNa and SNb) with changes between them to delta generator (DGa) 1110. At step S9, REPLICATORa 1108 put work items information, such as the number of key ranges, into the SDBa 1106. At step 10, REPLICATORa 1108 checks the replication job queue in SDBa 1106 to obtain work items, and at step S11, assign them to delta generator (DGa) 1110 to scan the B-tree keys of the snapshots (i.e., walking the B-tree) to compute deltas and the corresponding key-value pairs. At step 12, REPLICATORa 1108 decrypts file data associated with the identified B-tree keys, and pack them together with the key-value pairs into blobs. A step 13, REPLICATORa 1108 encrypts the blobs with a session key and uploads them to the OSb 1112 as objects. At step S14, REPLICATORa performs a checkpoint and stores the checkpoint record in SDBa 1106. This replication process (S8 to S14) repeats (as a loop) until all deltas have been identified and data has been uploaded to OSb 1112. At step S15, REPLICATORa 1108 then notifies SDBa 1106 with the replication job details, which is then passed to CPa 1103 at step S16, and further relayed to CPb 1114 as the final CM file at step S17. At step S18, CPb 1114 stores the job details in SDBb 1116.

The interaction between the data plane and control plane in target region B is similar. At the end of the application of deltas to the target file system, the control plane in target region B notifies the control plane in source region A that the snapshot is successfully applied. This enables the control plane in source region A to start all over again with a new snapshot.

Authentication is performed on every component. From replicators to a file system key (FSK), an authentication mechanism exists by using replication ID and file system number. The key can be given to a replicator only when it provides the right content. Thus, the authentication mechanism can prevent an imposter from obtaining decryption keys. Other security mechanisms include blocking network ports. A component called file system key server (FSKS) is a gatekeeper for checking appropriator requesters by checking metadata such as the jobs the requesters will perform and other information. For example, suppose a replicator tries to request a key for a file system. In that case, the FSKS can check whether the replicator is associated with a particular job (e.g., a replication is actually associated with that file system) to validate the requester.

Availability addresses the situation that a machine can be restarted automatically after going down or a service continues to be available while software deployments are going on. For example, all replicators are stateless, so losing a replicator is transparent to customers because another replicator can take over to continue working on the jobs. The states of the jobs are kept in a shared database and other reliable locations, not locally. The shared database is a database-like service that the control plane uses to preserve information about file systems, and is based on B-tree.

Storage availability in the FSS of the present disclosure is high because the system has thousands of storage nodes to allow any storage node to perform delta replication. Control plane availability is high by utilizing many machines that can take over each other in case of any failures. For example, replication progress is not hindered simply due to one control plane's failure. Thus, there is no single point of failure. Network access availability utilizes congestion management involving various types of throttling to ensure source nodes are not overloaded.

Replication is durable by utilizing checkpointing, where replication states are written to a shared database, and the replicators are stateless. The replication process is idempotent. Idempotency may refer to deterministic re-application that when an operation fails, the retry of the same operation should work and lead to the same result, by using, for example, the same key, upload process or walking process, etc.

Operations in several areas are idempotent. In the control plane, an action that has been taken needs to be remembered. For example, if an HTTP request repeats itself, an idempotency cache can help remember that the particular operation has been performed and is the same operation. In the data plane, for example, when a block is allocated, the block and the file system file map key are written together. Thus, when the block is allocated again, it can be identified. If the block has been sealed, a write operation will fail. The idempotent mechanism can know that the block was sealed in the past, and the write operation needs not be redone. In yet another example, the idempotent mechanism remembers the chain of the steps required to be performed for a particular key-value processing. In other words, idempotency mechanism allows to check every operation to see if it is in the right state. Therefore, the system can just move on to the next step without repeating.

Atomic replay allows the application of deltas to start as soon as the first delta object reaches the Object Store when snapshots are rolled back, for example, from snapshot 10 back to snapshot 5. To make a replay atomic, the entire deltas need to be preserved in the Object Store before the deltas can be applied.

With respect to scaling of the replicator, the FSS of the present disclosure allows to add as many replication machines (e.g., replicator virtual machines ("VMs")) as needed to support many file systems. The number of replicators may dynamically increase or decrease by taking into account the bandwidth requirement and availability of resources. With respect to scaling storage, thousands of storage can be used to parallelize the process and increase the speed of work. With respect to inter-region bandwidth, bandwidth rationing ensures each workload does not overuse or cross its predefined throughput limit by automatically throttling, such as, throttling all inter-region bandwidth by figuring out the latency increase and slowing down requests. All replicator processors (or threads) have this capability.

For checkpoint storage scaling, uploaders and downloaders checkpoint their progress to persistent storage, and the shared storage is used as a work queue for splitting key range. If checkpoint workloads overwhelm the shared database, checkpoint storage functionality can be added to delta generators for scaling purposes. Current shared database workloads may consume less than 10 IOPs.

Figure 12:
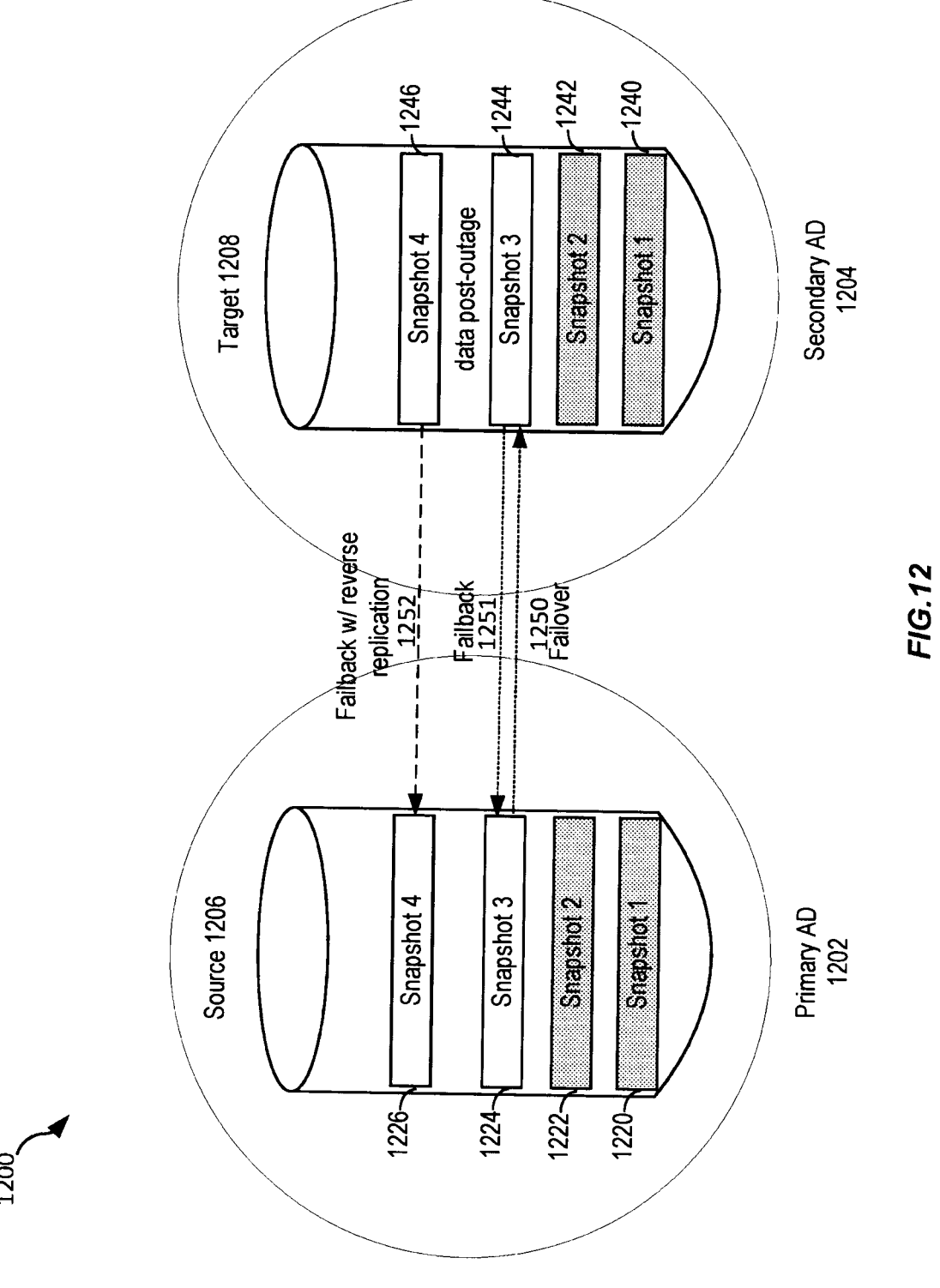
FIG. 12 is a simplified diagram illustrating failback mode, according to certain embodiments.

FIG. 12 is a simplified diagram illustrating failback mode, according to certain embodiments. Failback mode allows restoring the primary/source side before failover to become primary/source again. As shown in FIG. 12, the primary AD 1202 includes a source file system 1206, and the secondary AD 1204 includes a target file system 1208. The secondary AD 1204 may be in the same region or a different region as that of primary AD 1202.

In FIG. 12, snapshot 1 1220 and snapshot 2 1222 in the source file system 1206 exist prior to failover due to an outage event. Similarly, snapshot 1 1240 and snapshot 2 1242 in the target file system 1208 exist prior to failover. When the outage occurred in the primary AD 1202 at snapshot 3 1224, FSS made an unplanned failover 1250, and snapshot 3 1224 in the source file system 1206 was replicated to the target file system 1208 to become a new snapshot 3 1224. After the target file system 1208 went live, a customer might make changes to the target file system 1208, which created a snapshot 4 1246.

If the customer decides to use the source file system again, the FSS service may perform a failback. The user has two options when performing the failback—1) the last point-in-time in the source file system prior to the triggering event 1251, or 2) the latest changes in the target file system 1252.

For the first option, the user can resume from the last point-in-time (i.e., snapshot 3 1224) in the source file system 1206 prior to the triggering event. In other words, snapshot 3 1224 will be the one to use after failback because it previously successfully failed over to the target file system 1208. To perform the failback 1251, the state of the source file system 1206 is changed to not accessible. Then, FSS services identify the last point-in-time in the source file system 1206 prior to the successful failover, which is snapshot 3 1224. FSS may perform a clone (i.e., a duplicate in the same region) of snapshot 3 1224 in the primary AD 1202. Now the primary AD 1202 is back to its initial setup before the outage, and the user can reuse the source file system 1206 again. Because snapshot 3 1224 is already in the file system to be used, no data transfer is required from the secondary AD 1204 to the primary AD 1202.

For the second option, the user wants to reuse the source file system with the latest changes in the target file system 1208. In other words, snapshot 4 1246 in the target file system 1208 will be the one to use after failback because it was the latest change in the target file system 1208. The failback process 1252 for this option involves reverse replication (i.e., reversing the roles of the source file system and the target file system for a replication process), and FSS performs the following steps:

Step 1. The state of the source file system 1206 is changed to not accessible.

Step 2. Then, FSS services identify the latest snapshot in the target file system 1208 that has been successfully replicated, for example, snapshot 3 1244.

Step 3. The FSS services also find the corresponding snapshot 3 1224 in the source file system 1206, and perform a clone (i.e., a duplicate in the same region).

Step 4. The FSS services start a reverse replication 1252 with a similar process as discussed in relation to FIG. 4 but in the reverse direction. In other words, both the source file system 1206 and the target file system 1208 need to synchronize, then the target file system 1208 can upload deltas to an Object Store in the primary AD 1202. The source file system 1206 can download the deltas from the Object Store to complete the application to snapshot 3 1224 to create a new snapshot 4 1226.

Now the primary AD 1202 is back to its initial setup before the outage, and the user can reuse the source file system 1206 again without transferring data that is already in both the source file system 1206 and the target file system 1208, for example, snapshots 1~3 (1220-1224) in the source file system 1206. This saves time and avoids unnecessary bandwidth.

Fair-Share Resource Utilization in Replication Pipeline Processing

Even though a file storage service (FSS) can create a mechanism of parallel processing for cross-region replication, if the threads working in parallel on the replication cannot make the best use of resources, such as compute, memory, network, storage, and IO bandwidth, an unbalance resource utilization may occur. The performance is likely to degrade and defeat the parallel processing purpose.

Techniques disclosed in the present disclosure utilize a fair-share architecture for communication among pipeline stages, performing a cross-region replication between different cloud infrastructure regions. The techniques help ensure end-to-end fair-share resource utilization across the whole cross-region replication to avoid potential bottlenecks and achieve optimal performance. Fair-share resource utilization may refer herein, in general, to an equal share of resources (e.g., compute, memory, storage, network, IO, database, throughput, bandwidth, etc.) used by processing threads for executing jobs related to cross-region replication. For example, each processing thread of a pipeline stage may share a roughly (or substantially) equal amount of processing resources available for that pipeline stage depending on configurations. All pipeline stages of the FSS may also share a roughly (or substantially) equal amount of overall resources depending on configurations.

The disclosed techniques use both static and dynamic resource allocations in tandem to achieve a balance of resource usage for all running jobs. Static resource allocation ensures the minimum required resources for each job execution. Dynamic resource allocation takes into account the circumstances of the replication process to dynamically allocate or re-allocate resources to meet performance desires.

The fair-share architecture utilizes a list of queues (i.e., a linked-list of queues) that allow the computing system to evenly distribute jobs for execution by enqueuing and dequeuing jobs, one at a time, both in a round-robin fashion, to be executed by parallel running threads of a common thread pool regardless of types of jobs. The fair-share architecture is scalable because the linked-list of queues in the fair-share architecture can scale up and down as the number of job increase and decrease. If a system adds a new pipeline stage, all pipeline stages can still maintain fair-share resource utilization by adding a fair-share architecture to interface with the new pipeline stage. The fair-share architecture can also perform self-throttling when overall bandwidth limit is reached. For example, the linked-list of queues in the fair-share architecture may not enqueue more jobs for execution when no resource is available (e.g., all processing threads are busy) until resources are available again or new resources are added.

In some examples, all pipeline stages across cloud infrastructure regions can operate in parallel, concurrently, and/or independently without locks or contention across the jobs in each pipeline stage because each thread of the parallel running threads in a pipeline can automatically determine whether the prior pipeline stage has completed a task, and move data being processed from its pipeline stage to next pipeline stage without waiting for each other. As a result, no bottleneck exists, and both the parallelism and fair-share resource utilization among threads executing jobs are maintained. In other words, resources are available for each replication-related job, distributed evenly (or uniformly) to all replication-related jobs, while constraints are in place to prevent potential resource starvation in any pipelines.

Fair-Share Architecture

Figure 13:
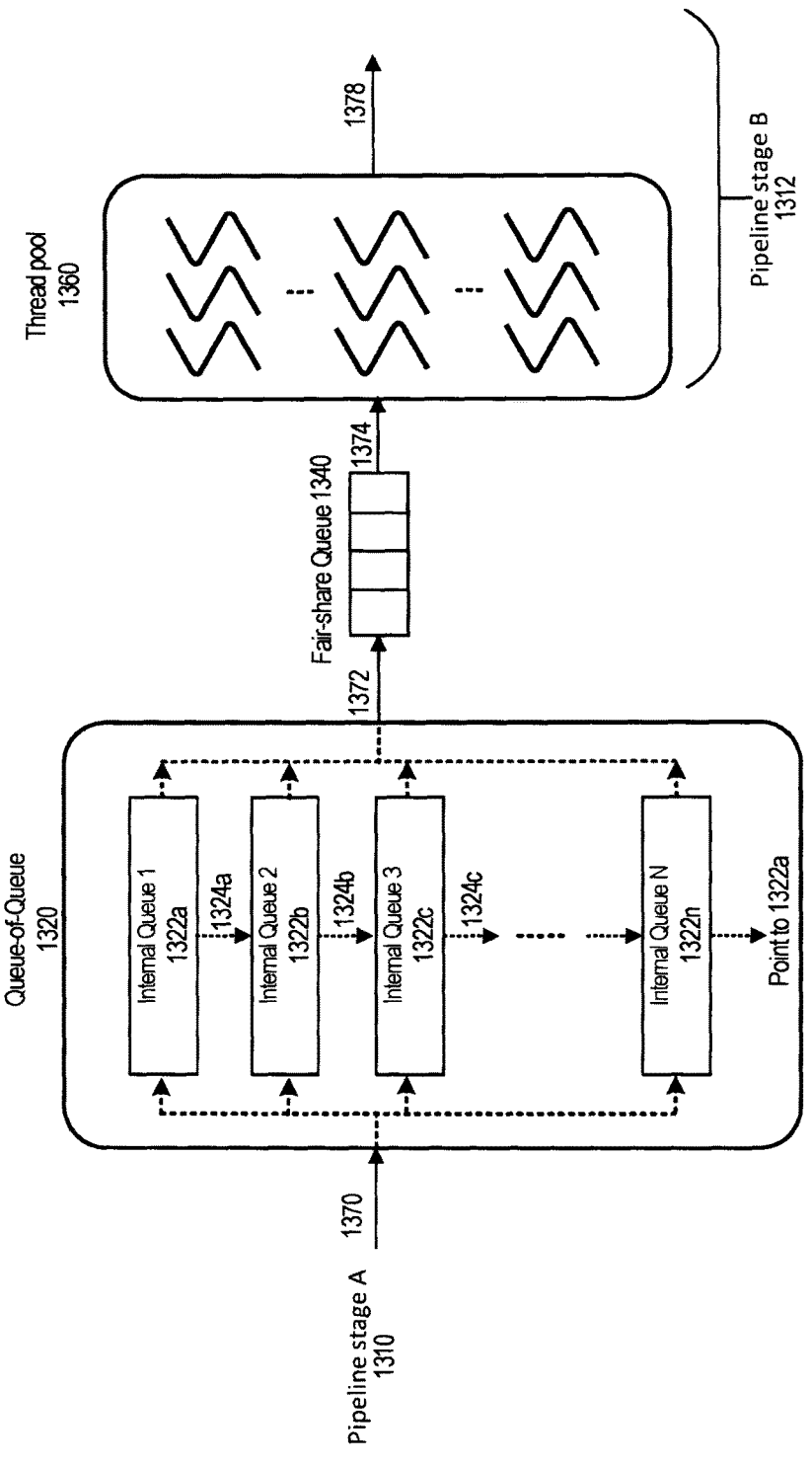
FIG. 13 is a block diagram illustrating an example fair-share architecture, according to certain embodiments.

FIG. 13 is a block diagram illustrating an example fair-share architecture, according to certain embodiments. In some embodiments, the fair-share architecture 1300 includes, but is not limited to, a queue-of-queue 1320, an intermediate first-in-first-out queue (also referred to herein as fair-share queue) 1340, and a common thread pool 1360. The fair-share architecture 1300 may be used for communication between two pipeline stages, pipeline stage A 1310 and pipeline stage B 1312 (i.e., next pipeline stage).

In some embodiments, the queue-of-queue (QoQ) 1320 (i.e., a linked list of queues) contains a dynamic list of queues (1322a-1322n) that may be chained together circularly by a linked list. In other words, each queue in the dynamic linked list may be a first-in-first-out queue with a pointer pointing to next queue to form a circular linked-list. It is called queue-of-queue because the linked list itself may be considered as a queue, and each node of the linked list is a first-in-first-out queue. The queue-of-queue is a linked list of queues (may also be abbreviated as linked-list queues). The QoQ may have N queues (1322a-1322n), where N may be an integer number ranging from 0 (e.g., when no subscriber job exists) to a number (e.g., N) that can share the overall available bandwidth of the FSS without degrading the performance. Internal queue 1 (1322a), a first-in-first-out queue, may have a pointer 1324a pointing to internal queue 2 (1322b), which in turn has a pointer 1324b pointing to internal queue 3 (1322c), and so on. The last internal queue N (1322n) may have a pointer 1324n pointing to the head of the linked-list queues, internal queue 1 (1322a). A subscriber job may be a replication-related job to be executed by a thread in the common thread pool, such as a replication request, delta generation, DASD IO access request, upload, download, etc.

In certain embodiments, each new job that comes to the Queue-of-queue 1320 at input 1370 may subscribe to (or be put into) one internal queue in a round-robin fashion to achieve a fair distribution of jobs to be executed. In some embodiments, other methods for fair distribution may be used, such as weighted round-robin, randomized round-robin, proportional share scheduling, and the like.

In certain embodiments, the internal queues of queue-of-queue 1320 are dynamically allocated to conserve resources. For example, when a new replication starts, there is no internal queue in the queue-of-queue 1320. When a first new job arrives for the replication, internal queue 1 (1322a) is created with a subscription by the first new job. When a second new job arrives, internal queue 2 (1322b) is created and pointed to by internal queue 1, and subscribed to by the second new job. The linked-list queues (i.e., the internal queues) increase as new jobs arrive and subscribe to new internal queues.

On the output end 1372, when jobs in the internal queues are selected and extracted (or taken out) by threads for execution, the internal queues with no remaining jobs are removed from the linked-list queues. For example, internal queues 1, 2, and 3 all hold jobs. If the job in internal queue 2 (1322b) is completed by a thread faster than the jobs in internal queues 1 and 3 executed by other threads, internal queue 2 may be removed early, and the pointer 1324a of internal queue 1 (1322a) may point to internal queue 3 (1322c) instead. This phenomenon may occur because jobs involve file systems of different sizes or have more data to process. Thus, some jobs may be completed earlier than others. When the job in internal queue 1 is completed later by another thread, internal queue 1 is also removed. As a result, internal queue 3 becomes the head of the linked-list queues. When another new job arrives, a new internal queue subscribed to by the new job may be added to the end of the linked-list queues and becomes internal queue 4 pointed to by pointer 1324c.

Referring back to FIG. 13, in certain embodiments, the fair-share queue 1340, may temporarily store the jobs selected from the Queue-of-queue 1320 before execution by a next pipeline stage (e.g., pipeline stage B 1312) by going through the path of 1372 to 1374. Each job in the Queue-of-queue is selected and extracted from one internal queue at a time in a round-robin fashion to achieve a fair distribution of jobs to be executed, and placed (or pushed) into one end of the fair-share queue 1340. In some embodiments, other methods for fair distribution may be used, such as weighted round-robin, randomized round-robin, proportional share scheduling, and the like. The jobs in the fair-share queue 1340 are then taken out from the other end of the fair-share queue for execution in a first-in-first-out manner. For example, the first job is extracted from internal queue 1 (1322a) and placed into the left end of the fair-share queue. The second job is extracted from internal queue 2 (1322b) and placed into the left end of the fair-share queue after the first job. On the other end of the fair-share queue, the first job may be extracted for execution by an available thread from the thread pool, followed by the second job.

The fair-share architecture can ensure that each job enqueued into the QoQ 1320 and eventually reaches (or is taken up by) an available thread 1360 for execution may not get more resources than other jobs such that resources (e.g., throughput) are evenly (or uniformly) distributed to all jobs to prevent potential resource starvation to certain jobs. In other words, resources are available for each replication-related job, distributed evenly (or uniformly) to all replication-related jobs, while constraints are in place to prevent potential resource starvation in any pipelines. In some embodiments, the fair-share queue 1340 may not be used, and the jobs in the queue-of-queue 1320 may be extracted (or picked up) directly by the threads of thread pool 1360 to execute concurrently. So, the uniform extraction mechanism may be performed inside the thread pool 1360.

The common thread pool 1360 in FIG. 13 may contain a number of threads available to execute replication-related jobs, such as the delta generation, delta application, storage read/write, delta (or blob or object) upload and delta download, etc. In some embodiments, each thread of the thread pool may share a roughly (or substantially) equal amount of resources (e.g., CPU core, memory, bandwidth, etc.) assigned to the thread pool. In certain embodiments, each thread in the thread pool wakes up periodically and picks a job from the fair-share queue 1340 if it exists, or from an internal queue (1322a-n) of queue-of-queue 1320 in a round-robin fashion. In other words, the first thread may pick up a job from internal queue 1 (1322a). The second thread may pick up another job from internal queue 2 (1322b), and so on. In some embodiments, all the threads in the thread pool execute their jobs in parallel, concurrently, and independently. When one thread completes a job, the thread may be returned to the thread pool and can pick up another job from the last internal queue of the linked-list queues by following the pointers. For example, if the jobs in internal queues 1~3 have been extracted before, the newly available thread may pick up a job from internal queue 4.

In some embodiments, a job may be split into several smaller sub-tasks, where each sub-task is placed into an internal queue of the linked-list queues (1322a-n) of queue-of-queue 1320. Thus, depending on configurations, a job (e.g., high-priority job) may utilize more threads to work on many smaller sub-tasks within that job in parallel and concurrently when different threads may pick up the sub-tasks from different internal queues. As a result, a high-priority job may use more entries in the internal queues (1322a-n) to obtain more resources, where the number of entries may be proportional to the job's priority. Although a particular job may utilize more threads than other jobs, FSSs may ensure this particular job does not cause resource starvation to other jobs. In other embodiments, an internal queue may hold several jobs. However, one job is put into an internal queue at a time. The same internal queue may not receive another job until all the other existing internal queues have received new jobs—i.e., one round of round-robin assignment.

The queue-of-queue 1320 may be automatically throttled when all the linked-list queues (i.e., internal queues 1322a-n) have jobs waiting to be executed by the threads in thread pool 1360. In other words, no new job may come in to subscribe to queue-of-queue 1320 until an internal queue is available again. This may occur when all bandwidth is used, and threads are busy.

The fair-share architecture may achieve fair-share resource utilization by evenly distributing the overall resources to all threads working on the jobs by placing the jobs one by one into the linked-list queues in queue-of-queue 1320 in a round-robin fashion and taken out for execution one by one in a round-robin fashion. The threads in the thread pool may be available to use for all types of jobs. The number of threads available to use may depend on resources available in file systems, and the maximum number of active threads may depend on the total resources available. As a result, each thread may use an equal share of resources. Each share of resources may be large or small depending on number of active threads. For example, for a system with 300 MBps bandwidth having ten threads working on ten replication-related jobs, each thread may take up to 30 MBps bandwidth. If there are nine jobs remaining, each thread may take up more bandwidth (i.e., 300 MBps/9). If only one job remains, the thread working on the job may take the whole bandwidth available.

Fair-Share Resource Utilization Examples

The FSS may have both static and dynamic resource allocation mechanisms. The static allocation may ensure each job can have minimal resources it needs. For example, each job may subscribe to at least an internal queue and hence at least one thread for executing the job. Each thread may represent a CPU core of a multi-core processor. Similarly, other resources, such as memory and storage, are also allocated appropriately for each job. In other words, for static allocation, resource allocation may be decided at the beginning to provide an equal share of resources to each job.

Dynamic allocation may refer to resources that can be dynamically allocated by taking into account the circumstances of the replication process. For example, if one job needs more resources, it could borrow from another job not using the resources. As an example, a job may perform delta generation that involves more file data processing while another delta generation job involves less file data. In that case, more threads in the thread pool 1360 may be used to work on the job that needs more resources. Additionally, the fair-share resource utilization among threads may be dynamic. For example, assuming ten jobs are being executed by ten threads. If one job is added, the eleventh thread to execute the job can be allocated minimum resources immediately without waiting for a long time. Finally, as discussed above in relation to the fair-share architecture, the linked-list queues of queue-of-queue 1320 are also dynamically allocated. The internal queues are added and removed based on the demand (i.e., the number of incoming jobs).

As mentioned earlier in relation to FIG. 6A, a cross-region replication process may have several pipeline stages. In certain embodiments, the FSS utilizes the fair-share architecture for communication between pipeline stages to achieve an end-to-end fair-share resource utilization across the whole cross-region replication process between a source region and a target region to avoid bottlenecks. A pipeline stage may include parallel running threads executing jobs received from a prior pipeline stage and generating new jobs for next pipeline stage. The fair-share architecture may include the queues (e.g., queue-of-queue 1320 and fair-share queue 1340 in FIG. 13) for storing incoming and outgoing jobs plus the interaction between the queues and the threads (e.g., 1360 in FIG. 13) of a pipeline stage.

Since there is no mutex lock or contention across the jobs in each pipeline stage (although lock may be used during resource allocation within a pipeline), each thread of the parallel running thread in a pipeline can automatically figure out whether the prior pipeline stage has completed a task, and move data being processed from one pipeline stage to another pipeline stage without waiting for each other. For example, in FIG. 13, when a job arrives, it is put into a dynamically created internal queue of the queue-of-queue 1320 without a need to obtain a lock or fight for resources with other jobs. Similarly, each job is taken out of an internal queue as a thread becomes available, and there is no lock among the working threads. In other words, the jobs are streamed in and out of the fair-share architecture. When threads of a pipeline stage complete their jobs, the processed data are moved to next pipeline stage through the fair-share architecture.

Additionally, all pipelines in each region (e.g., source and target regions) operate in parallel, concurrently, and independently as discussed in FIG. 6 above. The pipelines with parallel running threads operate independently because when a job fails in a particular pipeline, other pipelines are not impacted nor stalled by the particular failed job. For example, if a thread executing a job fails in pipeline stage X, the next pipeline stage Y simply continues to take other completed jobs from pipeline stage X while pipeline stage X tries to re-execute the failed job.

FIG. 14 is a simplified flow diagram illustrating a cross-region replication processing in a source region utilizing the fair-share architecture, according to certain embodiments. A source region may include one or more source file systems running in parallel. FIG. 14 illustrates a source file system receiving requests for performing cross-region replications. In FIG. 14, the replication process of a source region 1402 may include four pipeline stages, the source replication job, delta generation B-tree walk, DASD IO access, and delta (or object) upload. The source replication job pipeline may be responsible for initiating cross-region replication in the source region. The delta generation pipeline (for B-tree walk) may be responsible for delta generation by walking a B-tree in a source file system to identify deltas (i.e., the B-tree key-value pairs that differ between two given snapshots). The DASD IO access pipeline may be responsible for storage IO access for retrieving file data due to the result of the B-tree walk. The delta/object upload pipeline may be responsible for the delta upload to the Object Store. Please note that the terms, deltas, blobs, and objects, may be used interchangeably for the upload and download processes of cross-region replication.

In certain embodiments, the fair-share architecture, as discussed in relation to FIG. 13, may be used between pipeline communication to achieve an end-to-end fair-share resource utilization for the replication process in source region. For example, in FIG. 14, the fair-share architectures (1480 and 1482) are used between delta generation pipeline and DASD IO access pipeline, and between DASD IO access pipeline and delta/object upload pipeline.

In FIG. 14, the source replication job pipeline may include a source replication job queue 1410 residing in source SDB. The delta generation pipeline may include delta generator (DG) 1414, which is part of the source replicator (referring to FIG. 7), and delta generation thread (or range thread) pool 1412. The DASD IO access pipeline may include DASD 1426 and DASD read thread pool 1424. The delta upload pipeline may include an object upload thread pool 1442 and a replicator (referring to FIG. 7) that owns these object threads. The fair-share architecture 1480 used for communication between the delta generation pipeline and the DASD IO access pipeline may include per-job DASD IO request queue 1420 and DASD read thread pool 1424. The fair-share architecture 1482 used for communication between the DASD IO access pipeline and the delta/object upload pipeline may include per-job blob completed queue 1430, fair-share queue for object upload 1440, and the object upload thread pool 1442.

Referring to FIG. 14, at step S1, the source CP of the source region 1402 may enqueue replication jobs (e.g., delta generation) into the source replication job queue 1410. Each replication job may be picked up and handled by a main thread of a source file system in the source region 1402. At step S2, the B-tree of the source file system may partition its B-tree keys (i.e., key-value pairs) into multiple key ranges, where each key range is processed by a range thread of the delta generation thread pool 1412. The delta generator (DG) that owns these range threads performs GETKEY function to identify B-tree keys representing the deltas between two given snapshots in the B-tree (i.e., walk the B-tree). All key ranges are processed by the range threads in parallel and concurrently. At step S3, during the B-tree walk, the range threads may generate DASD IO requests to read file data that the B-tree keys point to. Those DASD IO requests are put into the per-job DASD IO request queue 1420, which is equivalent to the queue-of-queue 1320 that contains linked-list queues (1322*a-n*) in FIG. 13. Thus, the per-job DASD IO request queue may have many internal queues, and one DASD IO request is put into an internal queue at a time in a round-robin fashion.

At step S4, each upload job may be extracted from the per-job DASD IO request queue 1420 (equivalent to queue-of-queue 1320 in FIG. 13) in a round-robin fashion and put into a fair-share queue 1422 (equivalent to 1340 in FIG. 13) for DASD IO access. For example, a first entry of the fair-share queue 1422 may pick up a DASD IO request in the first internal queue (e.g., internal queue 1 1322*a* of FIG. 13). A second entry of the fair-share queue may pick up a DASD IO request in the second internal queue (e.g., internal queue 2 1322*b* of FIG. 13), and so on. New DASD IO requests may be continuously put into the internal queues of per-job DASD IO request queue (e.g., queue-of-queue 1320 in FIG. 13), one request per internal queue, in a round-robin fashion. On the other end, the fair-share queue 1422 may continuously pick up the IO requests from the internal queues, one read request per internal queue at a time, in a round-robin fashion. At step S5, the threads of DASD read thread pool 1424 may pick up the DASD IO requests from the fair-share queue 1422 in a round-robin fashion, one DASD read thread per request, to read file data from DASD 1426. The DASD read threads that have obtained the IO requests may perform DASD IO access in parallel and concurrently.

At step S6, after completing the DASD IO read and converting the file data into blobs, each range thread of the delta generation thread pool 1412 may put an upload job containing the blobs to be uploaded to the Object Store into per-job blob complete queue (or called upload job list) 1430, which is another fair-share architecture. The per-job blob complete queue 1430 is equivalent to the queue-of-queue

1320 that contains linked-list queues (1322*a-n*) in FIG. 13. In certain embodiments, the blobs corresponding to the jobs placed in the per-job blob complete queue may be temporarily stored in memory or caches. As discussed earlier in relation to the fair-share architecture, one range thread may put one upload job, containing one or more delta blobs to be uploaded, into one internal queue of the per-job blob complete queue at a time in a round-robin fashion.

At step S7, each upload job may be extracted from the per-job blob complete queue 1430 (equivalent to queue-of-queue 1320 in FIG. 13) in a round-robin fashion and put into a fair-share queue 1440 (equivalent to 1340 in FIG. 13) for object upload. At step S8, an object thread of the object upload thread pool 1442 (equivalent to thread pool 1360 in FIG. 13) may pick up one upload job at a time from the other end of the fair-share queue 1440 to upload its corresponding blobs temporarily stored in memory or cache to the Object Store 1470. The object threads may run in parallel and concurrently. Some object threads may take longer to complete the delta blob upload because some blobs may contain more file data than others. The delta blobs may be encrypted at step S6 when storing into the QoQ, or step S7 when putting into the fair-share queue, or step S8 before uploading to the Object Store, depending on implementations.

In some embodiments, depending on the content of the blobs, if the blobs contain file data, the range threads may put these blobs into the per-job blob complete queue 1430. If the blobs contain only metadata, these blobs may be put directly into the first-in-first-out queue 1440. After fulfilling checkpoint requirements, such as processing a certain number of blobs or a predetermined period of time, the source file system in the source region 1402 may create a checkpoint, and also upload a checkpoint manifest file to the Object Store 1407 to inform the target file system the progress of the replication.

Step S9 and step S10 may be used for checkpointing purpose. At step S9, the upload complete queue 1450 may collect the blob sequence numbers for blobs that have been successfully uploaded, for example, inserting blob sequence numbers into the upload complete queue (e.g., first-in-first-out). If an upload job fails, the failed upload job may be put back into an internal queue (e.g., 1322*a-n* in FIG. 13) of the per-job blob complete queue 1430 and set to retry mode. At step S10, the DG 1414 may verify that blob upload is complete based on the returned sequence number, and inform source CP. When the number of completed upload blobs meets a checkpoint threshold requirement, a checkpoint may be created. For example, a checkpoint threshold may be set to 10 blobs. The source file system may track the consecutively uploaded blobs in sequence, for example, blob sequence number (seqno) 0 to 100. When the upload completion queue has received the first ten blob sequence numbers (seqno 0~seqno 10), a checkpoint is created for these ten uploaded blobs. When the upload completion queue receives another ten blobs (e.g., seqno 11~seqno 20), another checkpoint may be created for this group of uploaded blobs, and so on.

Figure 15:
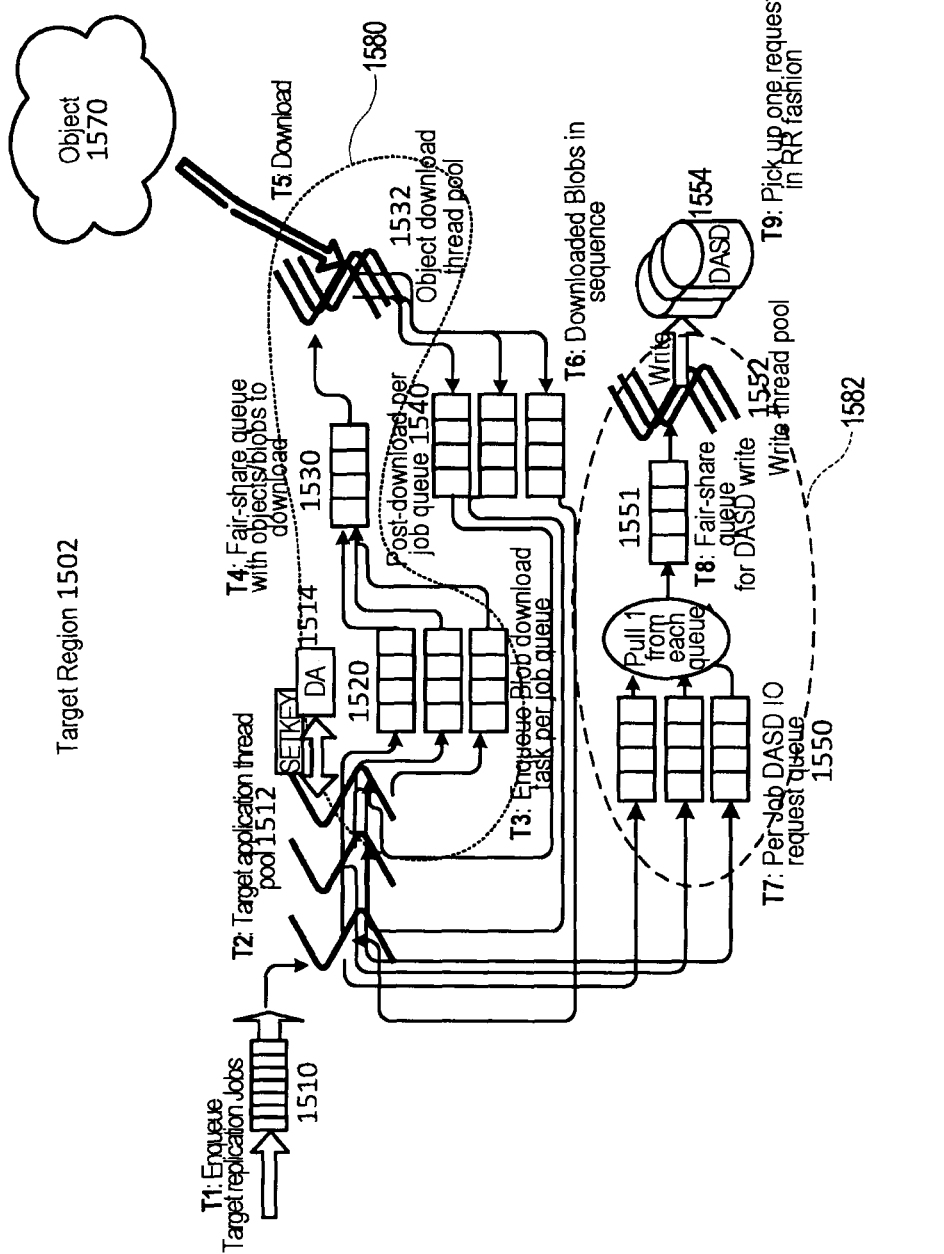
FIG. 15 is a simplified flow diagram illustrating a cross-region replication processing in a target region utilizing the fair-share architecture, according to certain embodiments.

FIG. 15 is a simplified flow diagram illustrating a cross-region replication processing in a target region utilizing the fair-share architecture, according to certain embodiments. A target region may include one or more target file systems running in parallel. FIG. 15 illustrates a target file system receiving requests for performing cross-region replications. The replication process in a target region may be similar to that of a source region, but in reverse order. In FIG. 15, the replication process of a target region 1502 may include four pipeline stages, the target replication job, delta (or object)

download, delta application to B-tree, and DASD IO access. The target replication job pipeline may be responsible for initiating cross-region replication in the target region. The delta/object download pipeline may be responsible for downloading deltas from the Object Store. The delta application pipeline may be responsible for delta application by applying the downloaded deltas to a B-tree in the target file system. The DASD IO access pipeline may be responsible for storage IO access for updating file data as part of the delta application process.

In certain embodiments, the fair-share architecture, as discussed in relation to FIG. 13, may be used between pipeline communication to achieve an end-to-end fair-share resource utilization for the replication process in the target region. For example, in FIG. 15, the fair-share architectures (1580 and 1582) are used between the target replication job pipeline and delta/object download pipeline, and between delta application pipeline and DASD IO access pipeline.

In FIG. 15, the target replication job pipeline may include a target replication job queue 1510 residing in target SDB. The delta/object download pipeline may include a target replicator (not shown) which is part of the target data plane, and its object download threads of download thread pool 1532. The delta application pipeline may include delta application threads of application thread pool 1512, and the delta applicator (DA) that owns the delta application threads. The DASD IO access pipeline may include DASD 1554 and DASD read thread pool 1552. The fair-share architecture 1580 used for communication between target replication job pipeline and delta/object download pipeline may include blob download task per job queue 1520, fair-share queue for object download 1530, and the object download threads 1532. The fair-share architecture 1582 used for communication between delta application pipeline and DASD IO access pipeline may include per-job DASD IO request queue 1550 and the DASD write threads 1552.

Referring to FIG. 15, at step T1, the source CP may communicate to the target CP through cross-region API about initiating a replication process between the source and target regions. After the reconciliation process between the source FS and the target FS, the target CP may enqueue target side replication jobs (e.g., delta application) into the target replication job queue 1510. At step T2, each target side replication job may be picked up and handled by a main thread of the target replicator of the target file system. The target replicator may, at the beginning, of the replication download a master manifest file from the source file system, where the master manifest file contains information to help the target replication figure out the number of key ranges to be used for parallel delta application. As part of the replicator, the delta applicator (DA) may have target application threads (or range threads) 1512 that issue delta/object download jobs for the key ranges. For example, one range thread may be responsible for one key range.

At step T3, these delta/object download jobs are put into the blob download task per job queue 1520, which is equivalent to the queue-of-queue 1320 that contains linked-list queues (1322a-n) in FIG. 13. Thus, the blob download task per job queue may have many internal queues, and one object download job is put into an internal queue at a time in a round-robin fashion. At step T4, each delta/object download job may be extracted from the blob download task per job queue 1520 in a round-robin fashion and put into the fair-share queue 1530 (equivalent to the fair-share queue 1340 in FIG. 13) for object download.

At step T5, any available thread of the object download thread pool 1532 (equivalent to thread pool 1360 in FIG. 13)

may pick up one delta/object download job at a time from the other end of the fair-share queue 1530. The object threads may run in parallel and concurrently. Some object threads may take longer to complete the delta blob download because some blobs may contain more file data than others. Additionally, the target file system may download checkpoint manifest files first to figure out the blobs available in the Object Store before downloading the blobs for each of the checkpoints.

At step T6, the objects containing blobs are downloaded and put into post-download per-job queue 1540. In some embodiments, the downloaded blobs may be temporarily stored in memory or cache for writing to DASD later. Since the downloads by the object threads running in parallel are asynchronous, but the blobs may need to be applied in sequence (i.e., the downloaded blobs may be applied to the target B-tree in increasing order of blob sequence number), the post-download per-job queue 1540 may be used. The blobs are first downloaded and put into a list of queues (represented by the post-download per-job queue 1540), and then are extracted (or picked up) in desired order by walking the list of queues. Re-arranging the downloaded blobs into sequence may help efficient processing and better cache hits. In other embodiments, the post-download per-job queue 1540 may not be used, and the downloaded blobs may be applied out-of-order by the target file system. If a download job fails, the failed job may be put back into an internal queue of the blob download task per job queue 1520 and set to retry mode.

At step T7, the DA's application threads (or range threads) of the application thread pool 1512 may process the downloaded blobs stored in the per-job queue 1540. If the blobs contain file data that need to update storage, the range threads may generate DASD IO requests, and put the requests into the per-job DASD IO request queue 1550, which is equivalent to the queue-of-queue 1320 that contains linked-list queues (1322a-n) in FIG. 13. Thus, the per-job DASD IO request queue may have many internal queues, and one DASD IO request is put into an internal queue at a time in a round-robin fashion. At step T8, each DASD IO request may be extracted from the per-job DASD IO request queue 1550 (equivalent to queue-of-queue 1320 in FIG. 13) in a round-robin fashion and put into a fair-share queue 1551 (equivalent to 1340 in FIG. 13) for DASD IO access.

At step T9, the threads of DASD write thread pool 1552 may pick up the DASD IO requests from the fair-share queue 1551 in a round-robin fashion, one DASD write thread per request, to update file data to DASD 1554. The DASD write threads that have obtained the IO requests may perform DASD IO access in parallel and concurrently. After fulfilling checkpoint requirements, such as processing a certain number of blobs or a predetermined period of time, the target file system in the target region 1502 may update its checkpoint records in the target SDB.

Because the fair-share architecture is used between all pipeline stages of both the source and target regions, overall available bandwidth is shared equally among all pipelines stages from end-to-end.

FIG. 16 is a flow chart illustrating a cross-region replication process using the fair-share architecture to achieve fair-share resource utilization, according to certain embodiments. In FIG. 16, at step 1610, FSS may receive a request for cross-region replication between a source file system and a target file system. At step 1612, the source file system, including multiple pipeline stages (e.g., the source replication job, delta generation B-tree walk, DASD IO access, and delta upload), process data (i.e., various forms of information for the replication), through these pipeline stages in parallel and concurrently. Each pipeline stage also operates independently without being impacted by failures of another pipeline stage. Each pipeline stage may contain at least a thread pool (e.g., 1360 in FIG. 13) that includes many threads. The number of active and parallel running threads may depend on the available resources (e.g., CPU core, bandwidth, memory) for that pipeline stage.

At step 1614, A fair-share architecture (e.g., 1300 in FIG. 13) is used between two neighboring pipeline stages for a communication to transfer processed data from one pipeline stage to another pipeline stage by enqueuing and dequeuing replication-related jobs for execution. The fair-share architecture may help each replication-related job for execution to use a substantially equal amount of resources of the file system. Because the fair-share architecture is used between all pipeline stages, the source file system can achieve end-to-end fair-share resource utilization.

Step 1620, which may include, but is not limited to, sub-steps 1622 to 1626, describe the process performed by the fair-share architecture. At step 1622, the fair-share architecture may receive replication-related jobs created by the parallel running threads of a prior pipeline stage (may be referred to as a first pipeline stage) in the source file system, and then distribute these replication-related jobs evenly (or fairly) into a temporary buffer. The temporary buffer may include, for example, queue-of-queue (1320 in FIG. 13), which contains a circular linked list of first-in-first-out queues, and a fair-share queue (1340 in FIG. 13).

At step 1624, when a thread of the thread pool in a next pipeline stage (may be referred to as a second pipeline stage) is available, it may extract one of the replication-related jobs from the temporary buffer for execution. The threads of the next pipeline stage may extract the jobs in a round-robin fashion one by one. In other words, the replication-related jobs are evenly distributed from the fair-share architecture to the parallel running threads of the next pipeline stage. At step 1626, each active thread of the parallel running threads of each pipeline stage executes one of the replication-related jobs using a roughly equal amount of resources of the source FS.

To illustrate step 1620 and its sub-steps 1622 to 1626, referring to FIG. 14, threads (1412) of the delta generation pipeline stage (S2) may generate DASD IO requests that are evenly distributed into the linked list of queues (1420) in the fair-share architecture (1480). These DASD IO requests may then be evenly distributed to and picked up by the threads (1424) of the DASD IO read access pipeline stage (S4) for accessing the storage. In some embodiments, the active threads (1412) of the delta generation pipeline stage and the active threads (1424) of the DASD IO access stage may utilize common resources, such as CPU cores, memory, bandwidth, and database, of the source file system. The number of active threads is controlled and maintained by the source file system to ensure each thread executes a job that uses a roughly equal amount (i.e., a fair share) of the overall resources of the source file system. Because each active thread in its corresponding pipeline stage uses a fair share of overall resources, each pipeline stage may also use a fair share of the overall resource.

At step 1630, the final pipeline stage (e.g., object upload S7 in FIG. 14) of the source file system may transfer the processed data (e.g., deltas, manifest files, and metadata) to the target file system via the Object Store (e.g., 1470 in FIGS. 14 and 1570 in FIG. 15). At step 1640, the same process (steps 1612 to 1626) may also be performed in the target file system, which may include multiple pipeline stages, target replication job, delta (or object) download, delta application to B-tree, and DASD IO access.

Example Cloud Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 17:
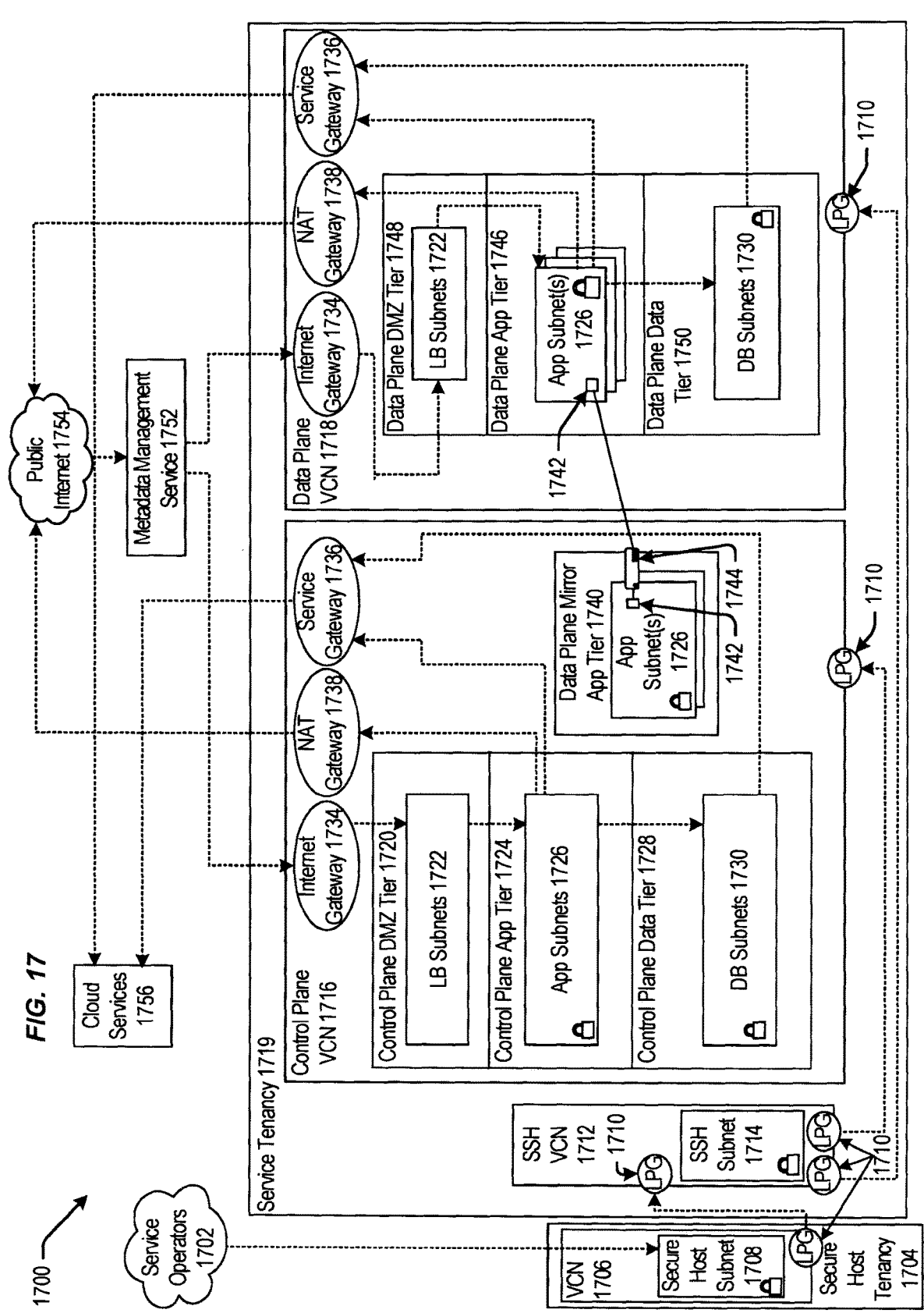
FIG. 17 is a block diagram illustrating one pattern for implementing a cloud infrastructure as a service system, according to at least one embodiment.

FIG. 17 is a block diagram 1700 illustrating an example pattern of an IaaS architecture, according to at least one embodiment. Service operators 1702 can be communicatively coupled to a secure host tenancy 1704 that can include a virtual cloud network (VCN) 1706 and a secure host subnet 1708. In some examples, the service operators 1702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1706 and/or the Internet.

The VCN 1706 can include a local peering gateway (LPG) 1710 that can be communicatively coupled to a secure shell (SSH) VCN 1712 via an LPG 1710 contained in the SSH VCN 1712. The SSH VCN 1712 can include an SSH subnet 1714, and the SSH VCN 1712 can be communicatively coupled to a control plane VCN 1716 via the LPG 1710 contained in the control plane VCN 1716. Also, the SSH VCN 1712 can be communicatively coupled to a data plane VCN 1718 via an LPG 1710. The control plane VCN 1716 and the data plane VCN 1718 can be contained in a service tenancy 1719 that can be owned and/or operated by the IaaS provider.

The control plane VCN 1716 can include a control plane demilitarized zone (DMZ) tier 1720 that acts as a perimeter network (e.g., portions of a corporate network between the corporate intranet and external networks). The DMZ-based servers may have restricted responsibilities and help keep breaches contained. Additionally, the DMZ tier 1720 can include one or more load balancer (LB) subnet(s) 1722, a control plane app tier 1724 that can include app subnet(s) 1726, a control plane data tier 1728 that can include database (DB) subnet(s) 1730 (e.g., frontend DB subnet(s) and/or backend DB subnet(s)). The LB subnet(s) 1722 contained in the control plane DMZ tier 1720 can be communicatively coupled to the app subnet(s) 1726 contained in the control plane app tier 1724 and an Internet gateway 1734 that can be contained in the control plane VCN 1716, and the app subnet(s) 1726 can be communicatively coupled to the DB subnet(s) 1730 contained in the control plane data tier 1728 and a service gateway 1736 and a network address translation (NAT) gateway 1738. The control plane VCN 1716 can include the service gateway 1736 and the NAT gateway 1738.

The control plane VCN 1716 can include a data plane mirror app tier 1740 that can include app subnet(s) 1726. The app subnet(s) 1726 contained in the data plane mirror app tier 1740 can include a virtual network interface controller (VNIC) 1742 that can execute a compute instance 1744. The compute instance 1744 can communicatively coupled the app subnet(s) 1726 of the data plane mirror app tier 1740 to app subnet(s) 1726 that can be contained in a data plane app tier 1746.

The data plane VCN 1718 can include the data plane app tier 1746, a data plane DMZ tier 1748, and a data plane data tier 1750. The data plane DMZ tier 1748 can include LB subnet(s) 1722 that can be communicatively coupled to the app subnet(s) 1726 of the data plane app tier 1746 and the Internet gateway 1734 of the data plane VCN 1718. The app subnet(s) 1726 can be communicatively coupled to the service gateway 1736 of the data plane VCN 1718 and the NAT gateway 1738 of the data plane VCN 1718. The data plane data tier 1750 can also include the DB subnet(s) 1730 that can be communicatively coupled to the app subnet(s) 1726 of the data plane app tier 1746.

The Internet gateway 1734 of the control plane VCN 1716 and of the data plane VCN 1718 can be communicatively coupled to a metadata management service 1752 that can be communicatively coupled to public Internet 1754. Public Internet 1754 can be communicatively coupled to the NAT gateway 1738 of the control plane VCN 1716 and of the data plane VCN 1718. The service gateway 1736 of the control plane VCN 1716 and of the data plane VCN 1718 can be communicatively coupled to cloud services 1756.

In some examples, the service gateway 1736 of the control plane VCN 1716 or of the data plane VCN 1718 can make application programming interface (API) calls to cloud services 1756 without going through public Internet 1754. The API calls to cloud services 1756 from the service gateway 1736 can be one-way: the service gateway 1736 can make API calls to cloud services 1756, and cloud services 1756 can send requested data to the service gateway 1736. But, cloud services 1756 may not initiate API calls to the service gateway 1736.

In some examples, the secure host tenancy 1704 can be directly connected to the service tenancy 1719, which may be otherwise isolated. The secure host subnet 1708 can communicate with the SSH subnet 1714 through an LPG 1710 that may enable two-way communication over an otherwise isolated system. Connecting the secure host subnet 1708 to the SSH subnet 1714 may give the secure host subnet 1708 access to other entities within the service tenancy 1719.

The control plane VCN 1716 may allow users of the service tenancy 1719 to set up or otherwise provision desired resources. Desired resources provisioned in the control plane VCN 1716 may be deployed or otherwise used in the data plane VCN 1718. In some examples, the control plane VCN 1716 can be isolated from the data plane VCN 1718, and the data plane mirror app tier 1740 of the control plane VCN 1716 can communicate with the data plane app tier 1746 of the data plane VCN 1718 via VNICs 1742 that can be contained in the data plane mirror app tier 1740 and the data plane app tier 1746.

In some examples, users of the system, or customers, can make requests, for example create, read, update, or delete (CRUD) operations, through public Internet 1754 that can communicate the requests to the metadata management service 1752. The metadata management service 1752 can communicate the request to the control plane VCN 1716 through the Internet gateway 1734. The request can be received by the LB subnet(s) 1722 contained in the control plane DMZ tier 1720. The LB subnet(s) 1722 may determine that the request is valid, and in response to this determination, the LB subnet(s) 1722 can transmit the request to app subnet(s) 1726 contained in the control plane app tier 1724. If the request is validated and requires a call to public Internet 1754, the call to public Internet 1754 may be transmitted to the NAT gateway 1738 that can make the call to public Internet 1754. Metadata that may be desired to be stored by the request can be stored in the DB subnet(s) 1730.

In some examples, the data plane mirror app tier 1740 can facilitate direct communication between the control plane VCN 1716 and the data plane VCN 1718. For example, changes, updates, or other suitable modifications to configuration may be desired to be applied to the resources contained in the data plane VCN 1718. Via a VNIC 1742, the control plane VCN 1716 can directly communicate with, and can thereby execute the changes, updates, or other suitable modifications to configuration to, resources contained in the data plane VCN 1718.

In some embodiments, the control plane VCN 1716 and the data plane VCN 1718 can be contained in the service tenancy 1719. In this case, the user, or the customer, of the system may not own or operate either the control plane VCN 1716 or the data plane VCN 1718. Instead, the IaaS provider may own or operate the control plane VCN 1716 and the data plane VCN 1718, both of which may be contained in the service tenancy 1719. This embodiment can enable isolation of networks that may prevent users or customers from interacting with other users', or other customers', resources. Also, this embodiment may allow users or customers of the system to store databases privately without needing to rely on public Internet 1754, which may not have a desired level of threat prevention, for storage.

In other embodiments, the LB subnet(s) 1722 contained in the control plane VCN 1716 can be configured to receive a signal from the service gateway 1736. In this embodiment, the control plane VCN 1716 and the data plane VCN 1718 may be configured to be called by a customer of the IaaS provider without calling public Internet 1754. Customers of the IaaS provider may desire this embodiment since database(s) that the customers use may be controlled by the IaaS provider and may be stored on the service tenancy 1719, which may be isolated from public Internet 1754.

Figure 18:
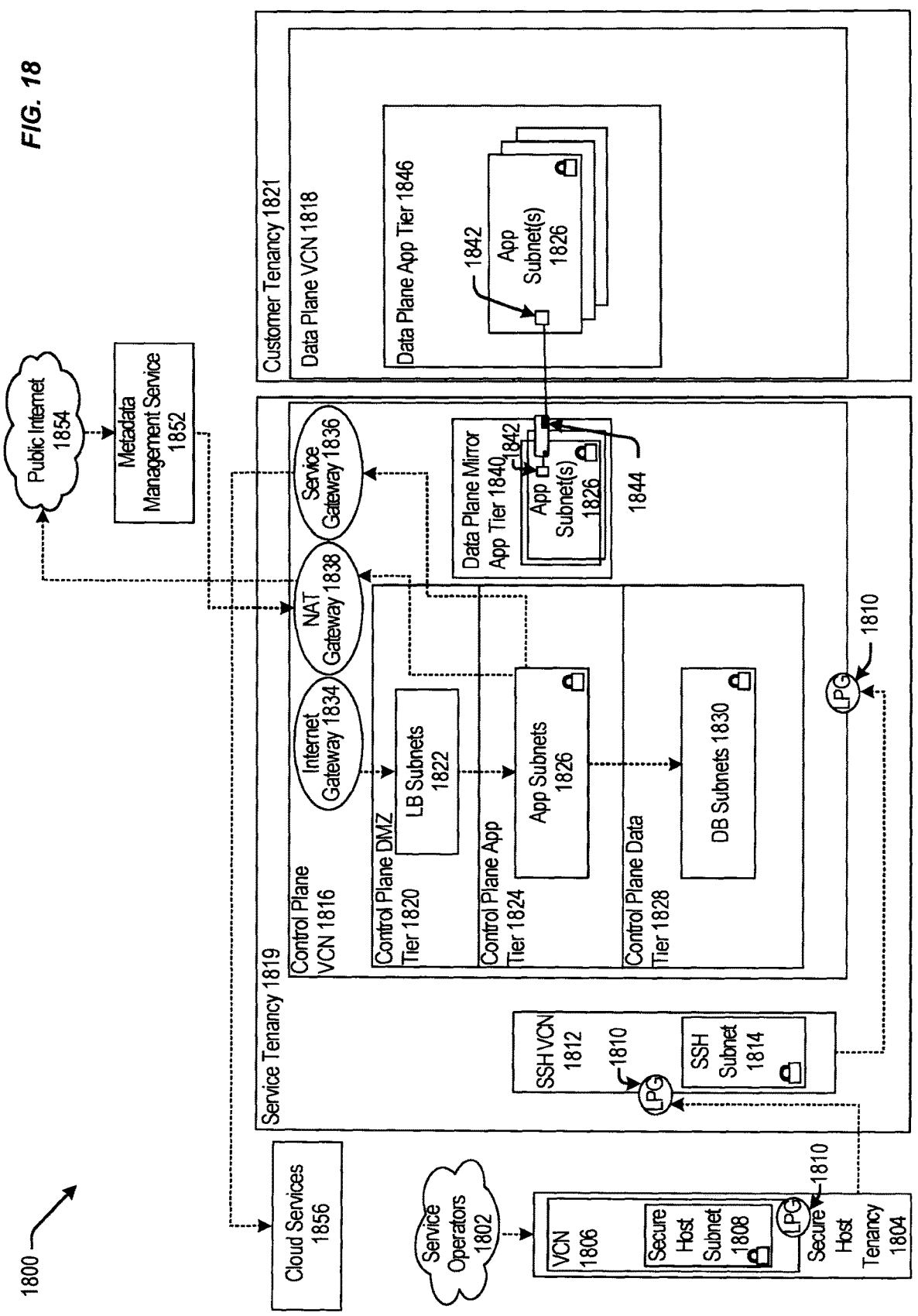
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g., service operators 1702 of FIG. 17) can be communicatively coupled to a secure host tenancy 1804 (e.g., the secure host tenancy 1704 of FIG. 17) that can include a virtual cloud network (VCN) 1806 (e.g., the VCN 1706 of FIG. 17) and a secure host subnet 1808 (e.g., the secure host subnet 1708 of FIG. 17). The VCN 1806 can include a local peering gateway (LPG) 1810 (e.g., the LPG 1710 of FIG. 17) that can be communicatively coupled to a secure shell (SSH) VCN 1812 (e.g., the SSH VCN 1712 of FIG. 17) via an LPG 1710 contained in the SSH VCN 1812. The SSH VCN 1812 can include an SSH subnet 1814 (e.g., the SSH subnet 1714 of FIG. 17), and the SSH VCN 1812 can be communicatively coupled to a control plane VCN 1816 (e.g., the control plane VCN 1716 of FIG. 17) via an LPG 1810 contained in the control plane VCN 1816. The control plane VCN 1816 can be contained in a service tenancy 1819 (e.g., the service tenancy 1719 of FIG. 17), and the data plane VCN 1818 (e.g., the data plane VCN 1718 of FIG. 17) can be contained in a customer tenancy 1821 that may be owned or operated by users, or customers, of the system.

The control plane VCN 1816 can include a control plane DMZ tier 1820 (e.g., the control plane DMZ tier 1720 of FIG. 17) that can include LB subnet(s) 1822 (e.g., LB subnet(s) 1722 of FIG. 17), a control plane app tier 1824 (e.g., the control plane app tier 1724 of FIG. 17) that can include app subnet(s) 1826 (e.g., app subnet(s) 1726 of FIG. 17), a control plane data tier 1828 (e.g., the control plane data tier 1728 of FIG. 17) that can include database (DB) subnet(s) 1830 (e.g., similar to DB subnet(s) 1730 of FIG. 17). The LB subnet(s) 1822 contained in the control plane DMZ tier 1820 can be communicatively coupled to the app subnet(s) 1826 contained in the control plane app tier 1824 and an Internet gateway 1834 (e.g., the Internet gateway 1734 of FIG. 17) that can be contained in the control plane VCN 1816, and the app subnet(s) 1826 can be communicatively coupled to the DB subnet(s) 1830 contained in the control plane data tier 1828 and a service gateway 1836 (e.g., the service gateway 1736 of FIG. 17) and a network address translation (NAT) gateway 1838 (e.g., the NAT gateway 1738 of FIG. 17). The control plane VCN 1816 can include the service gateway 1836 and the NAT gateway 1838.

The control plane VCN 1816 can include a data plane mirror app tier 1840 (e.g., the data plane mirror app tier 1740 of FIG. 17) that can include app subnet(s) 1826. The app subnet(s) 1826 contained in the data plane mirror app tier 1840 can include a virtual network interface controller (VNIC) 1842 (e.g., the VNIC of 1742) that can execute a compute instance 1844 (e.g., similar to the compute instance 1744 of FIG. 17). The compute instance 1844 can facilitate communication between the app subnet(s) 1826 of the data plane mirror app tier 1840 and the app subnet(s) 1826 that can be contained in a data plane app tier 1846 (e.g., the data plane app tier 1746 of FIG. 17) via the VNIC 1842 contained in the data plane mirror app tier 1840 and the VNIC 1842 contained in the data plane app tier 1846.

The Internet gateway 1834 contained in the control plane VCN 1816 can be communicatively coupled to a metadata management service 1852 (e.g., the metadata management service 1752 of FIG. 17) that can be communicatively coupled to public Internet 1854 (e.g., public Internet 1754 of FIG. 17). Public Internet 1854 can be communicatively coupled to the NAT gateway 1838 contained in the control plane VCN 1816. The service gateway 1836 contained in the control plane VCN 1816 can be communicatively coupled to cloud services 1856 (e.g., cloud services 1756 of FIG. 17).

In some examples, the data plane VCN 1818 can be contained in the customer tenancy 1821. In this case, the IaaS provider may provide the control plane VCN 1816 for each customer, and the IaaS provider may, for each customer, set up a unique compute instance 1844 that is contained in the service tenancy 1819. Each compute instance 1844 may allow communication between the control plane VCN 1816, contained in the service tenancy 1819, and the data plane VCN 1818 that is contained in the customer tenancy 1821. The compute instance 1844 may allow resources, that are provisioned in the control plane VCN 1816 that is contained in the service tenancy 1819, to be deployed or otherwise used in the data plane VCN 1818 that is contained in the customer tenancy 1821.

In other examples, the customer of the IaaS provider may have databases that live in the customer tenancy 1821. In this example, the control plane VCN 1816 can include the data plane mirror app tier 1840 that can include app subnet(s) 1826. The data plane mirror app tier 1840 can reside in the data plane VCN 1818, but the data plane mirror app tier 1840 may not live in the data plane VCN 1818. That is, the data plane mirror app tier 1840 may have access to the customer tenancy 1821, but the data plane mirror app tier 1840 may not exist in the data plane VCN 1818 or be owned or operated by the customer of the IaaS provider. The data plane mirror app tier 1840 may be configured to make calls to the data plane VCN 1818 but may not be configured to make calls to any entity contained in the control plane VCN 1816. The customer may desire to deploy or otherwise use resources in the data plane VCN 1818 that are provisioned in the control plane VCN 1816, and the data plane mirror app tier 1840 can facilitate the desired deployment, or other usage of resources, of the customer.

In some embodiments, the customer of the IaaS provider can apply filters to the data plane VCN 1818. In this embodiment, the customer can determine what the data plane VCN 1818 can access, and the customer may restrict access to public Internet 1854 from the data plane VCN 1818. The IaaS provider may not be able to apply filters or otherwise control access of the data plane VCN 1818 to any outside networks or databases. Applying filters and controls by the customer onto the data plane VCN 1818, contained in the customer tenancy 1821, can help isolate the data plane VCN 1818 from other customers and from public Internet 1854.

In some embodiments, cloud services 1856 can be called by the service gateway 1836 to access services that may not exist on public Internet 1854, on the control plane VCN 1816, or on the data plane VCN 1818. The connection between cloud services 1856 and the control plane VCN 1816 or the data plane VCN 1818 may not be live or continuous. Cloud services 1856 may exist on a different network owned or operated by the IaaS provider. Cloud services 1856 may be configured to receive calls from the service gateway 1836 and may be configured to not receive calls from public Internet 1854. Some cloud services 1856 may be isolated from other cloud services 1856, and the control plane VCN 1816 may be isolated from cloud services 1856 that may not be in the same region as the control plane VCN 1816. For example, the control plane VCN 1816 may be located in "Region 1," and cloud service "Deployment 17," may be located in Region 1 and in "Region 2." If a call to Deployment 17 is made by the service gateway 1836 contained in the control plane VCN 1816 located in Region 1, the call may be transmitted to Deployment 17 in Region 1. In this example, the control plane VCN 1816, or Deployment 17 in Region 1, may not be communicatively coupled to, or otherwise in communication with, Deployment 17 in Region 2.

Figure 19:
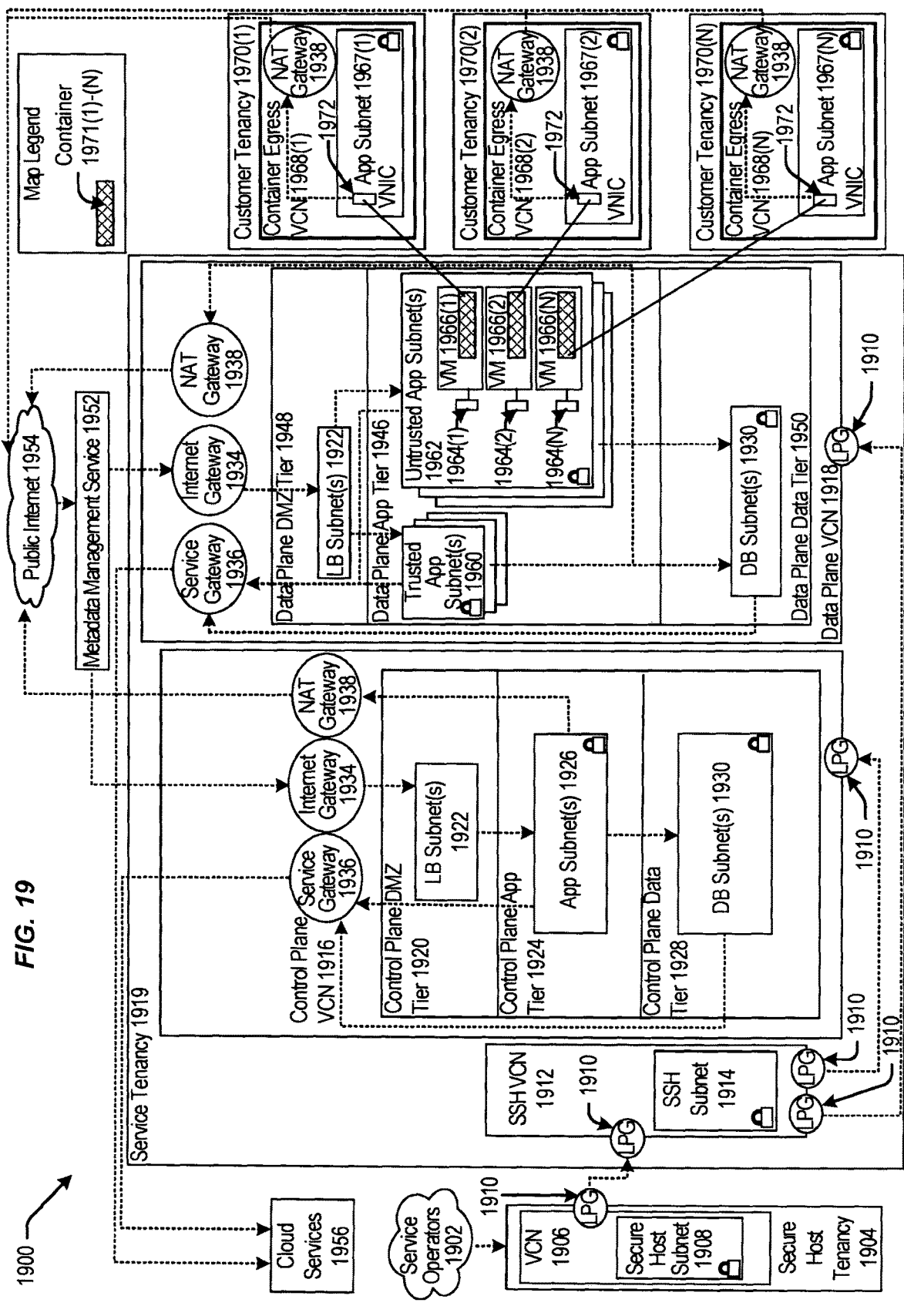
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1702 of FIG. 17) can be communicatively coupled to a secure host tenancy 1904 (e.g., the secure host tenancy 1704 of FIG. 17) that can include a virtual cloud network (VCN) 1906 (e.g., the VCN 1706 of FIG. 17) and a secure host subnet 1908 (e.g., the secure host subnet 1708 of FIG. 17). The VCN 1906 can include an LPG 1910 (e.g., the LPG 1710 of FIG. 17) that can be communicatively coupled to an SSH VCN 1912 (e.g., the SSH VCN 1712 of FIG. 17) via an LPG 1910 contained in the SSH VCN 1912. The SSH VCN 1912 can include an SSH subnet 1914 (e.g., the SSH subnet 1714 of FIG. 17), and the SSH VCN 1912 can be communicatively coupled to a control plane VCN 1916 (e.g., the control plane VCN 1716 of FIG. 17) via an LPG 1910 contained in the control plane VCN 1916 and to a data plane VCN 1918 (e.g., the data plane 1718 of FIG. 17) via an LPG 1910 contained in the data plane VCN 1918. The control plane VCN 1916 and the data plane VCN 1918 can be contained in a service tenancy 1919 (e.g., the service tenancy 1719 of FIG. 17).

The control plane VCN 1916 can include a control plane DMZ tier 1920 (e.g., the control plane DMZ tier 1720 of FIG. 17) that can include load balancer (LB) subnet(s) 1922 (e.g., LB subnet(s) 1722 of FIG. 17), a control plane app tier 1924 (e.g., the control plane app tier 1724 of FIG. 17) that can include app subnet(s) 1926 (e.g., similar to app subnet(s) 1726 of FIG. 17), a control plane data tier 1928 (e.g., the control plane data tier 1728 of FIG. 17) that can include DB subnet(s) 1930. The LB subnet(s) 1922 contained in the control plane DMZ tier 1920 can be communicatively coupled to the app subnet(s) 1926 contained in the control plane app tier 1924 and to an Internet gateway 1934 (e.g., the Internet gateway 1734 of FIG. 17) that can be contained in the control plane VCN 1916, and the app subnet(s) 1926 can be communicatively coupled to the DB subnet(s) 1930 contained in the control plane data tier 1928 and to a service gateway 1936 (e.g., the service gateway of FIG. 17) and a network address translation (NAT) gateway 1938 (e.g., the NAT gateway 1738 of FIG. 17). The control plane VCN 1916 can include the service gateway 1936 and the NAT gateway 1938.

The data plane VCN 1918 can include a data plane app tier 1946 (e.g., the data plane app tier 1746 of FIG. 17), a data plane DMZ tier 1948 (e.g., the data plane DMZ tier 1748 of FIG. 17), and a data plane data tier 1950 (e.g., the data plane data tier 1750 of FIG. 17). The data plane DMZ tier 1948 can include LB subnet(s) 1922 that can be communicatively coupled to trusted app subnet(s) 1960 and untrusted app subnet(s) 1962 of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include one or more primary VNICs 1964(1)-(N) that can be communicatively coupled to tenant virtual machines (VMs) 1966(1)-(N). Each tenant VM 1966(1)-(N) can be communicatively coupled to a respective app subnet 1967(1)-(N) that can be contained in respective container egress VCNs 1968(1)-(N) that can be contained in respective customer tenancies 1970(1)-(N). Respective secondary VNICs 1972(1)-(N) can facilitate communication between the untrusted app subnet(s) 1962 contained in the data plane VCN 1918 and the app subnet contained in the container egress VCNs 1968(1)-(N). Each container egress VCNs 1968(1)-(N) can include a NAT gateway 1938 that can be communicatively coupled to public Internet 1954 (e.g., public Internet 1754 of FIG. 17).

The Internet gateway 1934 contained in the control plane VCN 1916 and contained in the data plane VCN 1918 can be communicatively coupled to a metadata management service 1952 (e.g., the metadata management system 1752 of FIG. 17) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively coupled to cloud services 1956.

In some embodiments, the data plane VCN 1918 can be integrated with customer tenancies 1970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1946. Code to run the function may be executed in the VMs 1966(1)-(N), and the code may not be configured to run anywhere else on the data plane VCN 1918. Each VM 1966(1)-(N) may be connected to one customer tenancy 1970. Respective containers 1971(1)-(N) contained in the VMs 1966(1)-(N) may be configured to run the code. In this case, there can be a dual isolation (e.g., the containers 1971(1)-(N) running code, where the containers 1971(1)-(N) may be contained in at least the VM 1966(1)-(N) that are contained in the untrusted app subnet(s) 1962), which may help prevent incorrect or otherwise undesirable code from damaging the network of the IaaS provider or from damaging a network of a different customer. The containers 1971(1)-(N) may be communicatively coupled to the customer tenancy 1970 and may be configured to transmit or receive data from the customer tenancy 1970. The containers 1971(1)-(N) may not be configured to transmit or receive data from any other entity in the data plane VCN 1918. Upon completion of running the code, the IaaS provider may kill or otherwise dispose of the containers 1971(1)-(N).

In some embodiments, the trusted app subnet(s) 1960 may run code that may be owned or operated by the IaaS provider. In this embodiment, the trusted app subnet(s) 1960 may be communicatively coupled to the DB subnet(s) 1930 and be configured to execute CRUD operations in the DB subnet(s) 1930. The untrusted app subnet(s) 1962 may be communicatively coupled to the DB subnet(s) 1930, but in this embodiment, the untrusted app subnet(s) may be configured to execute read operations in the DB subnet(s) 1930. The containers 1971(1)-(N) that can be contained in the VM 1966(1)-(N) of each customer and that may run code from the customer may not be communicatively coupled with the DB subnet(s) 1930.

In other embodiments, the control plane VCN 1916 and the data plane VCN 1918 may not be directly communicatively coupled. In this embodiment, there may be no direct communication between the control plane VCN 1916 and the data plane VCN 1918. However, communication can occur indirectly through at least one method. An LPG 1910 may be established by the IaaS provider that can facilitate communication between the control plane VCN 1916 and the data plane VCN 1918. In another example, the control plane VCN 1916 or the data plane VCN 1918 can make a call to cloud services 1956 via the service gateway 1936. For example, a call to cloud services 1956 from the control plane VCN 1916 can include a request for a service that can communicate with the data plane VCN 1918.

Figure 20:
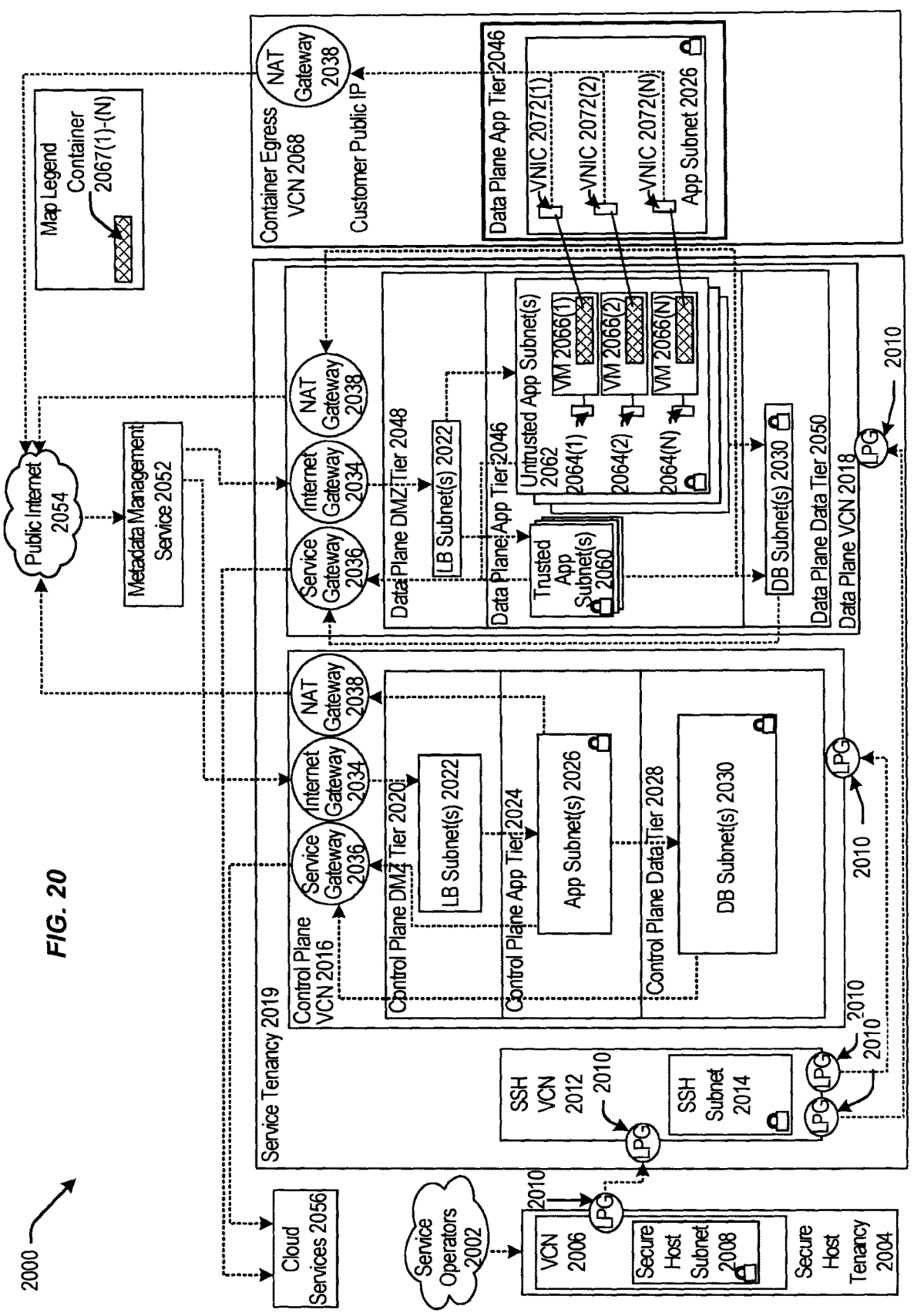
FIG. 20 is a block diagram illustrating another pattern for implementing a cloud infrastructure as a service system, according to at least one embodiment.

FIG. 20 is a block diagram 2000 illustrating another example pattern of an IaaS architecture, according to at least one embodiment. Service operators 2002 (e.g., service operators 1702 of FIG. 17) can be communicatively coupled to a secure host tenancy 2004 (e.g., the secure host tenancy 1704 of FIG. 17) that can include a virtual cloud network (VCN) 2006 (e.g., the VCN 1706 of FIG. 17) and a secure host subnet 2008 (e.g., the secure host subnet 1708 of FIG. 17). The VCN 2006 can include an LPG 2010 (e.g., the LPG 1710 of FIG. 17) that can be communicatively coupled to an SSH VCN 2012 (e.g., the SSH VCN 1712 of FIG. 17) via an LPG 2010 contained in the SSH VCN 2012. The SSH VCN 2012 can include an SSH subnet 2014 (e.g., the SSH subnet 1714 of FIG. 17), and the SSH VCN 2012 can be communicatively coupled to a control plane VCN 2016 (e.g., the control plane VCN 1716 of FIG. 17) via an LPG 2010 contained in the control plane VCN 2016 and to a data plane VCN 2018 (e.g., the data plane 1718 of FIG. 17) via an LPG 2010 contained in the data plane VCN 2018. The control plane VCN 2016 and the data plane VCN 2018 can be contained in a service tenancy 2019 (e.g., the service tenancy 1719 of FIG. 17).

The control plane VCN 2016 can include a control plane DMZ tier 2020 (e.g., the control plane DMZ tier 1720 of FIG. 17) that can include LB subnet(s) 2022 (e.g., LB subnet(s) 1722 of FIG. 17), a control plane app tier 2024 (e.g., the control plane app tier 1724 of FIG. 17) that can include app subnet(s) 2026 (e.g., app subnet(s) 1726 of FIG. 17), a control plane data tier 2028 (e.g., the control plane data tier 1728 of FIG. 17) that can include DB subnet(s) 2030 (e.g., DB subnet(s) 1930 of FIG. 19). The LB subnet(s) 2022 contained in the control plane DMZ tier 2020 can be communicatively coupled to the app subnet(s) 2026 contained in the control plane app tier 2024 and to an Internet gateway 2034 (e.g., the Internet gateway 1734 of FIG. 17) that can be contained in the control plane VCN 2016, and the app subnet(s) 2026 can be communicatively coupled to the DB subnet(s) 2030 contained in the control plane data tier 2028 and to a service gateway 2036 (e.g., the service gateway of FIG. 17) and a network address translation (NAT) gateway 2038 (e.g., the NAT gateway 1738 of FIG.

17). The control plane VCN 2016 can include the service gateway 2036 and the NAT gateway 2038.

The data plane VCN 2018 can include a data plane app tier 2046 (e.g., the data plane app tier 1746 of FIG. 17), a data plane DMZ tier 2048 (e.g., the data plane DMZ tier 1748 of FIG. 17), and a data plane data tier 2050 (e.g., the data plane data tier 1750 of FIG. 17). The data plane DMZ tier 2048 can include LB subnet(s) 2022 that can be communicatively coupled to trusted app subnet(s) 2060 (e.g., trusted app subnet(s) 1960 of FIG. 19) and untrusted app subnet(s) 2062 (e.g., untrusted app subnet(s) 1962 of FIG. 19) of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include primary VNICs 2064(1)-(N) that can be communicatively coupled to tenant virtual machines (VMs) 2066(1)-(N) residing within the untrusted app subnet(s) 2062. Each tenant VM 2066(1)-(N) can run code in a respective container 2067(1)-(N), and be communicatively coupled to an app subnet 2026 that can be contained in a data plane app tier 2046 that can be contained in a container egress VCN 2068. Respective secondary VNICs 2072(1)-(N) can facilitate communication between the untrusted app subnet(s) 2062 contained in the data plane VCN 2018 and the app subnet contained in the container egress VCN 2068. The container egress VCN can include a NAT gateway 2038 that can be communicatively coupled to public Internet 2054 (e.g., public Internet 1754 of FIG. 17).

The Internet gateway 2034 contained in the control plane VCN 2016 and contained in the data plane VCN 2018 can be communicatively coupled to a metadata management service 2052 (e.g., the metadata management system 1752 of FIG. 17) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively coupled to cloud services 2056.

In some examples, the pattern illustrated by the architecture of block diagram 2000 of FIG. 20 may be considered an exception to the pattern illustrated by the architecture of block diagram 1900 of FIG. 19 and may be desirable for a customer of the IaaS provider if the IaaS provider cannot directly communicate with the customer (e.g., a disconnected region). The respective containers 2067(1)-(N) that are contained in the VMs 2066(1)-(N) for each customer can be accessed in real-time by the customer. The containers 2067(1)-(N) may be configured to make calls to respective secondary VNICs 2072(1)-(N) contained in app subnet(s) 2026 of the data plane app tier 2046 that can be contained in the container egress VCN 2068. The secondary VNICs 2072(1)-(N) can transmit the calls to the NAT gateway 2038 that may transmit the calls to public Internet 2054. In this example, the containers 2067(1)-(N) that can be accessed in real-time by the customer can be isolated from the control plane VCN 2016 and can be isolated from other entities contained in the data plane VCN 2018. The containers 2067(1)-(N) may also be isolated from resources from other customers.

In other examples, the customer can use the containers 2067(1)-(N) to call cloud services 2056. In this example, the customer may run code in the containers 2067(1)-(N) that requests a service from cloud services 2056. The containers 2067(1)-(N) can transmit this request to the secondary VNICs 2072(1)-(N) that can transmit the request to the NAT gateway that can transmit the request to public Internet 2054. Public Internet 2054 can transmit the request to LB subnet(s) 2022 contained in the control plane VCN 2016 via the Internet gateway 2034. In response to determining the request is valid, the LB subnet(s) can transmit the request to app subnet(s) 2026 that can transmit the request to cloud services 2056 via the service gateway 2036.

It should be appreciated that IaaS architectures 1700, 1800, 1900, 2000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 21:
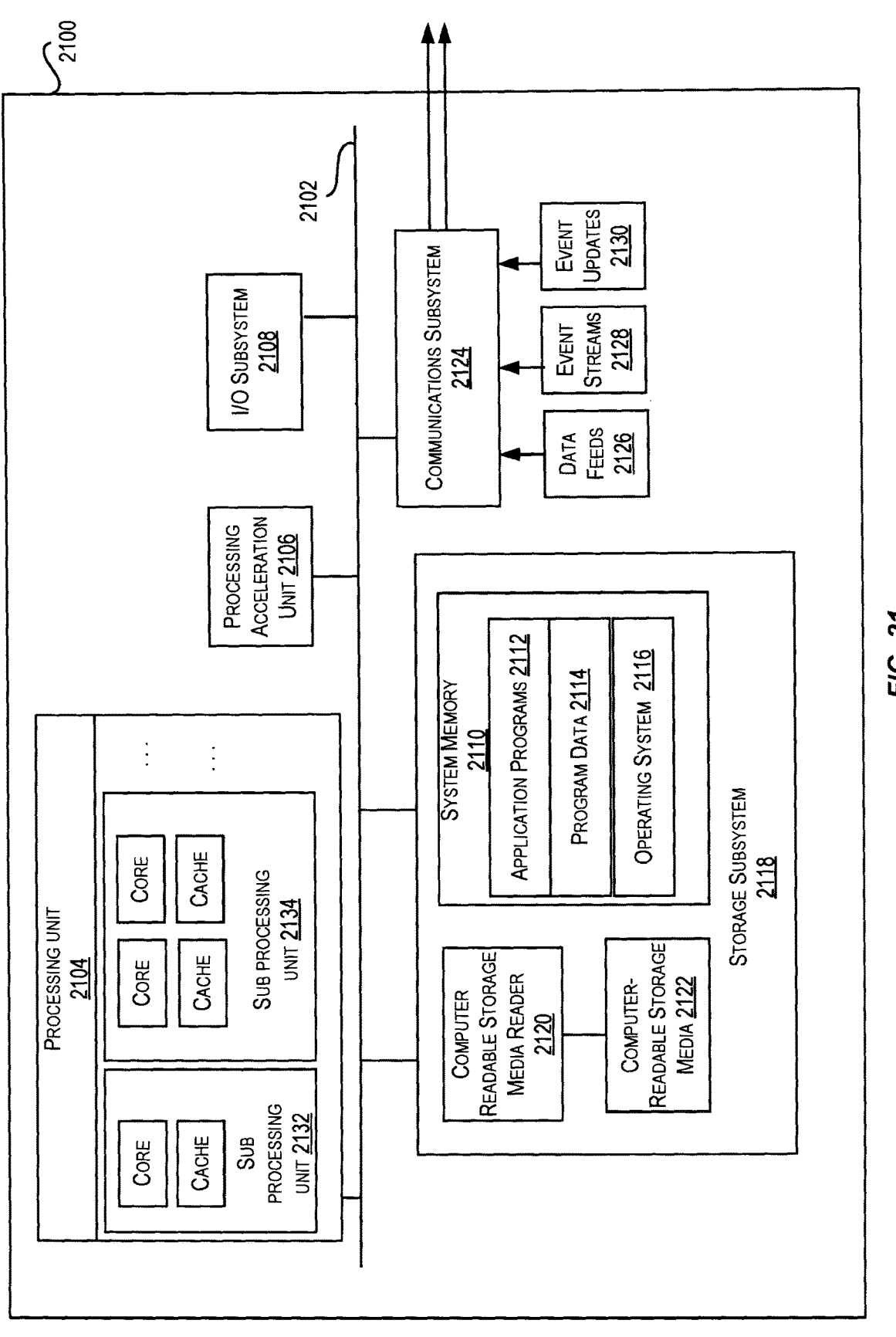
FIG. 21 is a block diagram illustrating an example computer system, according to at least one embodiment.

FIG. 21 illustrates an example computer system 2100, in which various embodiments may be implemented. The system 2100 may be used to implement any of the computer systems described above. As shown in the figure, computer system 2100 includes a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 includes tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2104, which can be implemented as one or more integrated circuits (e.g., a conventional microprocessor or microcontroller), controls the operation of computer system 2100. One or more processors may be included in processing unit 2104. These processors may include single core or multicore processors. In certain embodiments, processing unit 2104 may be implemented as one or more independent processing units 2132 and/or 2134 with single or multicore processors included in each processing unit. In other embodiments, processing unit 2104 may also be implemented as a quad-core processing unit formed by integrating two dual-core processors into a single chip.

In various embodiments, processing unit 2104 can execute a variety of programs in response to program code and can maintain multiple concurrently executing programs or processes. At any given time, some or all of the program code to be executed can be resident in processor(s) 2104 and/or in storage subsystem 2118. Through suitable programming, processor(s) 2104 can provide various functionalities described above. Computer system 2100 may additionally include a processing acceleration unit 2106, which can include a digital signal processor (DSP), a special-purpose processor, and/or the like.

I/O subsystem 2108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2100 may comprise a storage subsystem 2118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2104 provide the functionality described above. Storage subsystem 2118 may also provide a repository for storing data used in accordance with the present disclosure.

As depicted in the example in FIG. 21, storage subsystem 2118 can include various components including a system memory 2110, computer-readable storage media 2122, and a computer readable storage media reader 2120. System memory 2110 may store program instructions that are loadable and executable by processing unit 2104. System memory 2110 may also store data that is used during the execution of the instructions and/or data that is generated during the execution of the program instructions. Various different kinds of programs may be loaded into system memory 2110 including but not limited to client applications, Web browsers, mid-tier applications, relational database management systems (RDBMS), virtual machines, containers, etc.

System memory 2110 may also store an operating system 2116. Examples of operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2100 executes one or more virtual machines, the virtual machines along with their guest operating systems (GOSs) may be loaded into system memory 2110 and executed by one or more processors or cores of processing unit 2104.

System memory 2110 can come in different configurations depending upon the type of computer system 2100. For example, system memory 2110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2110 may include a basic input/output system (BIOS) containing basic routines that help to transfer information between elements within computer system 2100, such as during start-up.

Computer-readable storage media 2122 may represent remote, local, fixed, and/or removable storage devices plus storage media for temporarily and/or more permanently containing, storing, computer-readable information for use by computer system 2100 including instructions executable by processing unit 2104 of computer system 2100.

Computer-readable storage media 2122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2100.

Machine-readable instructions executable by one or more processors or cores of processing unit 2104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to connect to one or more devices via the Internet. In some embodiments communications subsystem 2124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

In some embodiments, communications subsystem 2124 may also receive input communication in the form of structured and/or unstructured data feeds 2126, event streams 2128, event updates 2130, and the like on behalf of one or more users who may use computer system 2100.

By way of example, communications subsystem 2124 may be configured to receive data feeds 2126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2124 may also be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
executing a set of jobs, by a first pipeline stage and a second pipeline stage of a computing system, the first pipeline stage comprising a first set of parallel running threads, and the second pipeline stage comprising a second set of parallel running threads; and
communicating, by the computing system, between the first pipeline stage and the second pipeline stage through an architecture for enqueuing and dequeuing, the communicating comprising:
enqueuing the set of jobs from the first pipeline stage evenly to the architecture; and
dequeuing the set of jobs from the architecture evenly to the second pipeline stage, wherein executing the set of jobs by the first pipeline stage uses an equivalent amount of resources of the computing system as executing the set of jobs by the second pipeline stage.

2. The method of claim 1, wherein the architecture comprises a linked list of queues holding the set of jobs having completed execution by the first set of parallel running threads in the first pipeline stage, and to be executed by the second set of parallel running threads in the second pipeline stage.

3. The method of claim 2, wherein enqueuing the set of jobs evenly to the architecture comprises placing, by a processing thread of the first set of parallel running threads in the first pipeline stage, one of the set of jobs into one queue of the linked list of queues in a round-robin fashion.

4. The method of claim 2, wherein dequeuing the set of jobs from the architecture evenly comprises extracting one of the set of jobs from one queue of the linked list of queues in a round-robin fashion.

5. The method of claim 2, wherein a queue of the linked list of queues is created upon receiving one of the set of jobs.

6. The method of claim 2, wherein a queue of the linked list of queues is deleted when no job exists in the queue.

7. The method of claim 1, wherein the first pipeline stage and the second pipeline stage are replication pipeline stages of a file system.

8. The method of claim 1,
wherein each job of the set of jobs is executed by one or more of the first set of parallel running threads in the first pipeline stage,
wherein each job of the set of jobs is executed by one or more of the second set of parallel running threads in the second pipeline stage, and
wherein each parallel running thread of the first set and the second set uses an equal share of resources of the computing system.

9. The method of claim 1, further comprising a job failure in the first pipeline stage does not impact any jobs being executed by the second pipeline stage.

10. The method of claim 1, wherein the resources of the computing system comprise computing devices, memory, storage, network, database, and bandwidth.

11. A non-transitory computer-readable medium storing computer-executable instructions that, when executed by one or more processors, cause the one or more processors to perform operations comprising:

executing a set of jobs, by a first pipeline stage and a second pipeline stage of a computing system, the first pipeline stage comprising a first set of parallel running threads, and the second pipeline stage comprising a second set of parallel running threads; and communicating, by the computing system, between the first pipeline stage and the second pipeline stage through an architecture for enqueuing and dequeuing, the communicating comprising:

enqueuing the set of jobs from the first pipeline stage evenly to the architecture; and dequeuing the set of jobs from the architecture evenly to the second pipeline stage, wherein executing the set of jobs by the first pipeline stage uses an equivalent amount of resources of the computing system as executing the set of jobs by the second pipeline stage.

12. The non-transitory computer-readable medium of claim 11, wherein the architecture comprises a linked list of queues holding the set of jobs having completed execution by the first set of parallel running threads in the first pipeline stage, and to be executed by the second set of parallel running threads in the second pipeline stage.

13. The non-transitory computer-readable medium of claim 12, wherein enqueuing the set of jobs evenly to the architecture comprises placing, by a processing thread of the first set of parallel running threads in the first pipeline stage, one of the set of jobs into one queue of the linked list of queues in a round-robin fashion, and wherein dequeuing the set of jobs from the architecture evenly comprises extracting one of the set of jobs from one queue of the linked list of queues in a round-robin fashion.

14. The non-transitory computer-readable medium of claim 12, wherein a queue of the linked list of queues is created upon receiving one of the set of jobs, and a queue of the linked list of queues is deleted when no job exists in the queue.

15. The non-transitory computer-readable medium of claim 11, wherein each job of the set of jobs is executed by one or more of the first set of parallel running threads in the first pipeline stage, wherein each job of the set of jobs is executed by one or more of the second set of parallel running threads in the second pipeline stage, and wherein each parallel running thread of the first set and the second set uses an equal share of resources of the computing system.

16. A computing system, comprising:

one or more processors; and one or more non-transitory computer readable media storing computer-executable instructions that, when executed by the one or more processors, cause the computing system to:

execute a set of jobs, by a first pipeline stage and a second pipeline stage, the first pipeline stage comprising a first set of parallel running threads, and the second pipeline stage comprising a second set of parallel running threads; and communicate between the first pipeline stage and the second pipeline stage through an architecture for enqueuing and dequeuing, the communicating comprising:

enqueue the set of jobs from the first pipeline stage evenly to the architecture; and dequeue the set of jobs from the architecture evenly to the second pipeline stage, wherein executing the set of jobs by the first pipeline stage uses an equivalent amount of resources of the computing system as executing the set of jobs by the second pipeline stage.

17. The computing system of claim 16, wherein the architecture comprises a linked list of queues holding the set of jobs having completed execution by the first set of parallel running threads in the first pipeline stage, and to be executed by the second set of parallel running threads in the second pipeline stage.

18. The computing system of claim 17, wherein enqueuing the set of jobs evenly to the architecture comprises placing, by a processing thread of the first set of parallel running threads in the first pipeline stage, one of the set of jobs into one queue of the linked list of queues in a round-robin fashion, and wherein dequeuing the set of jobs from the architecture evenly comprises extracting one of the set of jobs from one queue of the linked list of queues in a round-robin fashion.

19. The computing system of claim 17, wherein a queue of the linked list of queues is created upon receiving one of the set of jobs, and a queue of the linked list of queues is deleted when no job exists in the queue.

20. The computing system of claim 16, wherein each job of the set of jobs is executed by one or more of the first set of parallel running threads in the first pipeline stage, wherein each job of the set of jobs is executed by one or more of the second set of parallel running threads in the second pipeline stage, and wherein each parallel running thread of the first set and the second set uses an equal share of resources of the computing system.

* * * * *